United States Patent [19]

Phillips

[11] Patent Number: 5,345,764

[45] Date of Patent: * Sep. 13, 1994

[54] CONTROL VALVE FOR BOOTSTRAP HYDRAULIC SYSTEMS

[75] Inventor: Edward H. Phillips, Troy, Mich.

[73] Assignee: Techco Corporation, Birmingham, Mich.

[ * ] Notice: The portion of the term of this patent subsequent to Jul. 13, 2010 has been disclaimed.

[21] Appl. No.: 743,243

[22] Filed: Aug. 9, 1991

Related U.S. Application Data

[63] Continuation-in-part of Ser. No. 698,601, May 10, 1991.

[51] Int. Cl.⁵ .............................................. F16D 31/02
[52] U.S. Cl. ................................... 60/393; 60/450; 60/451; 60/494; 91/375 R
[58] Field of Search .................. 60/368, 393, 384–386, 60/450, 451, 494; 91/375 R, 375 A

[56] References Cited

U.S. PATENT DOCUMENTS

| | | |
|---|---|---|
| 3,591,136 | 7/1971 | Bishop .............................. 91/375 R |
| 4,217,932 | 8/1980 | Bacardit .......................... 137/625.21 |
| 4,425,759 | 1/1984 | Krusche . |
| 4,507,920 | 4/1985 | Rau ...................................... 60/452 |

Primary Examiner—Edward K. Look
Assistant Examiner—F. Daniel Lopez
Attorney, Agent, or Firm—Gifford, Groh, Sprinkle, Patmore and Anderson

[57] ABSTRACT

The present invention is directed to a hydro-mechanical or electro-hydro-mechanical control system utilized for positioning a mechanical device. The control system incorporates an open-center control valve for selectively controlling the differential pressure applied to and the differential flow between input ports of a power output transducer in response to a mechanically applied rotational inputs. The power output transducer is then utilized to position a mechanical device. The control system is a closed loop circuit adapted to supply hydraulic fluid at a desired supply pressure to the control valve. The supply pressure is varied in relation to the absolute value of the pressure differential or load pressure exerted across the input ports of the power output transducer. A pressure regulating apparatus is provided for selectively regulating the supply pressure to a value that is nominally equal to the absolute value of the load pressure summed with a preselected supplemental pressure value across the regulating apparatus. As such, any pressure drop across the control valve is maintained at a nominally constant value which is nominally equal to the difference between the supply pressure and the load pressure. Furthermore, the open-centered control valve is operable for generating a tactile feedback as a function of both the differential output pressure and the differential fluid flow.

17 Claims, 24 Drawing Sheets

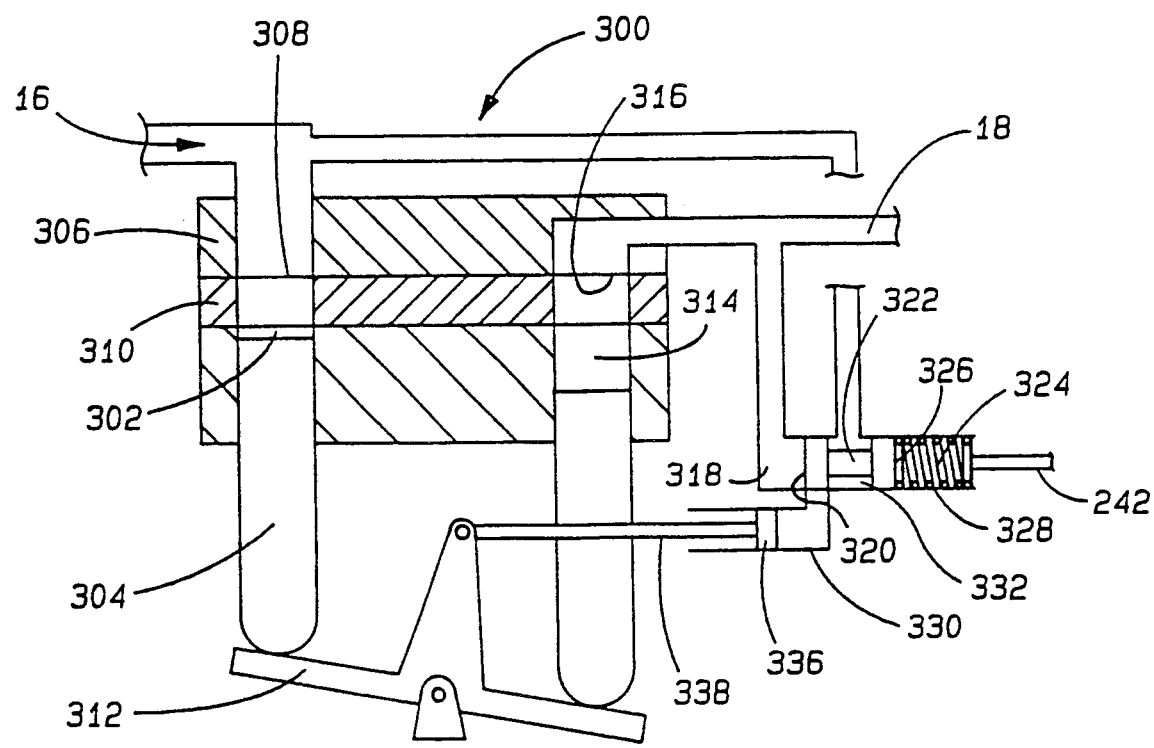
_Fig-14_
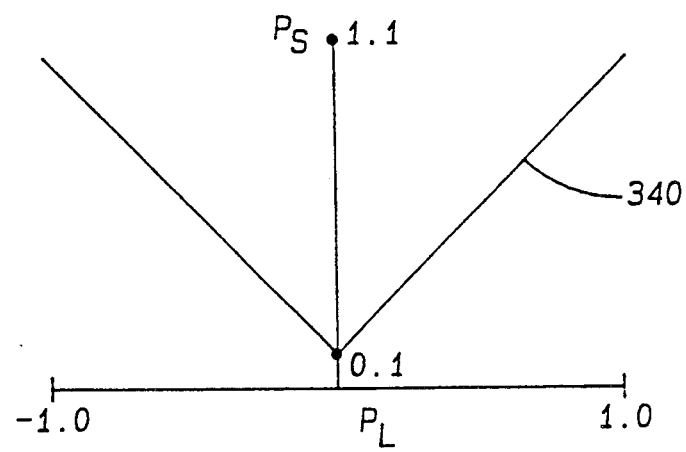
_Fig-15_

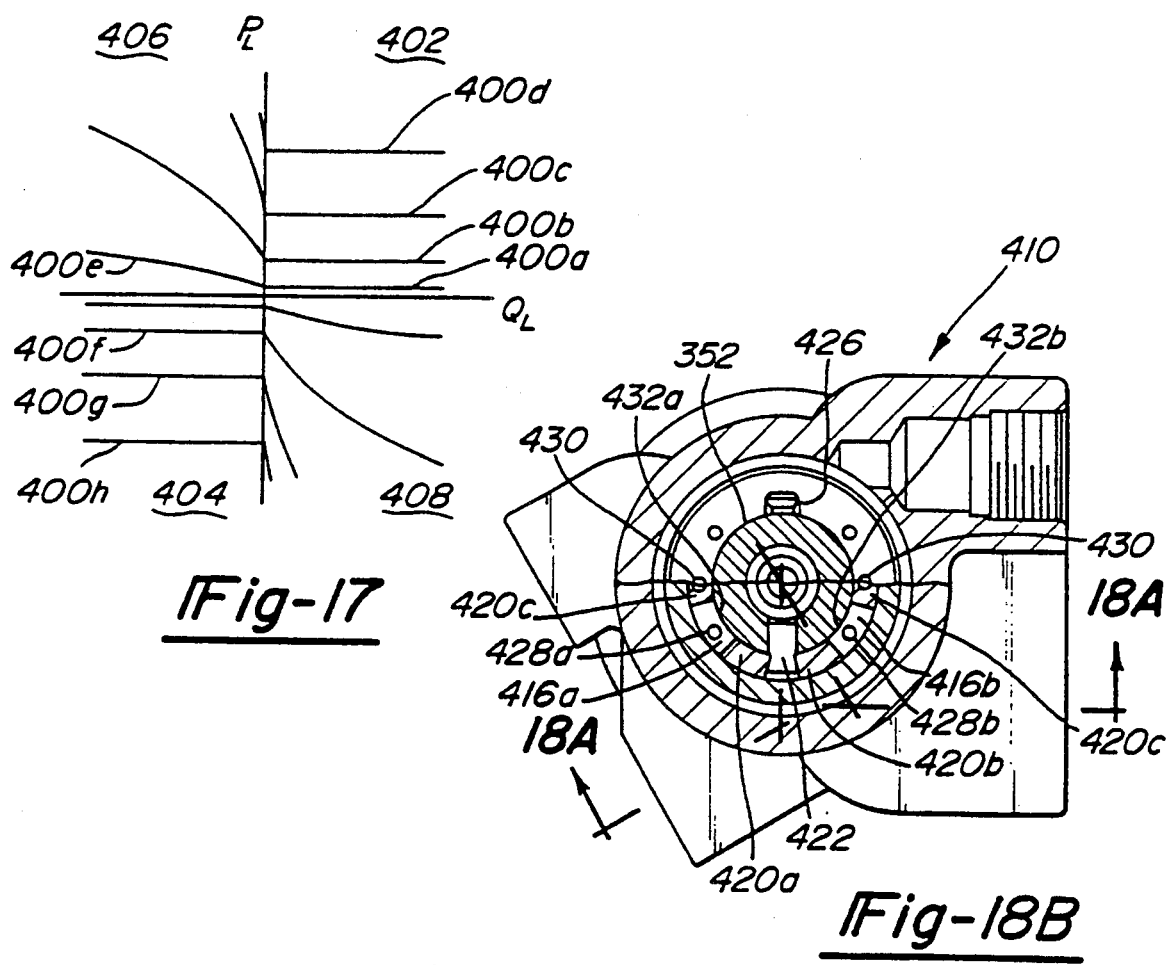
Fig-17
Fig-18B
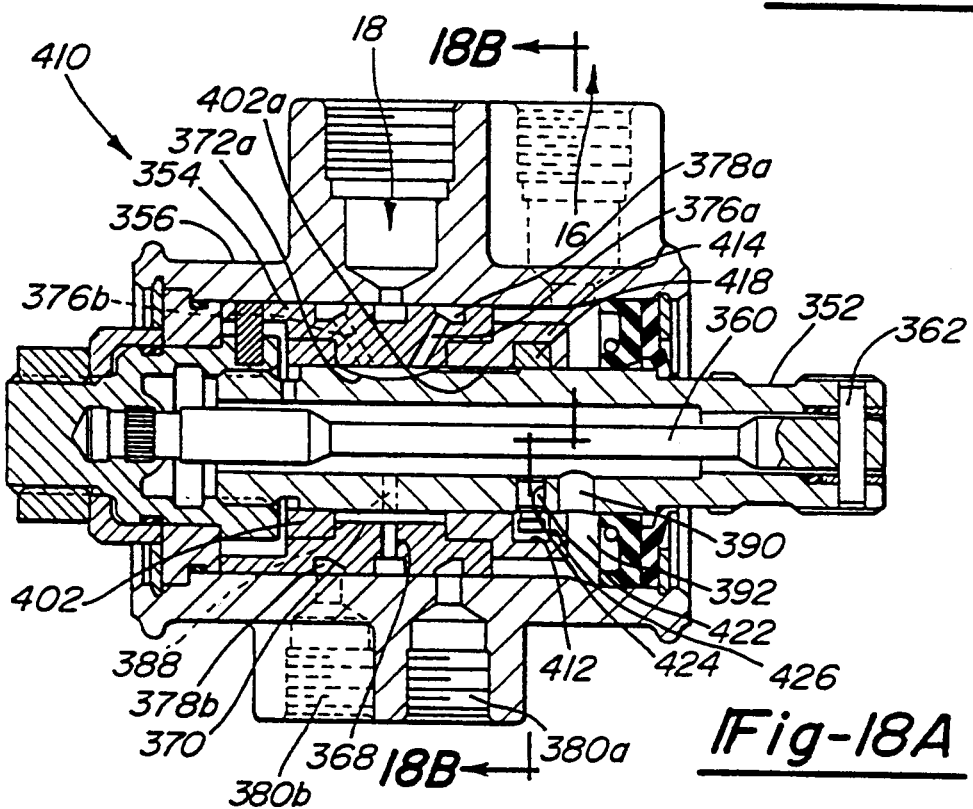
Fig-18A

CONTROL VALVE FOR BOOTSTRAP HYDRAULIC SYSTEMS

CROSS-REFERENCE TO RELATED APPLICATIONS

The present application is a continuation-in-part of U.S. Ser. No. 07/698,601 filed May 10, 1991 and entitled "BOOTSTRAP HYDRAULIC SYSTEMS".

BACKGROUND AND SUMMARY OF THE INVENTION

The present invention relates generally to hydro-mechanical and electro-hydro-mechanical systems commonly utilized for positioning mechanical objects (which complete systems will hereinafter be called "control systems").

Most control systems typically utilize a control valve for selectively controlling the application of pressurized hydraulic fluid to the input ports of power output transducer. The power output transducer is operable for positioning the mechanical objects in response to the pressurized hydraulic fluid acting thereon. In addition, control systems often include feedback elements which are used for establishing a "reference" position for the control valve in order to form a closed-loop servo system. conventional control systems generally include a pumping apparatus for supplying the pressurized hydraulic fluid at either a substantially constant pressure (hereinafter called "constant pressure systems") or a substantially constant flow rate (hereinafter called "constant flow systems").

Constant pressure systems are the most common. The control valves in constant pressure systems are utilized to control hydraulic fluid flow (hereinafter "load flow") to the input ports of the power output transducers. If the control valve of a constant pressure system is zero-lapped then only leakage amounts of hydraulic fluid will be consumed whenever the control valve is centered. Furthermore, if the constant pressure system includes a feedback element for establishing a reference position for the control valve, then the constant pressure system will achieve its final position, with respect to the reference position, substantially without error.

Two methods of supplying hydraulic fluid at a substantially constant pressure (hereinafter "supply pressure") to the control valve are commonly utilized in constant pressure control systems. The simplest method utilizes a full-flow constant displacement pump, which supplies the hydraulic fluid at a nominally constant output flow rate, in conjunction with a relief valve that is used for setting the desired supply pressure. The relief valve is adapted to bypass surplus hydraulic fluid (i.e. that quantity of hydraulic fluid not utilized by the control system's power output transducer) to a reservoir with a pressure drop that is substantially identical to the desired supply pressure. Such a full-flow pump assembly is fully described in U.S. Pat. No. 3,048,119 entitled Air-Cooled Pump Assembly For Hydraulic Fluid And The Like by C. W. Tydeman that issued on Aug. 7, 1962. As disclosed therein, such full-flow pump assemblies are extremely inefficient and must be capable of thermally dissipating the full output power of the pump.

A more efficient method of maintaining the desired supply pressure is to utilize a flow regulating pump assembly which includes a variable displacement pump. The volumetric output of the variable displacement pump is selectively regulated to match the load flow and thereby achieve the desired supply pressure. Thus, energy losses are minimized. However, since most control systems are subject to widely fluctuating load pressures and virtually all of the energy represented by the product of load flow and the difference between the supply pressure and load pressure is converted to thermal energy, even a control system incorporating such a flow-regulated pump assembly can be quite inefficient.

Typical examples of control systems that are subject to such widely fluctuating load pressures are fully described in U.S. Pat. No. 3,048,119 as well as U.S. Pat. No. 3,145,597 entitled Hydraulically Operated Tracer Assembly For Engine Lathes, by C. W. Tydeman which issued on Aug. 25, 1964. FIG. 11 of U.S. Pat. No. 3,145,597 shows a zero-lapped four-way control valve in an open position. Load flow through such a control valve varies with respect to load pressure according to a square root law (i.e. with respect to the difference between the supply pressure and the load pressure) for any particular valve opening.

Thus, it is apparent that the valve opening must be altered in order to maintain constant load flow in the face of a varying load pressure. In the case of the tracer assembly described in U.S. Pat. No. 3,145,597, this means that deflection of the control valve will vary as a function of the cutting load imposed upon an associated cutting tool for any particular nonzero tracer velocity. As such, constant pressure systems have an error signal which suffers modulation as a function of control system load for any non-zero value of control system output velocity.

Constant flow systems are typically utilized for vehicular power steering systems. Control valves utilized in such power steering systems are severely underlapped (i.e. having an open-center configuration) in order to provide passage of the hydraulic fluid without generating an objectionable parasitic pressure loss. This permits the utilization of simple constant displacement pumps with concomitantly minimized average power consumption. However, this also typically results in control characteristics wherein valve deflection primarily regulates load pressure rather than load flow. Furthermore, the load pressure is generally highly nonlinear with respect to valve deflection. U.S. Pat. No. 4,460,016 entitled Rotary Servo valve by Haga et al, issued Jul. 17, 1984 discloses the various factors relating to these control characteristics. Thus, such control systems are typically subject to large position error even under relatively light steering loads.

These performance characteristics, associated with most conventional vehicular power steering systems, substantially conform to a type "0" servo system as defined in a book entitled FEEDBACK AND CONTROL SYSTEMS by Di Stefano III, Stubberud and Williams and published as one of Schaum's Outline Series in Engineering by McGraw-Hill. In general, type "0" servo systems are subject to a fixed value of steady state position error and a totally undefined velocity error when subject to steady state loads. Alternatively, it is desirable to configure a vehicular power steering systems as a type "1" servo system. This is because type "1" servo systems have zero position error and a fixed value of velocity error when subject to steady state loads. In any case, the result (with rotary valve equipped power steering systems) is often a feeling of "play" with concomitant "wander" of a host vehicle when the vehicle is subject to transient load conditions (i.e. such as intermittent side winds or uneven road surfaces).

For this reason some vehicular power steering systems incorporate mechanically interlocking over-ride mechanisms whereby direct coupled manual steering is engaged at light steering loads. However, even such vehicular power steering systems have degraded road feel when compared to manual steering systems. This is because of the parasitic drag associated with various components (i.e. hydraulic power cylinder, seals and the like) and a highly non-linear transition from manual steering to power assisted steering at a selected value of steering load.

Accordingly, the present invention includes various embodiments of control systems having a pumping apparatus which supplies pressurized hydraulic fluid at variable pressures that are selectably related to load pressure. In a first series of embodiments, any one of a series of pressure regulating valve assemblies is used to selectively by-pass excess hydraulic fluid flow from a pump. This is done in a manner which develops a supply pressure that nominally obeys the equation:

$$P_s = K_1 |P_L| + \Delta P$$

where $P_s$ is the supply pressure, $|P_L|$ is the absolute value of load pressure, $K_1$ is a selected proportionality factor (whose value is usually selected to be 1.0 or very slightly higher in order to compensate for the effects of system leakage and losses) and $\Delta P$ is a desired minimum value of $P_s$ present at a zero value of $P_L$. Thus, the pressure drop through the control valve is maintained at a nominally constant value equal to the difference between the supply pressure and the load pressure.

As will be described below, the nominally constant pressure drop across the control valve results in a more nearly constant, or "stiffer", control valve flow control characteristic with respect to changes in load pressure. In this regard it is similar to a positive feedback technique commonly called "bootstrapping" which is utilized to "stiffen" the output voltage of electronic amplifiers. Because of functional similarity between the bootstrap electronic amplification technique and the control systems to be described hereinbelow, control systems having the pumping apparatus supplying pressurized hydraulic fluid at variable pressures that are selectably related to load pressure will hereinafter to be called "bootstrap control systems". Moreover, bootstrap control systems which use pressure regulating valve assemblies to selectively by-pass excess hydraulic fluid are hereinafter referenced to as "by-pass bootstrap systems".

In a second series of embodiments, any one of the first series of pressure regulating valve assemblies, as modified for significantly lower flow, is utilized for selectively controlling the volumetric output of a variable displacement pumping apparatus, with these control systems hereinafter being called "regulated bootstrap systems". This is done in a manner whereby the supply pressure substantially obeys the above equation, and concomitantly, load flow is substantially matched by pump volumetric output.

By-pass and regulated bootstrap systems usually incorporate control valves that are zero lapped or over-lapped (i.e. closed-center) such that valve leakage is minimal. Since supply pressure is virtually always maintained at a minimum level necessary for control valve function in a bootstrap control system, efficiency is substantially improved when compared to a conventional constant pressure system. In fact, efficiencies in a regulated bootstrap system can even approach those commonly associated with pulse-width modulated electronic servo systems.

Since the difference between the supply pressure and the load pressure is nominally constant regardless of the load value (for positive loads), constant load flow can be substantially maintained without changing valve opening. Therefore, the value of the error signal is substantially a function of control system output velocity. Thus, in "bootstrap" systems the error signal does not suffer modulation in the face of changing control system load values. In the case of the tracer assembly cited above, this would mean that there would be virtually no supplemental deflection of its stylus as a function of cutting load if that tracer assembly were re-configured as a bootstrap system.

Constant pressure systems are often configured with more than one control valve-power output transducer sub-system. The bootstrap systems of the present invention can be configured in this manner as well. More specifically, multiple by-pass bootstrap systems can utilize one prime mover-pump assembly via incorporating a flow divider. Likewise, multiple regulated bootstrap systems can be implemented by utilizing one prime mover to drive a ganged assembly of variable displacement (i.e. vane type) pumps. In either case, separate hydraulic circuits are used for each control valve-power output transducer sub-system.

According to another feature of the present invention, a four-way control valve of the type preferably utilized in the aforementioned bootstrap system is disclosed. The four-way control valve features zero-lapped or slightly over-lapped control orifices (i.e. it is a closed-center four-way control valve). Because of its closed-center design, valve deflection of the four-way control valve is primarily determined by load flow rather than load pressure. A primary benefit gained thereby is nominally zero valve deflection for any static load, even when used in constant flow bootstrap systems. Thus, when such constant flow bootstrap systems are incorporated into closed-loop servo systems, the resulting performance substantially conforms to that of type "1" servo systems as mentioned above.

The four-way control valve is generally a modified rotary valve and, more particularly, is normally configured as a progressive rotary valve wherein the valve rotor and/or sleeve slots are formed such that the orifice width increases as valve deflection increases. This results in a progressively increasing velocity gain factor for the four-way control valve which allows both precise fine control and rapid full input motions. This progressive design characteristic can be effected via forming either of the valve rotor and/or sleeve slots with a helix angle so that a triangular orifice area is generated concomitant with valve deflection. Alternately, triangular or trapezoidal imprinting of edges of straight valve rotor slots may be performed.

When the four-way control valve of the present invention is utilized in a vehicular power steering system, the primary tactile feedback is related to steering wheel rotational velocity as opposed to steering force. Such tactile feedback can be thought of as "negative rate" feedback. Looked at another way, this primary steering characteristic is actually a positive real value of steering impedance as determined by steering wheel torque divided by steering wheel velocity. This novel steering characteristic is desirable because of its fundamentally stable feel as opposed to a "spring-like" feel (i.e. a negative imaginary value of steering impedance) present with many rotary valve equipped power steering systems.

Accordingly, a first preferred power steering system described herein is a hydro-mechanical by-pass bootstrap system. Another preferred power steering system is a hydro-mechanical constant pressure system that is useful when it is desired to implement the power steering system with an existing constant pressure hydraulic fluid supply (i.e. such as ABS brakes, automatic ride control or miscellaneous hydraulically powered equipment).

Another preferred power steering system comprises an electrically powered vehicular power steering system wherein a regulated bootstrap system is utilized. In the electrically powered vehicular power steering system a controller provides an electrical power signal to a motor driven pump in order to selectively control volumetric hydraulic fluid output.

According to yet another feature of the present invention, an improved open-center four-way control valve of the type preferably adapted for incorporation into one of the aforementioned bootstrap hydraulic systems is disclosed. More specifically, the improved open-center four-way control valve is particularly well-suited for use in vehicular power steering systems which are arranged as hydro-mechanical by-pass bootstrap systems. Since hydro-mechanical by-pass bootstrap systems are designed to develop a "controlled" supply pressure, the improved open-center four-way control valve includes control orifices that are uniquely configured to generate superior static and dynamic performance characteristics. More particularly, the rotor slots are formed in the valve spool such that the orifice width increases in non-linear fashion with respect to valve deflection. Furthermore, such performance improvements can be realized without the necessity of incorporating a reaction torque device into the bootstrap system.

The present invention is also directed to a simplified pressure regulating valve assembly featuring a mechanical configuration having fewer parts. As such, fluid flow is directed in a generally axial manner through two substantially identical pressure regulating sub-assemblies.

Finally, a further simplified control system for use as a vehicular power steering system is disclosed in which check valves are used to select the higher one of the two output pressures delivered by the open-center four-way control valve. In operation, the higher pressure is used to control a single pressure regulating sub-assembly. Hydraulic fluid flows in a continuous manner (in low volume) through either of the check valves in order to continuously sample the higher pressure. Thereafter, the hydraulic fluid flows back to the system's reservoir via an orifice located in the pressure regulating sub-assembly. Fluid flow through the orifice also permits "reverse" stroking of the pressure regulating sub-assembly by relieving an otherwise naturally occurring hydrostatic lock. Continuous flow of hydraulic fluid is permitted by modifying the flow orifices in the open-center four-way control valve such that the resulting unbalanced fluid flow therethrough does not significantly upset the balanced pressure drops required for proper operation of the simplified bootstrap control system.

Other features, objects and advantages of the present invention will become readily apparent to one skilled in the art upon analysis of the following written description taken in conjunction with the accompanying drawings and appended claims.

BRIEF DESCRIPTION OF THE DRAWINGS

FIG. 14 is a schematic illustration of a variable displacement pump for use with the regulated bootstrap system of FIG. 11;

FIG. 15 is a graph representing the relationship between supply pressure and load pressure in the bootstrap systems of the present invention;

FIG. 17 is a graph of the pressure vs flow curves illustrating the hydraulic performance of the bootstrap systems of the present invention;

FIGS. 18A and 18B are sectional views of a reaction torque device which is incorporated into the balanced four-way control valve of FIG. 16;

DETAILED DESCRIPTION OF THE PREFERRED EMBODIMENTS

Figure 1:
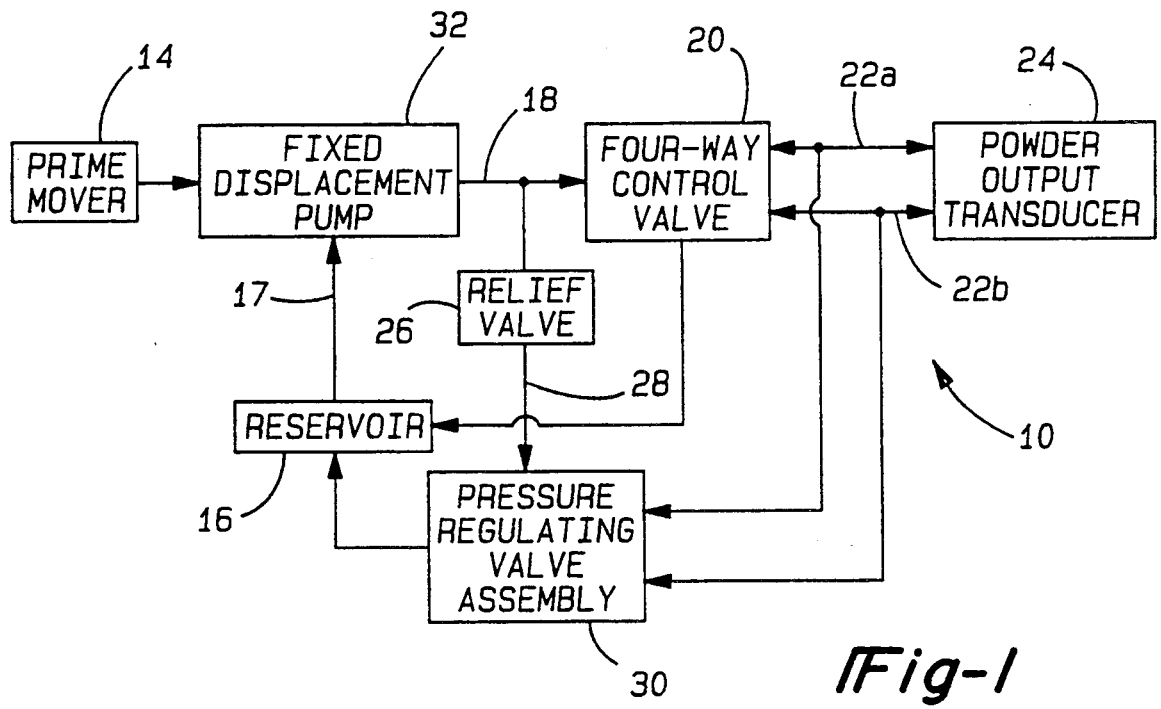
FIG. 1 is a block diagram of a hydro-mechanical by-pass bootstrap system according to the present invention.
Figure 2:
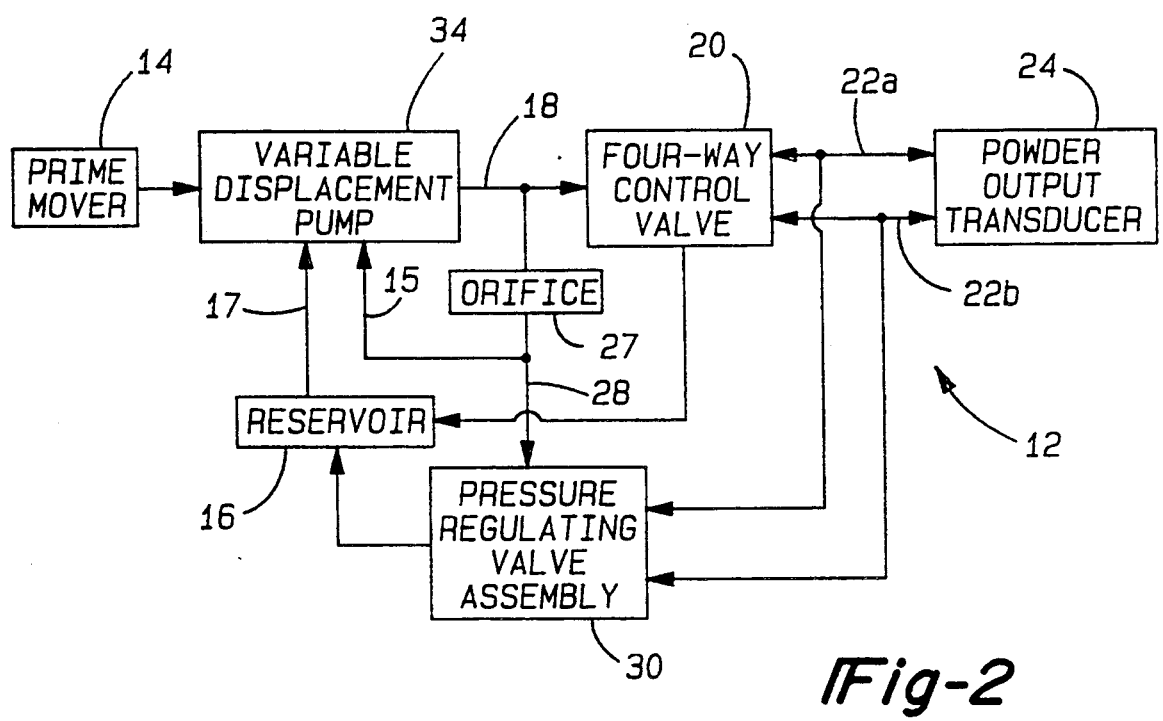
FIG. 2 is a block diagram of a hydro-mechanical regulated bootstrap system according to the present invention.

With particular reference to FIGS. 1 and 2 of the drawings, block diagrams are shown for a "by-pass" bootstrap hydraulic system 10 and a "regulated" bootstrap hydraulic system 12, respectively. Common to both systems are a prime mover 14, a reservoir 16, a reservoir delivery line 17, a pump delivery line 18, a four-way control valve 20, first and second load lines 22a and 22b, respectively, a power output transducer 24, an input line 28, and a pressure regulating valve assembly 30.

In "by-pass" bootstrap system 10 of FIG. 1, prime mover 14 drives a fixed displacement pump 32 which draws hydraulic fluid from reservoir 16 through reservoir delivery line 17 and pumps pressurized hydraulic fluid into pump delivery line 18. Pump delivery line 18 is in fluid communication with both control valve 20 and pressure regulating valve assembly 30 via a relief valve 26 and input line 28. Relief valve 26 can be of any known form and is set to a selected value of differential pressure (which is generally a very nominal value such as only 50 psi) so that the pressure of the hydraulic fluid flowing therethrough is reduced by substantially that selected value of differential pressure.

In response to a relative position difference between a control input and feedback input (if feedback is utilized to configure by-pass bootstrap system 10 as a feedback control system), control valve 20 controls the hydraulic fluid flow or "load flow", derived from pump delivery line 18 and returned to reservoir 16, between first and second load lines 22a and 22b, respectively, to power output transducer 24 in a conventional manner. Concomitantly, the fluid pressure present in each of first and second load lines 22a and 22b, respectively, is differentially applied to pressure regulating valve assembly 30. Pressure regulating valve assembly 30 is operable to selectively by-pass hydraulic fluid (in a manner to be fully described below in conjunction with several various embodiments of pressure regulating valve assembly 30) delivered from pump delivery line 18, via relief valve 26 and input line 28, to reservoir 16 such that the fluid pressure in pump delivery line 18 nominally conforms to the following relation:

$$P_S = K_1 |P_L| + \Delta P, \qquad (1)$$

where $P_S$ is the supply pressure present in pump delivery line 18, $|P_L|$ is the absolute value of the "load pressure" (i.e. the absolute value of the pressure differential between load lines 22a and 22b) $K_1$ is a selected proportionality factor (whose value is usually selected to be 1.0 or very slightly higher in order to compensate for the effects of system leakage and losses) and $\Delta P$ is a desired minimum value of $P_S$ at a zero value of $P_L$ ($\Delta P$ being mostly determined by pressure drop through relief valve 26). Thus, the fluid pressure (the supply pressure $P_S$) in pump delivery line 18 is nominally maintained at a value equal to the sum of the load pressure and $\Delta P$.

As noted above, the function of relief valve 26 is to cause the supply pressure in pump delivery line 18 to be selectively elevated to a value in excess of the load pressure. Thus in deriving the formulas shown below, it makes no difference whether relief valve 26 is located between pump delivery line 18 and input line 28 as shown in FIG. 1, or between pressure regulating valve assembly 30 and reservoir 16. In fact, locating relief valve 26 between pressure regulating valve assembly 30 and reservoir 16 will result in back pressure being applied to pressure regulating valve assembly 30. This has a beneficial effect in that it reduces cavitation at the flow control orifices of pressure regulating valve assembly 30.

In "regulating" bootstrap system 12 of FIG. 2, prime mover 14 drives a variable displacement pump 34 which draws hydraulic fluid from reservoir 16 through delivery line 17 and pumps the pressurized hydraulic fluid into pump delivery line 18. Pump delivery line 18 is in fluid communication with both control valve 20 and pressure regulating valve assembly 30 via an orifice, schematically shown at 27, and input line 28. The function of orifice 27 is to selectively limit the flow of hydraulic fluid through pressure regulating valve assembly 30.

In response to a relative position difference between a control input and feedback input (if feedback is utilized to configure regulating bootstrap system 12 as a feedback control system), control valve 20 controls the load flow, derived from pump delivery line 18 and returned to reservoir 16, between first and second load lines 22a and 22b, respectively, to power output transducer 24. Concomitantly, pressures present in first and second load line 22a and 22b, respectively, are differentially applied to pressure regulating valve assembly 30 (which is usually modified for significantly lower hydraulic fluid flow values as determined by flow characteristics of orifice 27). Pressure regulating valve assembly 30 selectively by-passes the hydraulic fluid delivered from pump delivery line 18, via orifice 27 and input line 28, to reservoir 16 such that the fluid pressure in input line 28 nominally conforms to the following relation:

$$P_I = K_1 |P_L| \qquad (2)$$

where $P_I$ is the pressure in input line 28, and $|P_L|$ and $K_1$ retain their definitions as described above. In addition, conduit 15 is shown as providing fluid communication between input line 28 and variable displacement pump 34. Moreover, the displacement of variable displacement pump 34 is varied such that the supply pressure $P_S$ in pump delivery line 18 is equal to $P_L$ plus a desired value of $\Delta P$. Thus, the fluid pressure in pump delivery line 18 is again nominally maintained at a value equal to the sum of the load pressure and $\Delta P$.

Figure 3B:
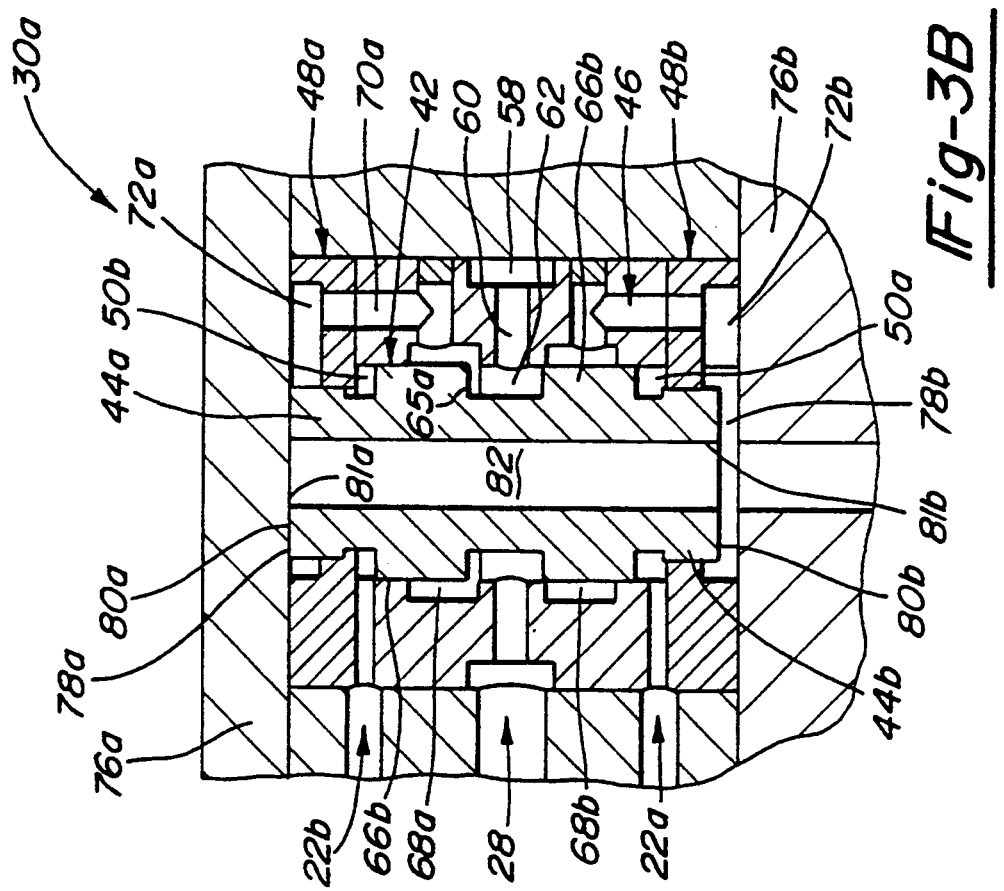
FIGS. 3A and 3B are partial sectional views of a first embodiment of the pressure regulating valve assembly shown in FIGS. 1 and 2.
Figure 3A:
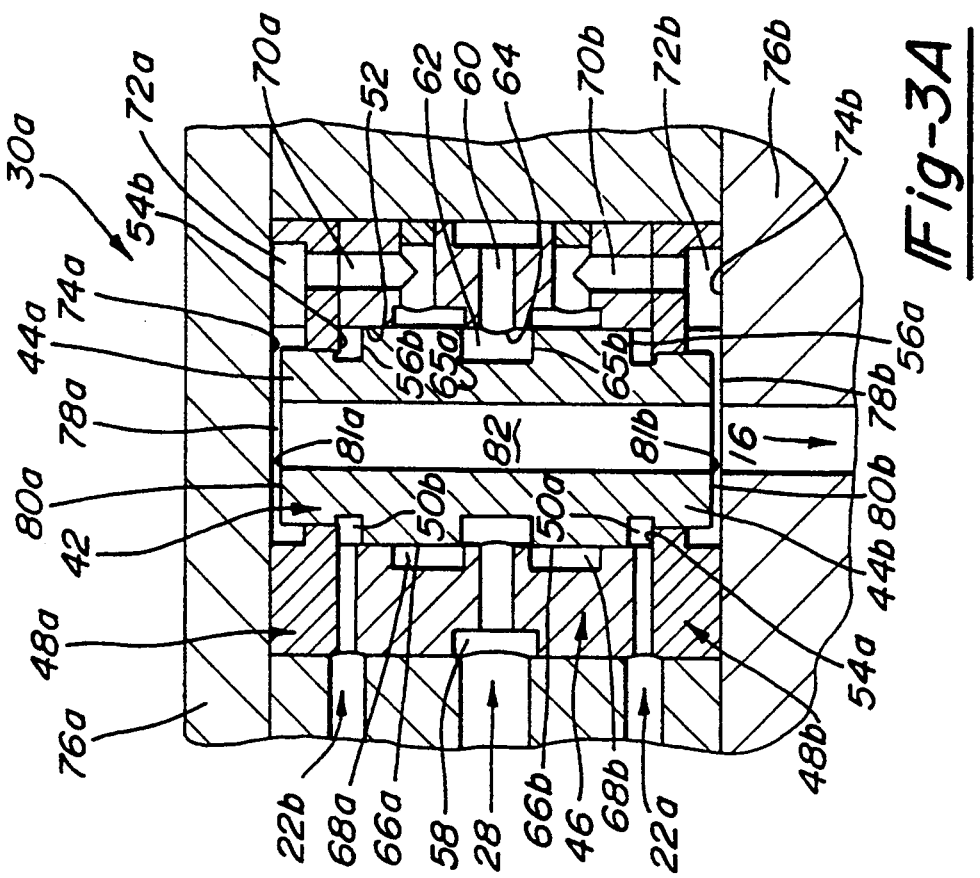

With reference now to FIGS. 3A and 3B, a first embodiment of a pressure regulating valve assembly 30a is presented. As will become apparent, a variety of valve configurations can be interchangeably utilized as pressure regulating valve assembly 30 of FIGS. 1 and 2. While each is considered to be inventive in its own right, a choice of a particular one is considered to be a design choice and not restrictive upon the novelty of either of by-pass or regulating control systems 10 or 12, respectively. However, several of the pressure regulating valve assemblies to be disclosed are unique in that they regulate an input pressure value as a selected function of the absolute value of the difference between first and second line pressures.

In pressure regulating valve assembly 30a, a stepped valve spool 42 having first and second reduced diameter end pistons 44a and 44b, respectively, is positioned concentrically within a valve sleeve 46 and first and second output cylinder sleeves 48a and 48b, respectively, in a cloae-fitting but axially slidable manner. First and second load lines 22a and 22b, respectively, are shown to communicate with first and second control cylinders or chambers 50a and 50b, respectively. First and second control chambers 50a and 50b, respectively, are defined by an inner cylindrical bore 52 of valve sleeve 46, the inside lateral faces 54a and 54b, respectively, of second and first output cylinder sleeves 48b and 48a, respectively, and first and second radial shoulders 56a and 56b, respectively, of stepped valve spool 42.

With particular reference to FIG. 3A, stepped valve spool 42 is shown in a roughly centered position as when the load pressure is relatively low. In this position, hydraulic fluid entering pressure regulating valve 30a from input line 28 flows around an annular input groove 58, through a plurality of radial input holes 60 into a spool port channel or groove 62 formed in a central portion of stepped valve spool 42. Spool port groove 62 is located generally adjacent to and is formed slightly longer than stepped sleeve land 64. The fluid in spool port groove 62 flows through first and second axial gaps 65a and 65b formed between first and second spool lands 66a and 66b, respectively, and sleeve land 64, and into first and second annular sleeve port grooves 68a and 68b, through a plurality of axially extending first and second output ports 70a and 70b, and into first and second output cylinders or chambers 72a and 72b, respectively. First and second output chambers 72a and 72b, respectively, are formed between first and second output cylinder sleeves 48a and 48b, respectively, inside lateral surfaces 74a and 74b, respectively, of first and second end plates 76a and 76b, respectively, and the outer circumferences of the first and second reduced diameter end pistons 44a and 44b, respectively. The hydraulic fluid then flows radially inward through first and second annular passages 78a and 78b formed between the inside lateral surface 74a and 74b, respectively, and opposite end surfaces 80a and 80b, respectively, of stepped valve spool 42 through first and second circumferential exit nozzles 81a and 8b to a return passage 82 formed within valve spool 42 and finally on to reservoir 16.

By selecting adequate port and flow line capacity, energy loss is substantially limited to kinetic energy loss incurred upon passage of the hydraulic fluid through first and second axial gaps 65a and 65b, respectively, and first and second circumferential exit nozzles 81a and 81b, respectively. Thus, the pressure drop experienced by hydraulic fluid flowing therethrough is equal in value to $P_1$ and can be simultaneously expressed by:

$$P_I = (w\,Q_1^2/8\pi^2 g)[\{1/a^2(d-x)^2\} + \{1/C_d^2 c^2(e+x)^2\}] \text{ and} \qquad (3)$$

$$P_I = (w\,Q_1^2/8\pi^2 g)[\{1/a^2(d+x)^2\} + \{1/C_d^2 c^2(e-x)^2\}] \qquad (4)$$

where w is the specific weight of the hydraulic fluid, Q1 and Q2 are flow rates through first axial gap 65a and first circumferential exit nozzle 81a, and second axial gap 65b and second circumferential exit nozzle 81b, respectively, g is the acceleration of gravity, a is the radius of return passage 82, c is the radius of bore 52, d is the average effective axial length of first and second circumferential exit nozzles 81a and 81b, respectively, e is the length of the average effective axial lengths of first and second axial gaps 65a and 65b, respectively, $C_d$ is the flow (i.e. contraction) coefficient associated with hydraulic fluid flow through first and second axial gaps 65a and 65b (note fluid flow through first and second circumferential exit nozzles 81a and 81b, respectively, is not subject to a vena contracta so its flow coefficient has a nominal value of 1.0), and x is the axial displacement of stepped valve spool 42 from its centered position toward inside lateral surface 74a. As such, the flow rate Q1 can be found from the equation:

$$Q_1 = Q/\{1 + [\{1/a^2(d-x)^2\} + \{1/C_d^2 c^2(e+x)^2\}]/[\{1/a^2(d+x)^2\} + \{1/C_d^2 c^2(e-x)^2\}]\}^{0.5} \qquad (5)$$

where Q is the total flow rate $(Q_1+Q_2)$. $Q_2$ is, of course, equal to $Q-Q_1$. The pressure difference between the first and second output cylinders 72a and 72b, respectively, can be found from the equation:

$$P_o(W\,8\pi^2 g)[\{Q_1^2/(d-x)^2\} + \{Q_2^2/(d+x)^2\}] \qquad (6)$$

where $P_O$ is the pressure difference between first and second output cylinders 72a and 72b, respectively. And $P_I$ can be found from either of equations (3) or (4).

The net thrust generated by first and second end surfaces 80a and 80b, respectively, can be found by noting that the pressure distributions across first and second annular passages 78a and 78b are determined by Bernoulli's equation. Thus, the net trust so generated is found to be:

$$T = \pi[b^2 - \{1 + 2\ln(b/a)\}a^2]P_0 \qquad (7)$$

where T is the end thrust, and b is the radius of either of first and second reduced diameter end pistons 44a and 44b, respectively. Concomitantly, an opposing force is generated by the load pressure $P_L$ differentially acting upon the lateral areas of first and second shoulders 56a and 56b, respectively, whereby:

$$F=\pi(c^2-b^2)P_L \qquad (8)$$

where F is the opposing force. In operation, any difference between T and F will cause axial movement of stepped valve spool 42 (i.e. a change in the value of x) until T=F.

In FIG. 3B, stepped valve spool 42 is shown in an upward displaced position such as when the load pressure is positive and has a relatively high value. In this position, all of the hydraulic fluid flows through first axial gap 65a, into first sleeve port groove 68a, through first output ports 70a to first output chamber 72a, from where it then flows radially inwardly through first annular passage 78a and first exit nozzle 81a. Therefore, x>e, $Q_1=Q$ and $Q_2=O$. Thus, $$P_I=(WQ^2/8\pi^2g)[\{1/a^2(d-x)^2\}+\{1/C_d^2c^2(e+x)^2\}] \qquad (9)$$

Via symmetry, it can be seen that for a similarly high absolute value of negative load pressure x<−e, $Q_1=O$ and $Q_2=Q$. Thus, in that case:

$$P_I=(WQ^2/8\pi^2g)[\{1/a^2(d+x)^2\}+\{1/C_d^2c^2(e-x)^2\}] \qquad (10)$$

The action of the hydraulic fluid flowing through either of the first or second annular passages 78a or 78b, respectively, in setting values of T=F is actually that of a novel hydrostatic bearing. Because the hydraulic fluid flow is directed radially inwardly, the maximum flow velocity occurs at exit nozzles 81a or 81b. Thus, laminar flow energy loss is negligible as assumed above, and the "flying height" of the hydrostatic bearing is d−|x|. Furthermore, the flying height is stable (i.e. its value does not oscillate) because of "squeeze film damping" which occurs within the appropriate one of first or second annular passages 78a or 78b, respectively.

Figure 4A:
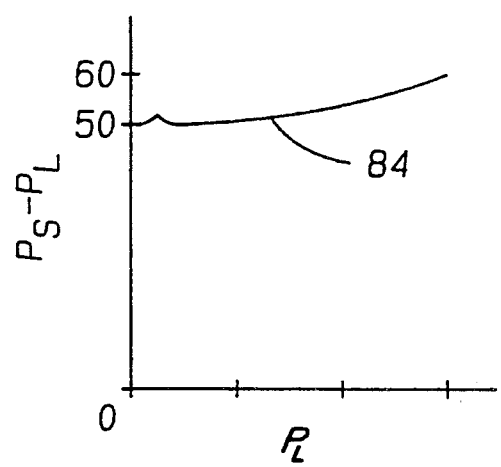
FIGS. 4A, 4B and 4C are graphs depicting various performance characteristics of the pressure regulating valve assembly of FIGS. 3A and 3B.
Figure 4B:
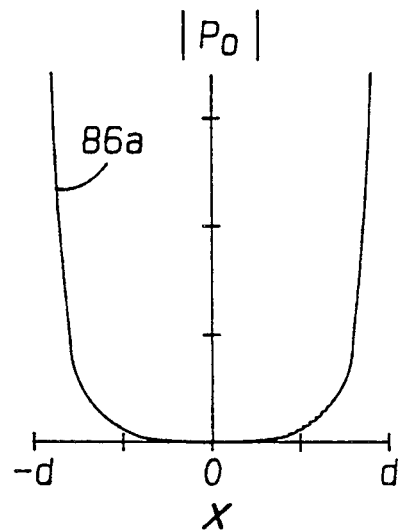
Figure 4C:
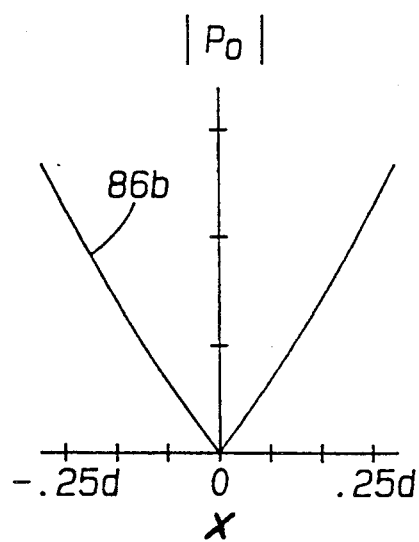

In designing pressure regulating valve assembly 30a, it is desirable to effect a compromise between a given value of $\Delta P$ and the physical size of various valve components and gaps. The manner in which this compromise is effected will result in a suitable mix of both hydraulic and dynamic performance characteristics examples of which are graphically depicted in FIGS. 4A, 4B and 4C. More specifically, FIGS. 4A, 4B and 4C are graphs of $P_S-P_L$ as a function of $P_L$, $P_O$ as a function of x for the range −d<x<d, and $|P_O|$ as a function of x for the range −0.25d<x<0.25d, respectively. For purposes of example only, these graphs utilize the following values for the various design parameters: Q=6[in³/sec], w=0.03lb/in³, g=386.4[in/sec²], $C_d^2$=0.4, a=0.100[in], b=0.2498[in], c=0.3112[in], d=0.014[in], e=0.007[in], $K_1$=1.01 (i.e. $P_I$=1.01 $|P_L|$ or $P_L$=0.99$P_O$), and $P_S$=($P_I$+44)[lb/in²].

As illustrated by curve 84 shown in FIG. 4A, values of $P_S-P_L$ are close to 50 [lb/in²] but increase somewhat at both very low and high values of $P_L$. The increase at low values of $P_L$ is predominantly a function of the values selected for d and e while the increase at high values of $P_L$ is a direct consequence of choosing $K_1$=0.99 rather than 1.0. However, as illustrated by curves 86a and 86b in FIGS. 4B and 4C, respectively, the slope $|dP_O$dx at x=0.0 is about 2400 [lb/in³]. Multiplying this quantity by the lateral area of first and second shoulders 56a and 56b, respectively, $\pi(c^2-b^2)$ (i.e. =0.1082 [in²]) results in a minimum value of axial stiffness of about dF/dx=260[lb/in]. If stepped valve spool 42 is fabricated of steel, then its mass is about 0.000015 [lb sec²/in]. Manipulating these two figures results in a nominal minimum natural frequency of 650[Hz] and a characteristic mechanical impedance of 0.062 [lb sec/in]. Thus, even at x=0.0 [in], adequate response and damping can be anticipated.

In addition to the axial forces described above, it is critical to evaluate the effect of the axial components of flow induced, or Bernoulli, forces acting on the valve. The net axial component of "flow induced" force on stepped valve spool 42 is found to be approximately:

$$\Delta F=0.00002[Q_1^2/\{c(e-x)\}-Q_2^2/\{c(e+x)\}] \qquad (11)$$

where $\Delta F$ is the algebraic sum of flow induced forces on first and second axial gaps 65a and 65, respectively. Because of the relatively low pressure drops therethrough (i.e. due to relatively large values for e), flow induced forces are found to be relatively small. For instance, utilizing the parameter values from the example above results in a maximum value for $\Delta F$ of 0.17[lb] at x=0.007[in]. This value is slightly more than 2% of the value for F (i.e. 7.7 [lb]) obtained at x=0.007[in].

Figure 5:
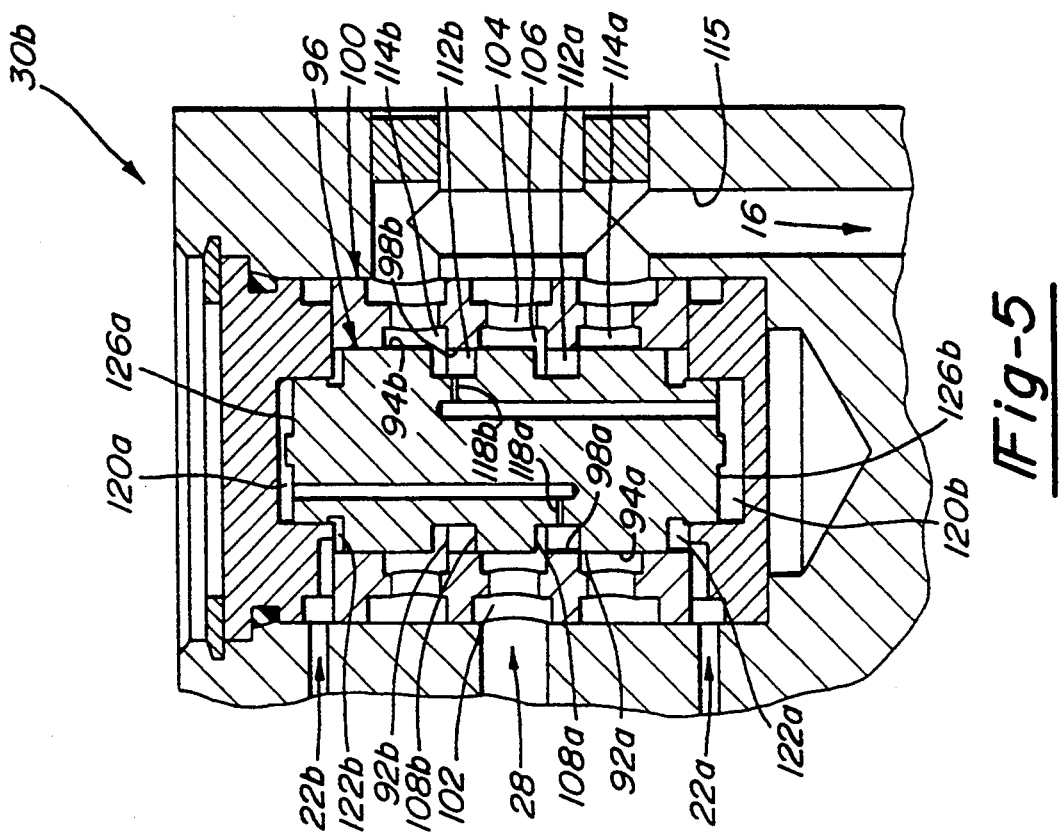
FIG. 5 is a partial sectional view of a second embodiment of the pressure regulating valve assembly.

With reference now to FIG. 5, a second embodiment of a pressure regulating valve assembly 30b is illustrated. In pressure regulating valve assembly 30b, the use of hydraulic fluid flow through either of first or second hydrostatic bearings to set a thrust value T is replaced by utilizing first and second relief orifices 92a and 92b, respectively, for that purpose. First and second relief orifices 92a and 92b, respectively, are located between first and second spool lands 94a and 94b, respectively, that are formed in a stepped valve spool 96, and first and second sleeve lands 98a and 98b, respectively, that are formed in a valve sleeve 100. FIG. 5 illustrates pressure regulating valve assembly 30b being utilized in conjunction with a positive value of load pressure $P_L$. As such, stepped valve spool 96 is shown displaced in an upward direction.

In the position shown, hydraulic fluid entering pressure regulating valve assembly 30b from input line 28 flows around an input groove 102, through multiple input holes 104 into an input port groove 106 formed in valve sleeve 100, through an axial gap 108a formed between a central spool land 110 and first sleeve land 98a. Fluid then flows into a first spool groove 112a through first relief orifice 92a and into a first sleeve port groove 114a from which it is exhausted to reservoir 16 through outlet 115. Concurrently, a small quantity of pressurized hydraulic fluid flows from first spool groove 112a through a first damping orifice 118a to a first pressure sampling chamber 120a for exerting thrust T upon a first end surface 126a of stepped valve spool 96. The thrust T and the opposing force F generated by the load pressure $P_L$ acting between first and second control chambers 122a and 122b, respectively, are balanced by axial movement of stepped valve spool 96 to a position where $P_I$ is substantially equal to $P_L$ as before (with respect to pressure regulating valve assembly 30a) in order to determine $P_I$. The purpose of first damping orifice 118a is to damp out any axial oscillations of stepped valve spool 96 that might occur. Although no corresponding view shows pressure regulating valve assembly 30b being utilized in conjunction with a negative value of $P_L$, it is to be understood that like numbered components designated "b" would simply be interchanged with those designated "a" for that case.

Figure 6:
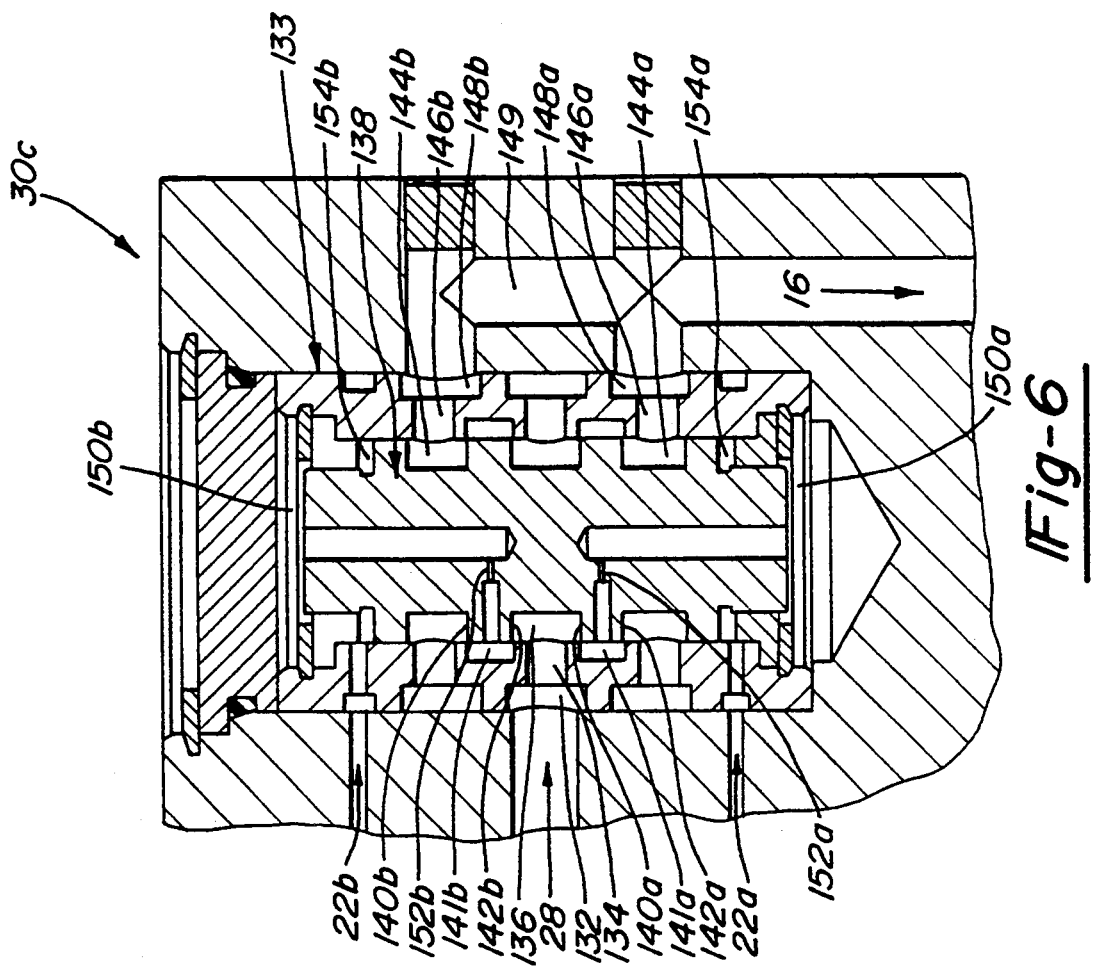
FIG. 6 is a partial sectional view of a third embodiment of the pressure regulating valve assembly.

In each of pressure regulating valve assemblies 30a and 30b, hydraulic fluid flow is blocked by closure of one of axial gap 65a or 65b and 108a or 108b, respectively, in order to reach a high value of pressure in input line 28. With reference now to FIG. 6, a third embodiment of a pressure regulating valve assembly 30c is shown wherein the blocking function is eliminated via directing fluid flow through sequentially positioned positively and negatively closing orifices, and/or negatively and positively closing orifices.

Hydraulic fluid enters an annular input groove 132 formed in a valve sleeve 133 from input line 28 and flows through a plurality of radial input holes 134 to a spool input groove 136 formed in a stepped valve spool 138. The fluid bifurcates and simultaneously flows through first positively closing orifice 140a, first sleeve groove 141a and first negatively closing orifice 142a, and second negatively closing orifice 142b, second sleeve groove 141b and second positively closing orifice 140b where the closing directions are defined relative to motions of valve spool 138 with respect to positive pressure applied between first and second load lines 22a and 22b, respectively. The fluid then returns to reservoir 16 via first and second spool return grooves 144a and 144b, respectively, first and second sets of multiple radial return holes 146a and 146b, respectively, first and second sleeve return grooves 148a and 148b, respectively and finally to outlet 149.

Fluid present in first and second pressure sampling chambers 150a and 150b, respectively, is coupled to the first and second sleeve grooves 141a and 141b, respectively, via first and second damping orifices 152a and 152b, respectively. Concomitantly, the load pressure is differentially applied to first and second control chambers 154a and 154b, respectively, via first and second load lines 22a and 22b, respectively. Thus, the pressure difference between fluid present in the second and first sleeve grooves 141b and 141a, respectively, is nominally equal to the load pressure. Furthermore, by the logic described above with respect to pressure regulating valve assembly 30a, whenever the load pressure varies appreciably from a zero value, valve spool 138 will move far enough off center so that the higher pressure one of the first and second pressure sampling chambers 150a and 150b, respectively, is substantially coupled to input line 28. Thus, input line pressure is nominally equal in value to load pressure as required.

Figure 7:
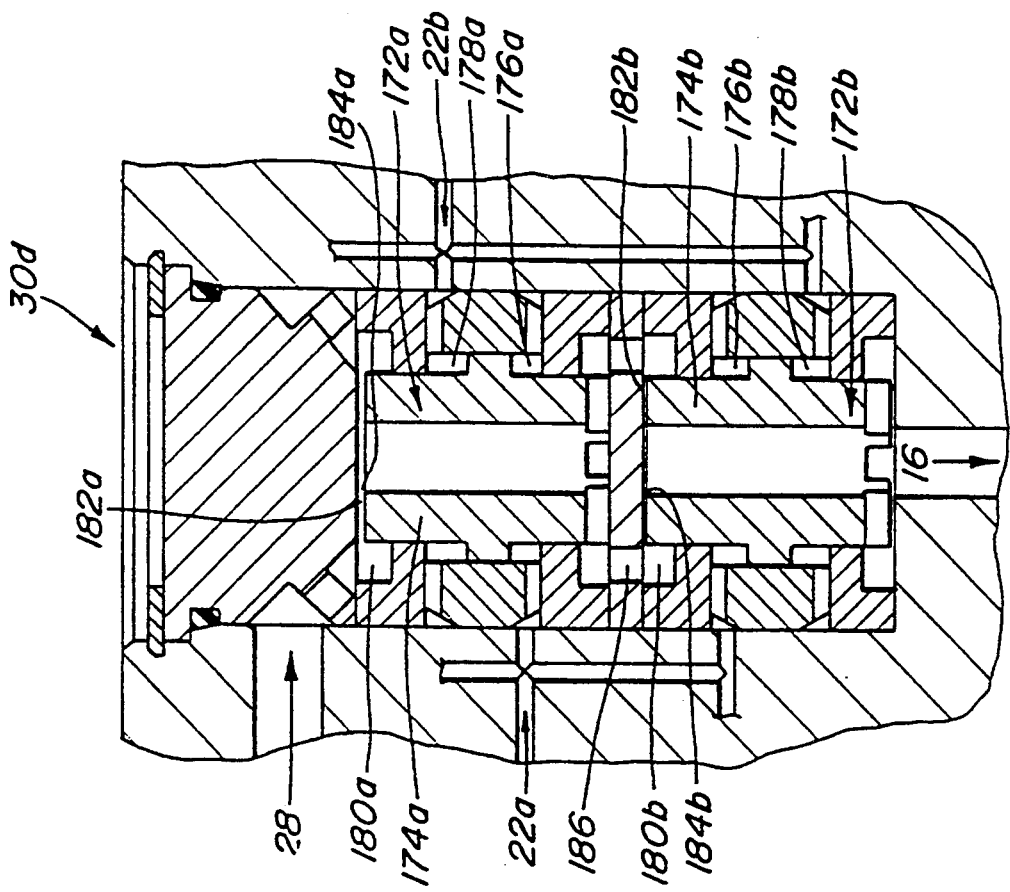
FIG. 7 is a partial sectional view of a fourth embodiment of the pressure regulating valve assembly.

With reference now to FIG. 7, a fourth embodiment of a pressure regulating valve assembly 30d is shown having positive and negative pressure setting valve members 172a and 172b, respectively, disposed in a series arrangement. In operation, either one functions as a pressure setting valve and the other one is merely disposed in a fully open position. More specifically, positive and negative pressure setting valve members 172a and 172b, respectively, are shown in FIG. 7 with their stepped valve spools 174a and 174b, respectively, displaced to positions commensurate with negative load pressure applied between first and second pairs of first and second control chambers 176a and 176b, and 178a and 178b, respectively. In these positions hydraulic fluid enters positive pressure setting valve 172b from input line 28 and flows directly into a first output chamber 180a. Since first stepped valve spool 174a is being urged downward to its maximum open displacement by the negative load pressure applied between first and second control chambers 176a and 178a, respectively, the hydraulic fluid merely flows through a first annular passage 182a and exit nozzle 184a with minimal parasitic pressure drop. The hydraulic fluid then enters a second output chamber 180b via an interconnecting passage 186. Since stepped valve spool 174b is being urged into its pressure regulating position, input pressure is regulated by the negative pressure setting valve 172b until thrust T equals opposing force F as explained above in conjunction with equations (7) and (8) via flow through a second annular passage 182b and exit nozzle 184b.

At zero load pressure, both first and second stepped valve spools 174a and 174b, respectively, are disposed in their fully opened positions. Thus, parasitic pressure drop is minimal in the pressure regulating valve assembly 30d. And, when the load pressure becomes positive, the relative positions of positive and negative pressure setting valves 172a and 172b, respectively, are reversed from those described above and input pressure is regulated by positive pressure setting valve 172a.

Figure 8:
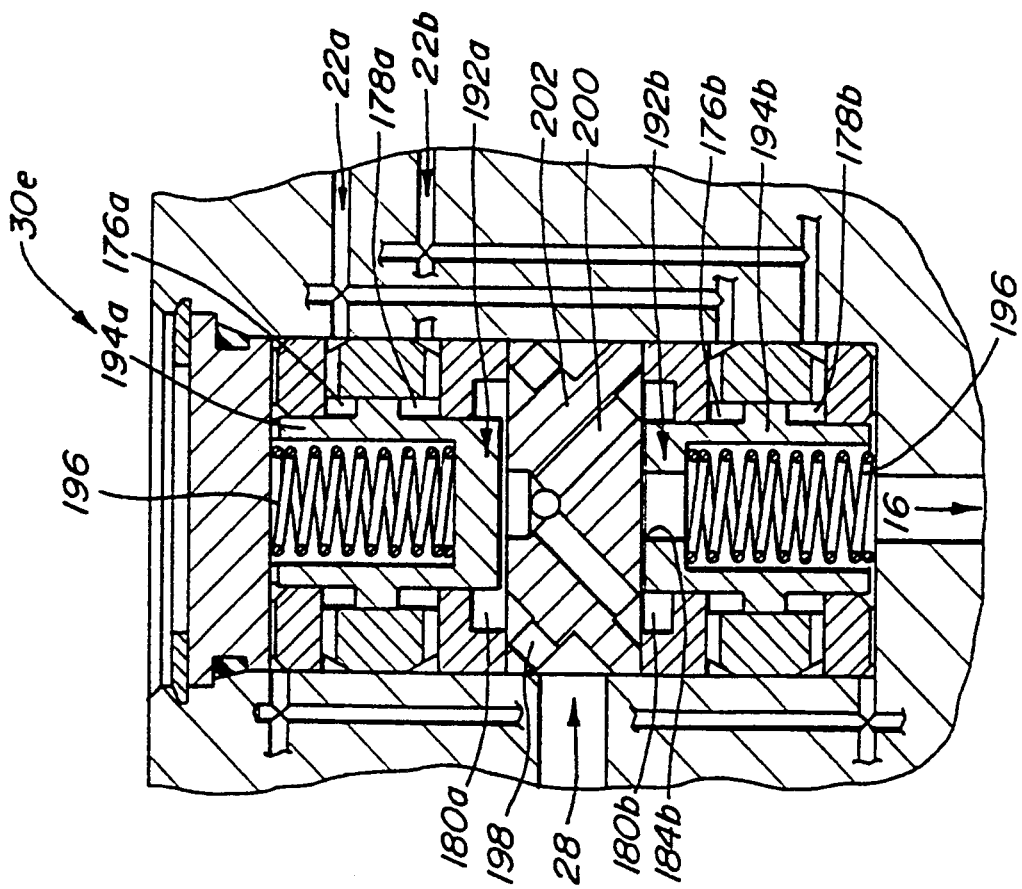
FIG. 8 is a partial sectional view of a fifth embodiment of the pressure regulating valve assembly.

With particular reference now to FIG. 8, a fifth embodiment of a pressure regulating valve assembly 30e is presented which also has positive and negative pressure setting valves 192a and 192b, respectively, with first and second stepped valve spools 194a and 194b, respectively, disposed in a series arrangement. However, in pressure regulating valve assembly 30e, spring members 196 additionally urge first and second stepped valve spools 194a and 194b, respectively, closed such that the pressure drop associated with any value of load pressure additionally causes the pressure drop hereinbefore associated with relief valve 26. Thus, when pressure regulating valve assembly 30e is utilized as pressure regulating valve assembly 30 in by-pass bootstrap system 10, no separate relief valve 26 is required. In addition, input ports 198 and interconnecting passage 200 are shown commonly located in intermediate barrier plate 202. This is illustrious of the variety of design choices possible in selecting features utilized in the pressure regulating valve assembly 30.

Figure 9A:
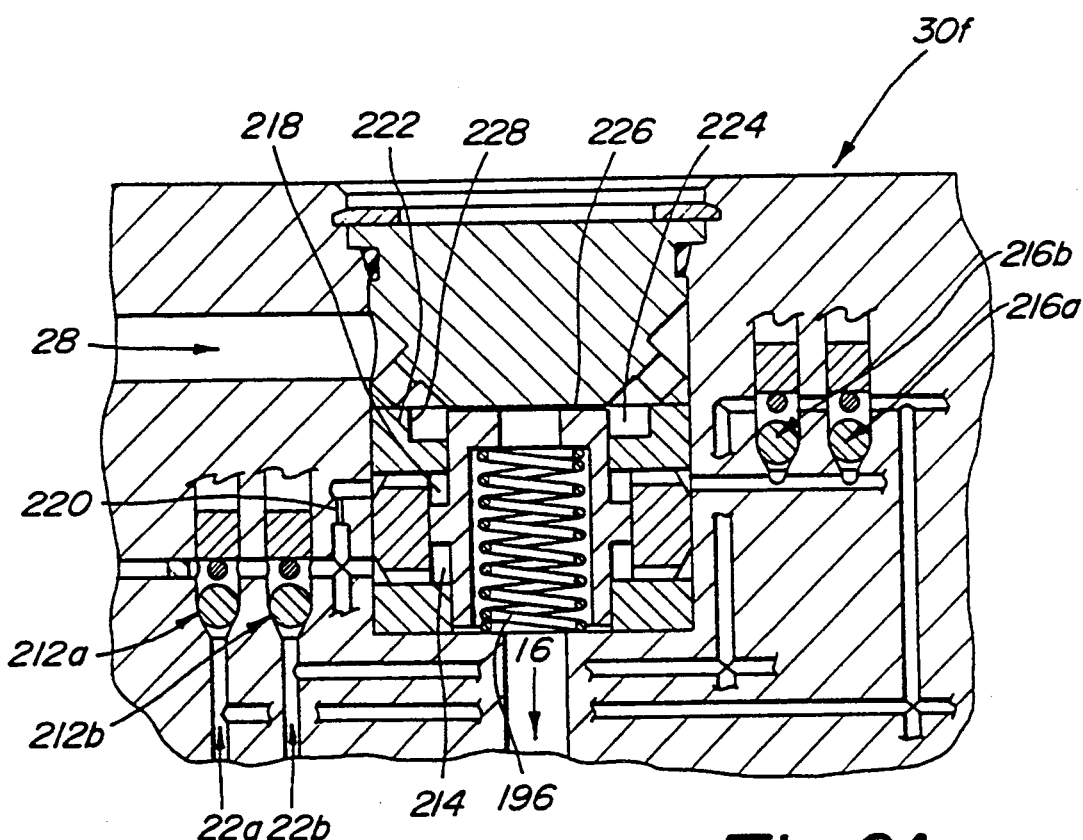
FIGS. 9A and 9B are partial sectional views of a sixth embodiment of the pressure regulating valve assembly.
Figure 9B:
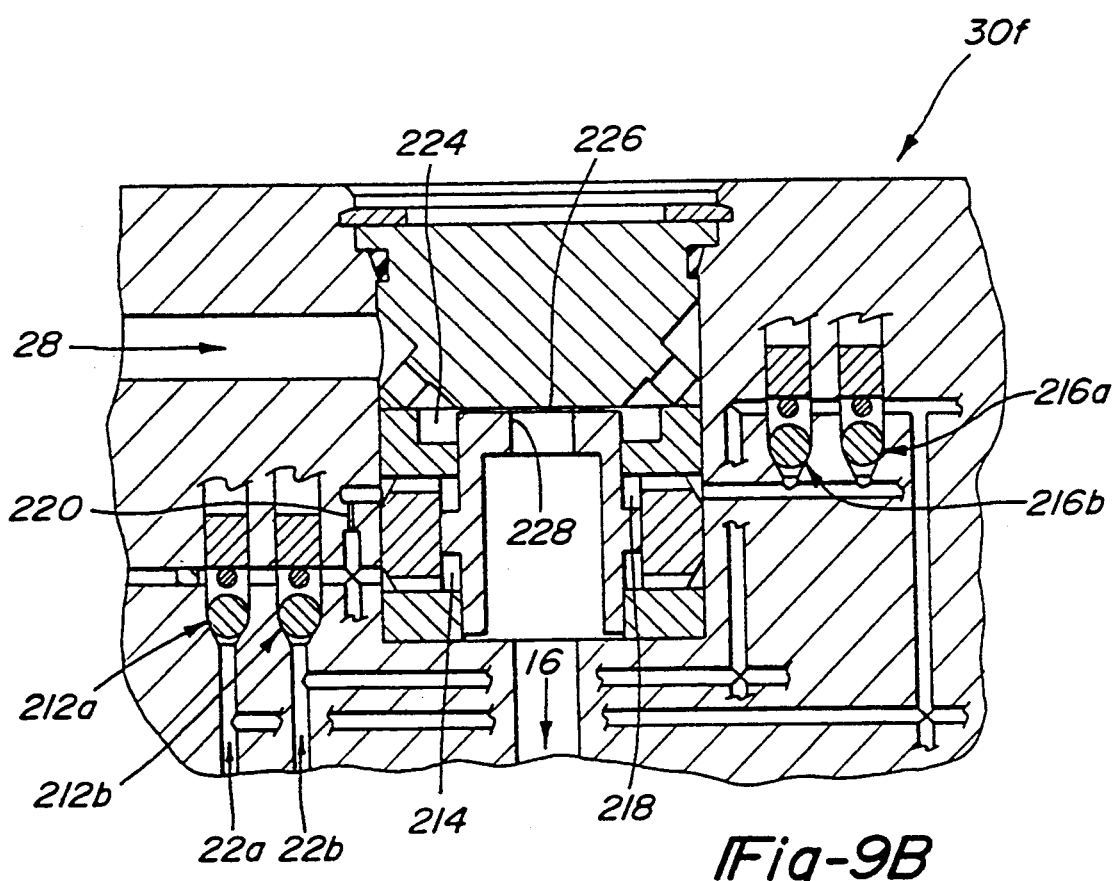

With reference now to FIGS. 9A and 9B, a sixth embodiment of pressure regulating valve assemblies 30f, respectively, is shown. One of first and second positive pressure selection check valves 212a and 212b, respectively, conveys fluid from the higher pressure one of first and second load lines 22a and 22b, respectively, to a high pressure control chamber 214. The other of first and second negative pressure selection check valves 216a and 216b, respectively, conveys fluid to the lower pressured one of first and second load lines 22a and 22b, respectively, from a low pressure control cylinder 218. An orifice 220 allows excess fluid to flow from high pressure control cylinder 214 for allowing stepped valve spool 222 to open when the load pressure is reduced. In addition, orifice 220 allows make-up fluid to enter low pressure control cylinder 218 while allowing stepped valve spool 222 to close when the load pressure is increased. Similar to FIG. 8, spring member 196 urges stepped spool valve 222 to a closed position relative to output chamber 224. As such, pressure regulating valve 30f also develops the pressure drop previously associated with relief valve 26. As is apparent, fluid from input line 28 flows directly into output chamber 224 and, in response to the load pressure acting on valve spool 222, controls flow through annular passage 226 and exit nozzle 228 to reservoir 16. In this manner, pressure regulating valve assembly 30f is well suited for use with by-pass bootstrap system 10 of FIG. 1.

FIG. 9B is substantially identical to FIG. 9A with the exception that spring 196 is removed. As such, pressure regulating valve 30f' is adapted for use with regulated bootstrap system 12 of FIG. 2.

Figure 10:
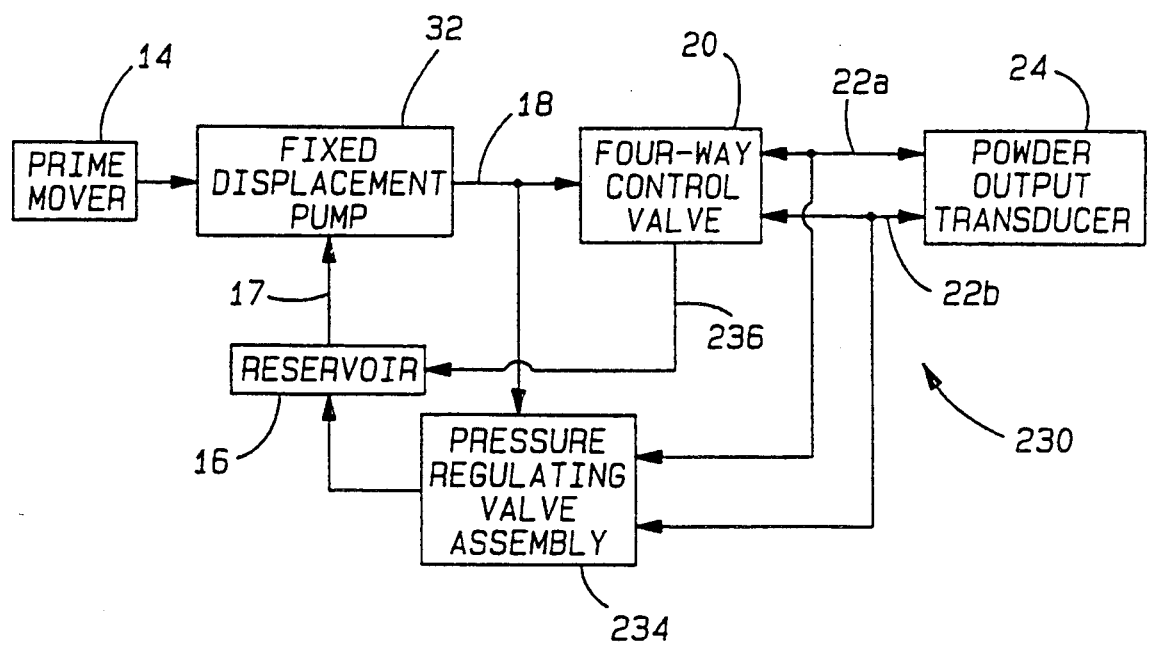
FIG. 10 is a block diagram of a simplified by-pass bootstrap system according to the present invention.
Figure 11:
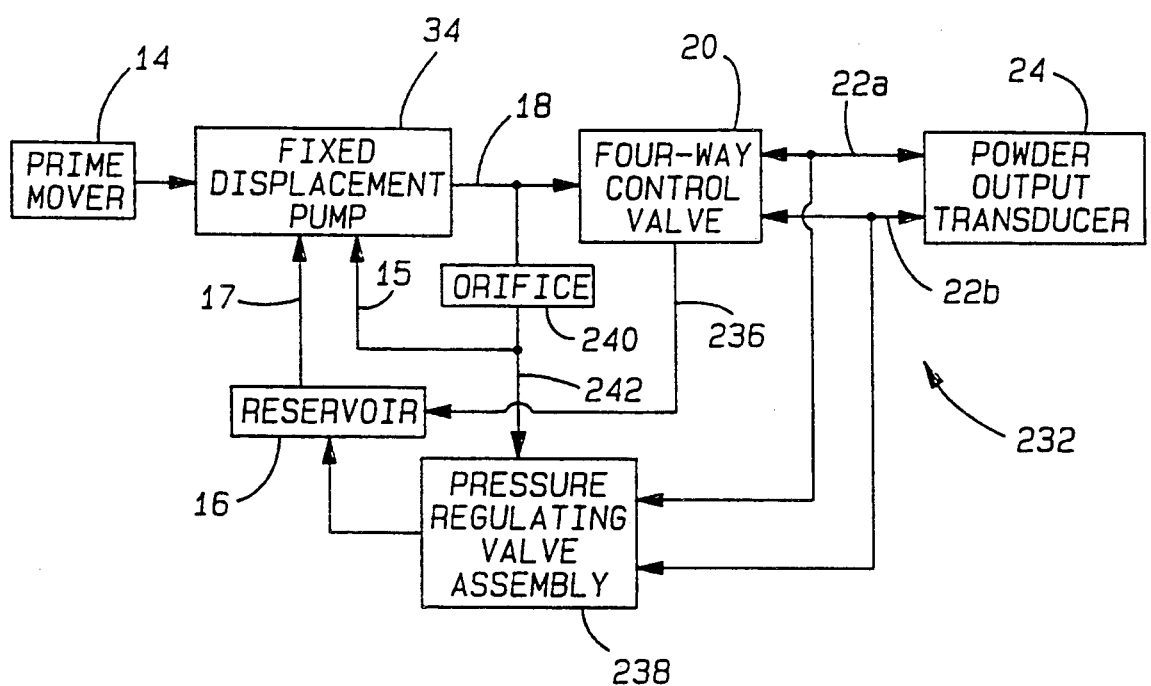
FIG. 11 is a block diagram which depicts a simplified regulated bootstrap system according to the present invention.

With reference now to FIGS. 10 and 11, block diagrams are shown which are representative of a simplified "by-pass" bootstrap system 230 and a simplified "regulated" bootstrap system 232. Common to both systems are prime mover 14, reservoir 16, reservoir delivery line 17, pump delivery line 18, four-way control valve 20, first and second load lines 22a and 22b, respectively, and power output transducer 24.

In by-pass bootstrap system 230, prime mover 14 drives fixed displacement pump 32 which draws hydraulic fluid from reservoir 16 via reservoir delivery line 17 and pumps pressurized fluid into pump delivery line 18. Pump delivery line 18 is in fluid communication with both control valve 20 and a pressure regulating valve assembly 234 which combines the functions of relief valve 26 and pressure regulating valve assembly 30 of FIG. 1 in a manner similar to that described above with respect to the pressure regulating valve assemblies 30e and 30f. However, as will be described below, the modified function of pressure regulating valve assembly 234 is to maintain fluid pressure in pump delivery line 18 at a value equal to the higher valued one of the fluid pressures in first and second load lines 22a and 22b, respectively, plus a desired value of approximately $\Delta P/2$ (where $\Delta P$ retains its prior definition). As such, the following pressure regulating valve assemblies are also unique in that they regulate an input pressure value as a selected function of the highest valued one of any plurality of line pressures. For exemplary purpose only, the following pressure regulating valve assemblies are used in conjunction with first and second load lines.

Thus, the pressure drop between pump delivery line 18 and the higher valued one of first and second load lines 22a and 22b, respectively, is approximately $\Delta P/2$. Assuming that four-way control valve 20 is of a symmetrical design, the pressure drop between the lower valued one of first and second load lines 22a and 22b, respectively, and a return line 236 (to reservoir 16) is also about $\Delta P/2$. This is because the hydraulic fluid flow (i.e. the load flow) from the lower valued one of first and second load lines 22a and 22b, respectively, is substantially identical to the hydraulic fluid flow to the higher valued one of first and second load lines 22a and 22b, respectively. Since the absolute value of the load pressure $[P_L]$ is equal to the absolute value of the difference in pressure between the higher and lower values of pressure in first and second load lines 22a and 22b, respectively, the supply pressure $P_S$ is nominally equal in value to $|P_L| + \Delta P$. As will be shown below, the actual value of $P_S$ is slightly higher than $|P_L| + \Delta P$ because of the effect of the flow induced forces present within pressure regulating valve assembly 234.

In regulating bootstrap system 232 of FIG. 11, prime mover 14 drives a variable displacement pump 34 which draws hydraulic fluid from reservoir 16 via pressure delivery line 17 and pumps pressured fluid into pump delivery line 18. Pump delivery line 18 is in communication with both control valve 20 and a pressure regulating valve assembly 238 which differs from pressure regulating valve assembly 234 in that it does not feature any relief valve function. More particularly, pressure regulating valve assembly 238 is adapted to selectively by-pass the hydraulic fluid delivered from pump delivery line 18 through orifice 240 and input line 242 to reservoir 16 such that the fluid pressure in input line 242 is nominally equal in value to the higher valued one of the pressures present in first and second load lines 22a and 22b, respectively. In addition, the displacement of variable displacement pump 34 is varied such that the supply pressure $P_S$ present in pump output line 18 is equal to the higher valued one of the pressures present in first and second load lines 22a and 22b, respectively, plus an additional desired value of approximately $\Delta P/2$. Thus, the pressure present in pump delivery line 18 is nominally maintained at a value equal to $|P_L| + \Delta P$.

Figure 12:
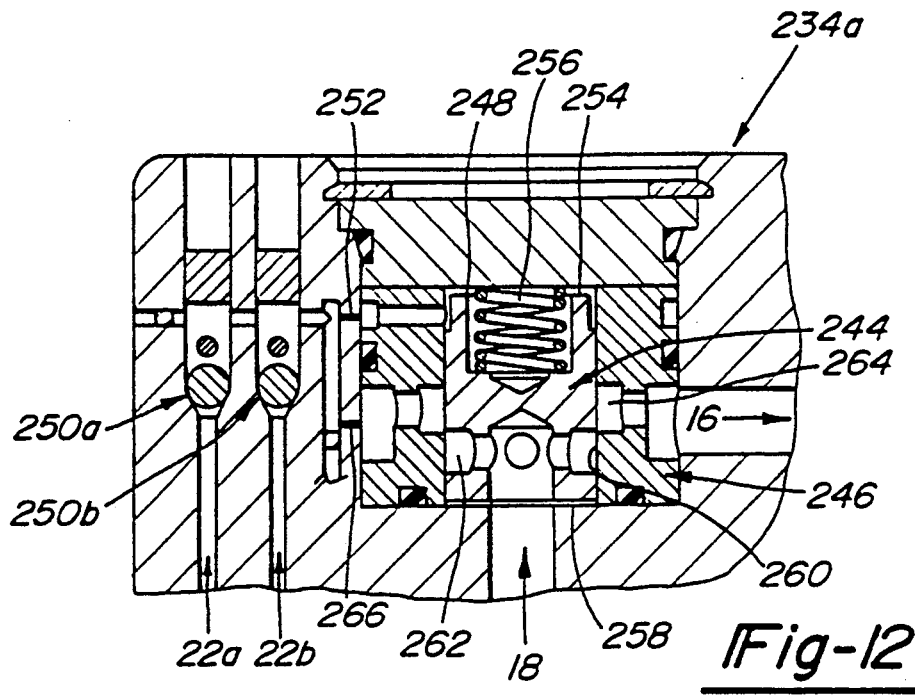
FIG. 12 is a partial sectional view of a seventh embodiment of a pressure regulating valve assembly adapted for use with the simplified by-pass and regulated bootstrap systems of FIGS. 10 and 11.

With reference now to FIG. 12, a pressure regulating valve assembly 234a is shown to include a valve spool 244 that is positioned within a valve sleeve 246 in a close fitting yet axially slidable manner. The higher pressured one of first and second load lines 22a and 22b, respectively, communicates with a control chamber 248 via the appropriate one of first and second check valves 250a or 250b, respectively, and a flow restrictor 252. An axial force F equal to the sum of the product of the pressure so communicated and the area of a first end 254 of valve spool 244, and a biasing force via spring 256 are applied to first end 254 of valve spool 244. The axial force F is balanced by an opposing axial thrust T derived from the fluid pressure in pump delivery line 18 applied to second end 258 of valve spool 244. In operation, any difference between T and F will cause axial movement of valve spool 244 until a circumferential orifice 260 of appropriate area is opened axially between a spool groove 262 and a return sleeve groove 264. Excess hydraulic fluid flows from both return sleeve groove 264 and a relief orifice 266 to reservoir 16.

A slightly modified version of valve 234a can be provided by eliminating spring 256 for use as a pressure regulating valve 238a. Thus, the pressure in input line 242 approximates the higher valued one of the pressures present in first and second load lines 22a and 22b, respectively, rather than that value plus $\Delta P/2$ as in the pressure regulating valve assembly 234a.

Figure 13:
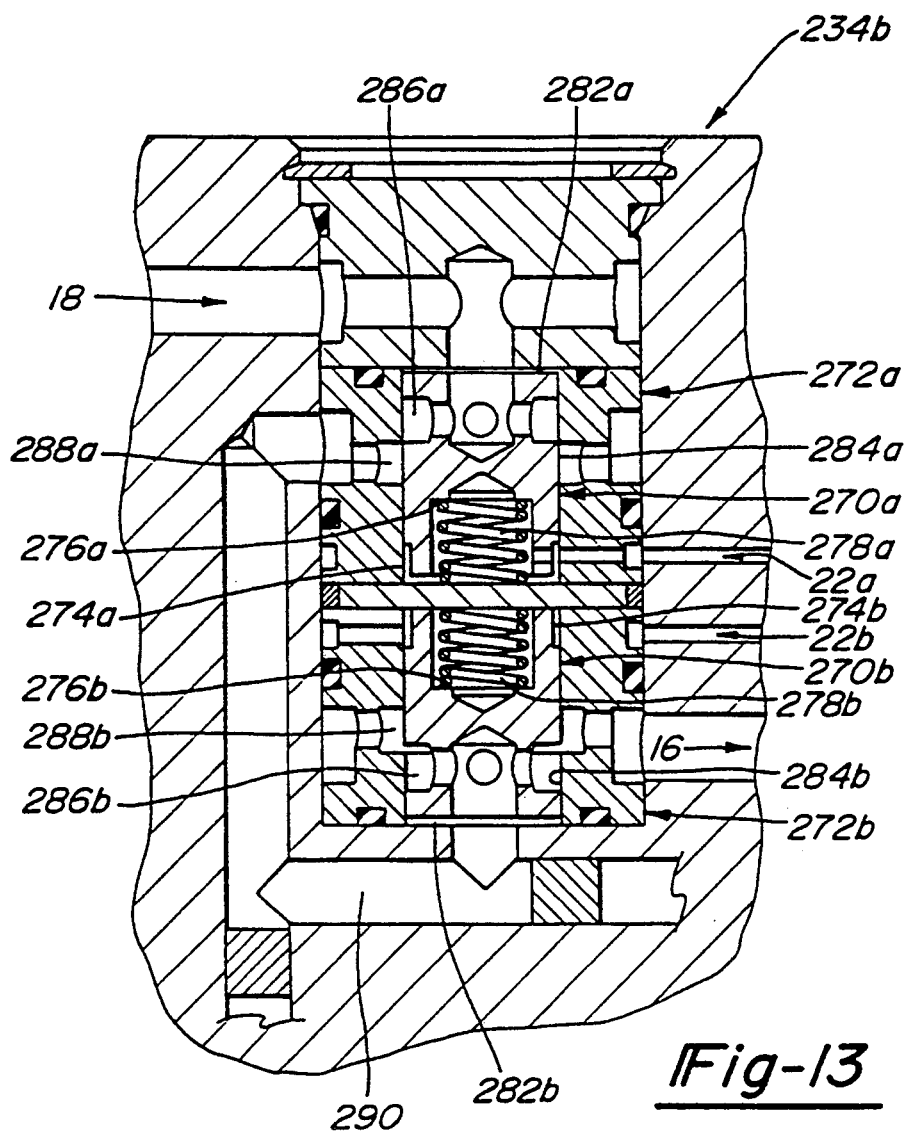
FIG. 13 is a sectional view of an eighth embodiment of the pressure regulating valve assembly adapted for use with the simplified by-pass and regulated bootstrap systems, respectively, of FIGS. 10 and 11.

With reference now to FIG. 13 a pressure regulating valve assembly 234b, which is another preferred embodiment of pressure regulating valve assembly 234, is shown. In pressure regulating valve assembly 234b, first and second valve spools 270a and 270b, respectively, are positioned within first and second valve sleeves 272a and 272b, respectively, in a close-fitting but axially slidable manner. First and second load lines 22a and 22b, respectively, communicate with first and second control chambers 274a and 274b, respectively. First and second axial forces $F_1$ and $F_2$ equal to the sum of the products of the pressures so communicated and the areas of first and second first ends 276a and 276b, respectively, of first and second valve spools 270a and 270b, respectively, and first and second springs 278a and 278b, respectively, are biasingly applied to first and second first ends 276a and 276b, respectively.

If the higher one of the first and second axial forces $F_1$ and $F_2$ is the first axial force $F_1$ then the first axial force $F_1$ is balanced by a first opposing axial thrust $T_1$ derived from the fluid pressure in pump delivery line 18 applied to second end 282a of first valve spool 270a. In operation, any difference between $T_1$ and $F_1$ will cause axial movement of first valve spool 270a until a first circumferential orifice 284a of appropriate area is opened axially between a first spool groove 286a and a first sleeve groove 288a. Therefore, by-passed hydraulic fluid (i.e. hydraulic fluid flow in excess of load flow) flows from first sleeve groove 288a to a second spool groove 286b at a pressure P via intermediate line 290. Similarly, any difference between a second opposing axial thrust $T_2$ derived from the product of the pressure P and the area of second end 282b of second valve spool 270b and $F_2$ will cause axial movement of second valve spool 270b until a second circumferential orifice 284b of appropriate area is opened axially between second spool groove 286b and a second sleeve groove 288b where the pressure P is determined by spring force exerted by the second spring 278b. By-passed hydraulic fluid then flows from second sleeve groove 288b to reservoir 16.

If the higher one of the first and second axial forces $F_1$ and $F_2$ is the second axial force $F_2$, then the first axial force $F_1$ is overcome by the first opposing axial thrust $T_1$ and first valve spool 270a moves downward opening the first circumferential orifice 284a completely. By-passed hydraulic fluid flows from first sleeve groove 288a to second input chamber 286b at the supply pressure $P_S$. Any difference between the second opposing axial thrust $T_2$ derived from the product of the pressure $P_S$ and the area of second end 282b of second valve spool 270b and $F_2$ will cause axial movement of second valve spool 270b until second circumferential orifice 284b of an appropriate area is opened axially between second spool groove 286b and second sleeve groove 288b. By-passed hydraulic fluid then flows from second return sleeve groove 288b to reservoir 16.

A slightly modified version of valve 234b which eliminates springs 278a and 278b is operable for use as a pressure regulating valve assembly 238b with "regulated" bootstrap system 32. Thus, the pressure in input line 242 approximates the higher valued one of the pressures present in first and second load lines 22a and 22b, respectively, rather than that value plus approximately $\Delta P/2$ as in the pressure regulating valve assembly 234b.

It is known that flow induced forces tend to reduce the magnitude of the thrust T, $T_1$ or $T_2$ in each of the disclosed pressure regulating valve assemblies, by approximately $0.86\, Px/r$, where P is the pressure drop through orifices 260, 284a and/or 284b, respectively, x is the axial length of orifices 260, 284a and/or 284b and r is the radius of valve spools 244, 270a or 270b.

Thus, the fluid pressure in the appropriate input chambers can be found via manipulation of the Bernoulli equation. Ignoring second order terms, in by-pass bootstrap system 190 the supply pressure is found to be:

$$P_S = (0.098\, Q/r^2)(w/g)^{0.5}(|P_L|+\Delta P)^{0.5}+(|P_L|+\Delta P) \quad (12)$$

where each variable retains its prior definition. Similarly, in regulated bootstrap system 192 the input line pressure $P_I$ is found to be:

$$P_I = (0.098\, Q'/r^2)(w/g)^{0.5}(|P_L|+\Delta P/2)^{0.5}+(|P_L|+\Delta P/2) \quad (13)$$

where Q' is flow through pressure regulating valve assembly 236a. Thus, the supply pressure (for regulated bootstrap system 192) is:

$$P_S = (0.098\, Q'/r^2)(w/g)^{0.5}(|P_L|+\Delta P/2)^{0.5}+(|P_L|+\Delta P) \quad (14)$$

Thus, $P_S$ is found to deviate from $(|P_L|+\Delta P)$ by error factors of:

$$f = (0.098\, Q/r^2)(w/g)^{0.5}(|P_L|+\Delta P)^{0.5}/\Delta P \text{ and} \quad (15)$$

$$f = (0.098\, Q/r^2)(w/g)^{0.5}(|P_L|+\Delta P/2)^{0.5}/\Delta P \quad (16)$$

for by-pass bootstrap system 230 and regulated bootstrap system 232, respectively. For exemplary purposes only, letting $r = 0.25\{in\}$, $\Delta P = 50[lb/in^2]$, assuming all of Q passes through pressure regulating valve assemblies 234, and keeping all of the other values designated above, f values found for $|P_L|$ over the pressure range of 0.0 to 1500[lb/in²] vary from 0.012 to 0.064 in bootstrap system 230. Thus, because of square root law regulating flow through orifices to pressure drop therebetween, over such a large pressure range the load flow modulates by only approximately 3 percent.

With reference now to FIG. 14, a schematic diagram of one form of variable displacement pump 34 is presented. Shown is a pressure-compensated variable delivery pump 300 of a variable angle swash-plate type. In variable displacement pump 300, hydraulic fluid from reservoir 16 enters suction side chamber 302, wherein pistons 304 are receding, formed in a pump barrel 306 via an inlet port 308 in a valve plate 310. As pump barrel 306 rotates, pistons 304 axially follow a path determined by a swash plate 312 until they begin to rise in their respective cylinders which then become pumping side cylinders 314. The hydraulic fluid exits via an outlet port 316 in valve plate 310 to pump delivery line 18.

A first control chamber 318 is in communication with pump delivery line 18 and the supply pressure $P_S$ bears against a first end 320 of a valve spool 322. A second control chamber 324 is in communication with either of input lines 28 or 242 and the fluid pressure therein bears against opposite end 326 of valve spool 322. In addition, a spring 328 also bears against end 326 such that valve spool 322 is balanced when the supply pressure exceeds the pressure in either of input lines 28 or 242 by $\Delta P$ or $\Delta P/2$, respectively.

If the supply pressure is too low, valve spool 322 moves to open a passage between a swash plate drive cylinder 330 and a port groove 332 which is in comanunication with reservoir 16. Then a spring (not shown) moves a piston 336 located in swash plate drive cylinder 330 dispelling excess hydraulic fluid to reservoir 16. In addition, linkage 338 connecting piston 336 to swash plate 312 moves swash plate 312 such that the stroke of pistons 304 is increased. Conversely, if the supply pressure is too high, valve spool 322 moves the opposite way and opens a passage between a swash plate drive cylinder 330 and first control chamber 318 and the supply pressure. Thereafter, the supply pressure moves piston 336 and linkage 338 such that the stroke of pistons 304 is decreased.

FIG. 15 is a graphical illustration of a curve 340 which relates $P_S$ to $P_L$. Both the ordinate and the abscissa are normalized via dividing each by $P_{LM}$, the maximum value of $P_L$. Curve 340 illustrates a value of $P_S = P_L + \Delta P$ where $\Delta P = 0.1 P_{LM}$. It iS clear that in cases where $P_L$ has the same sign as $Q_L$ ($Q_L$ is the load flow) the pressure drop across each working orifice of a balanced version of four-way control valve 20 will be substantially equal in value to $\Delta P/2$. Thus in those cases, $Q_L$ has a substantially constant value for any value of $P_L$.

On the other hand, in cases where PL has the opposite sign (from $Q_L$) the pressure drop across each working orifice of balanced four-way valve 20 will increase significantly. In fact, the pressure drop across the working orifice in communication with pump delivery line 18 will be $P_S$ minus the sum $|P|+\Delta P/2$ to a value of $\Delta P/2$. Then the pressure will be increased by the power output transducer 24 by $|P_L|$ to a value of $|P_L|+\Delta P/2$, and the pressure drop across the working orifice in communication with reservoir 16 will be $|P_L|+\Delta P/2$ as well.

A more complete understanding of this is obtained by investigation power flow. Hydraulic power is delivered to balanced four-way valve 20 from pump delivery line 18 and is $P_S Q_L = (P_L + \Delta P) Q_L$. Mechanical power (from power output transducer 24) dissipated in the balanced four-way valve 20 is equal to hydraulically applied decelerating force times velocity of $(P_L A_L)(Q_L/A_L)$ (where $A_L$ is an effective working area of the power output transducer 24). Thus, total hydraulic power dissipated in balanced four-way valve 20 must be (2 $P_L + \Delta P)Q_L$. Since the pressure drop across each working orifice is $P_L + \Delta P/2$, the hydraulic power dissipated in each working orifice is $(P_L + \Delta P/2)Q_L$ and twice that is indeed (2 $P_L + \Delta P)Q_L$.

It would be desirable to be able to smoothly stop loads having high inertia values (i.e. such as the arm of a backhoe) without hydraulic cavitation and shock. A preferred way of doing this would be to provide a balanced four-way valve having working orifices whose area increases quadratically with respect to valve deflection. With reference to FIGS. 16A through 16E, such a balanced four-way control valve 350 is presented having a valving sub-assembly 351 which includes a valve spool 352 and a valve sleeve 354. In four-way control valve 350, torque applied to a valve spool 352 causes valve spool 352 to move rotationally with respect to a valve sleeve 354 wherein it is positioned in a close-fitting yet rotatable manner. Valve sleeve 354 is positioned within a valve housing 356 in a fixed manner such as via an interference fit therebetween. Valve spool 352 is located axially with respect to valve body 356 and valve sleeve 354 by a torsion bar 360 and a pin 362. Hydraulic fluid enters four-way valve 350 from pump delivery line 18 via an input port 364 located in valve housing 356, an annular input groove 366, a plurality of input ports 368 and an identically numbered plurality of input slots 370 formed in valve sleeve 354.

Figure 16A:
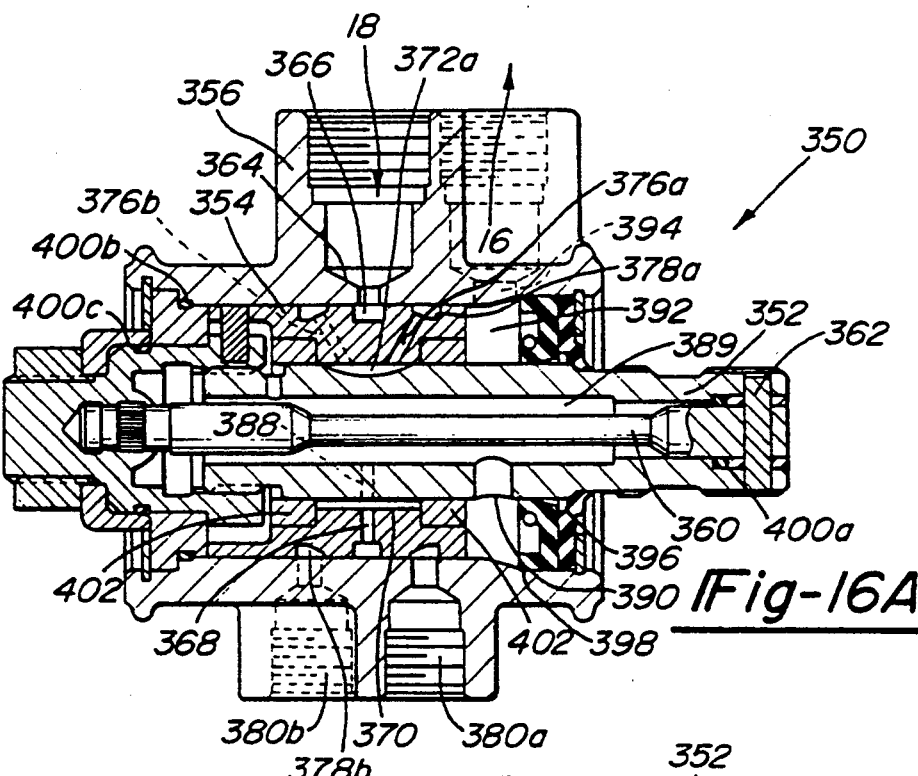
FIGS. 16A–E illustrate a balanced four-way control valve wherein the orifice area increases quadratically with respect to valve deflection.
Figure 16B:
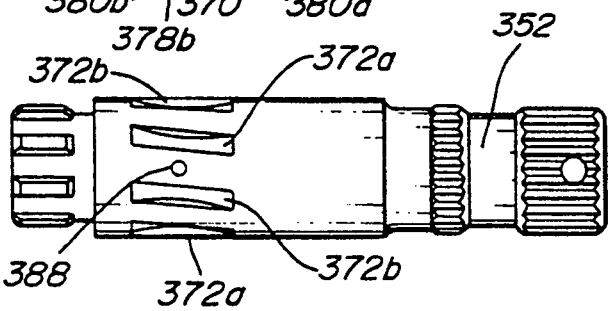
Figures 16C, 16D, 16E:
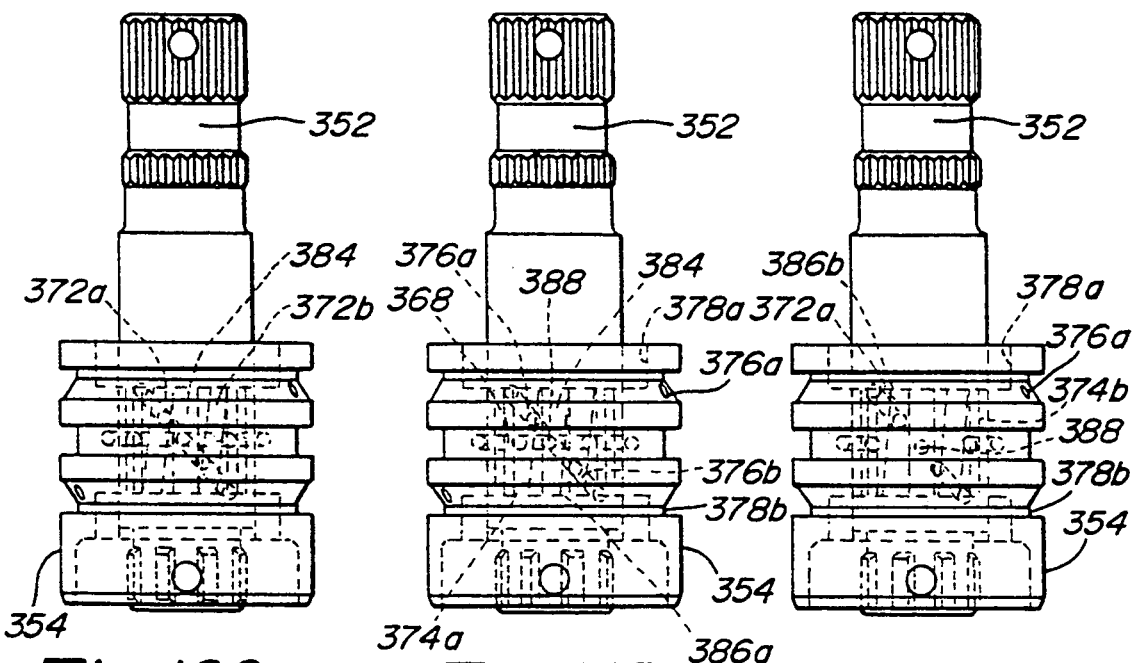
Figure 19A:
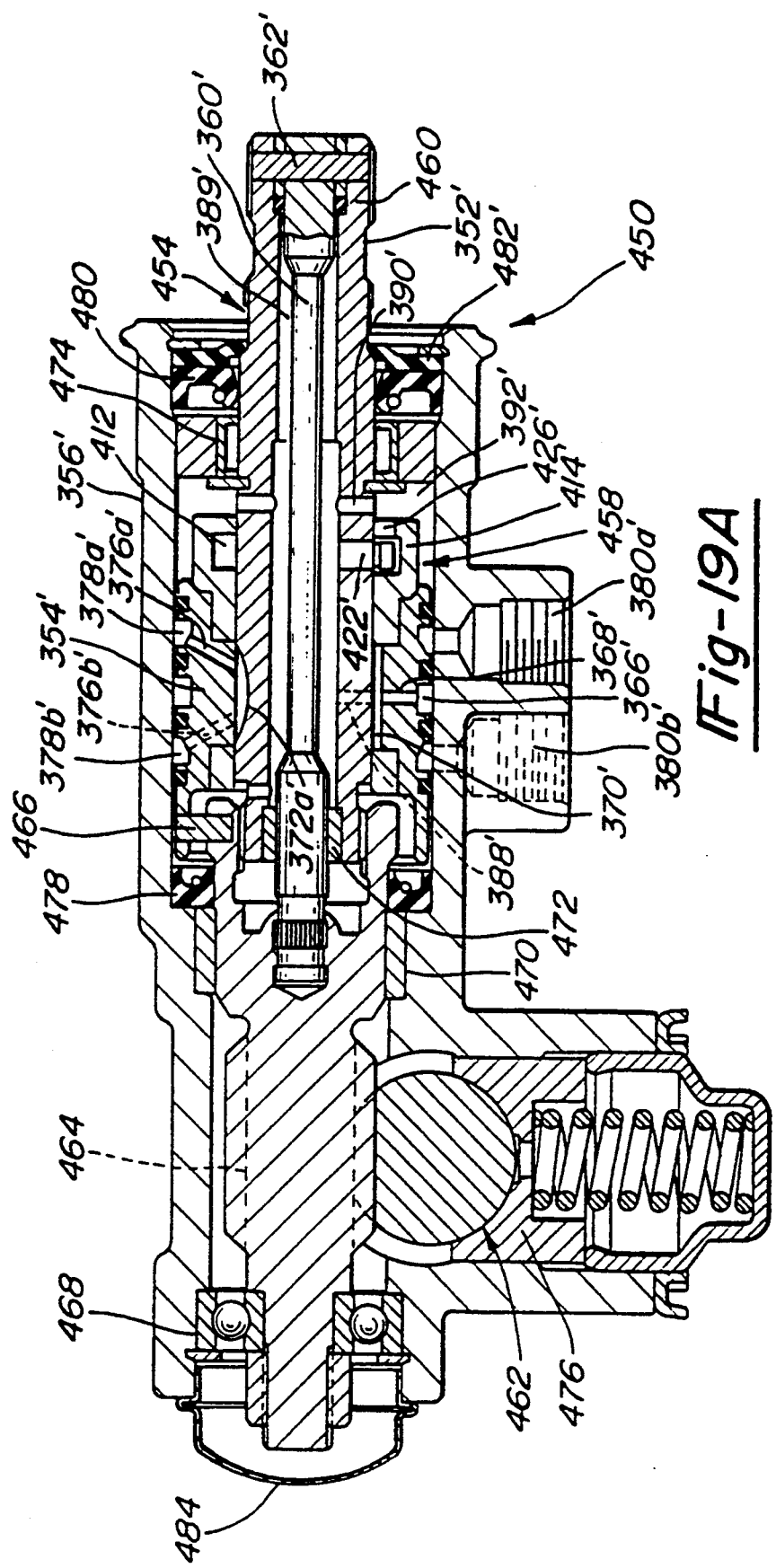
FIGS. 19A–D are various views showing a vehicular power steering control apparatus configured to incorporate a pressure regulating valve assembly, the balanced four-way control valve and the reaction torque device.
Figure 19B:
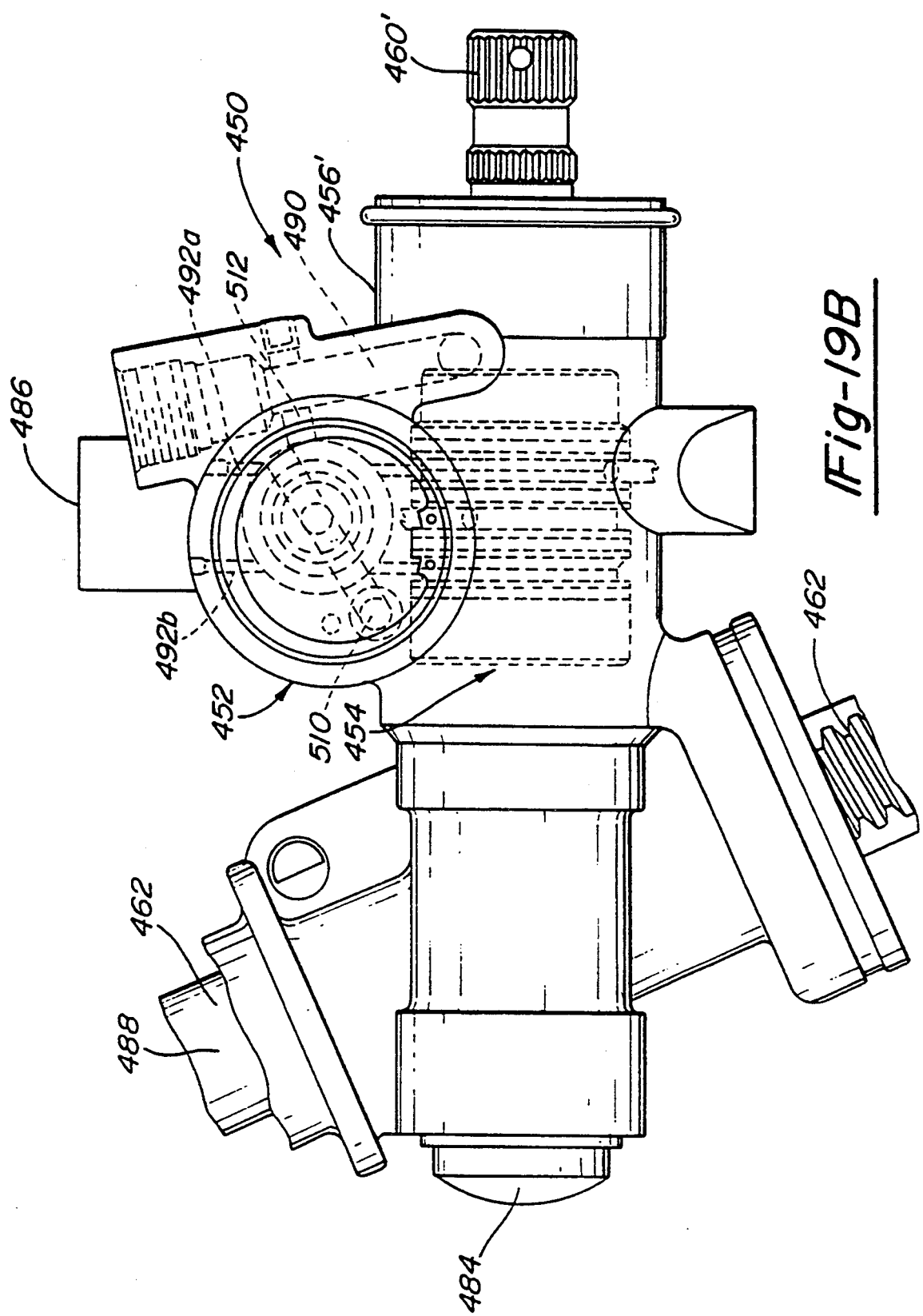
Figure 19C:
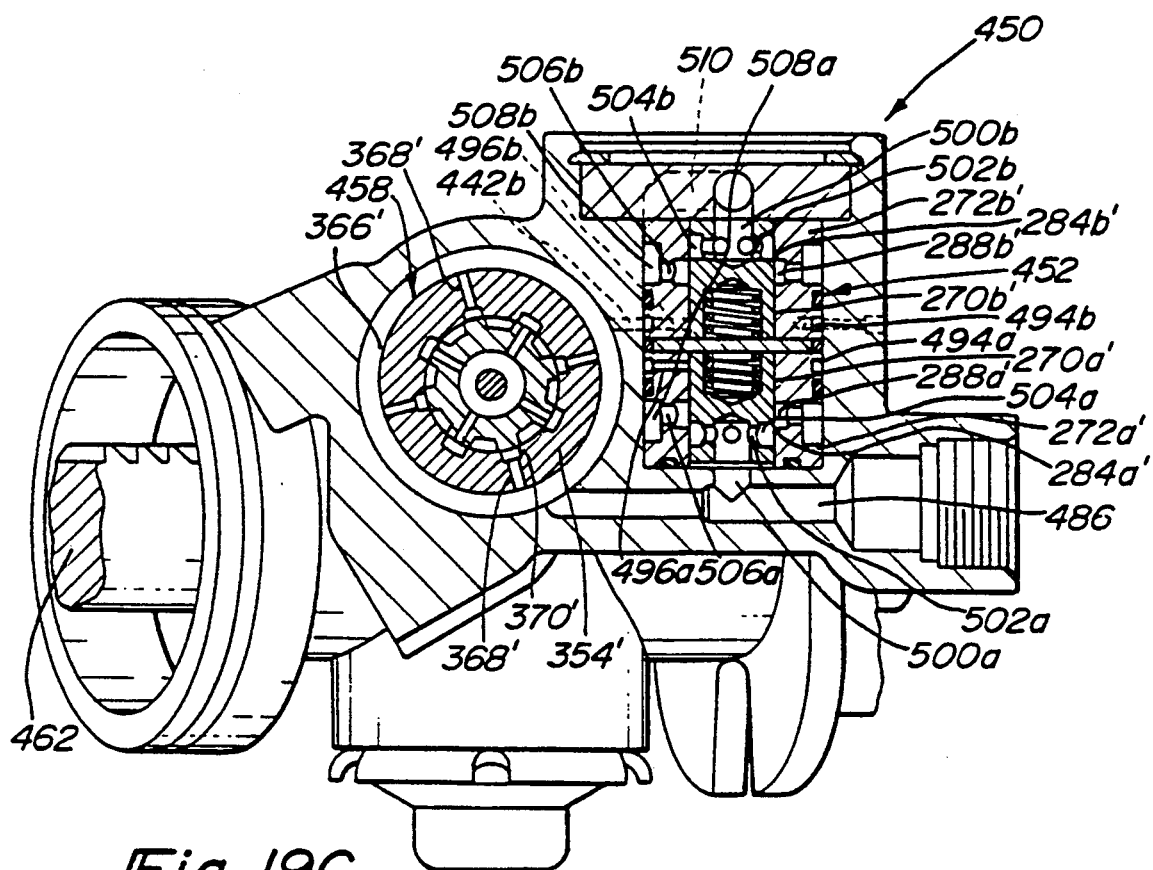
Figure 19D:
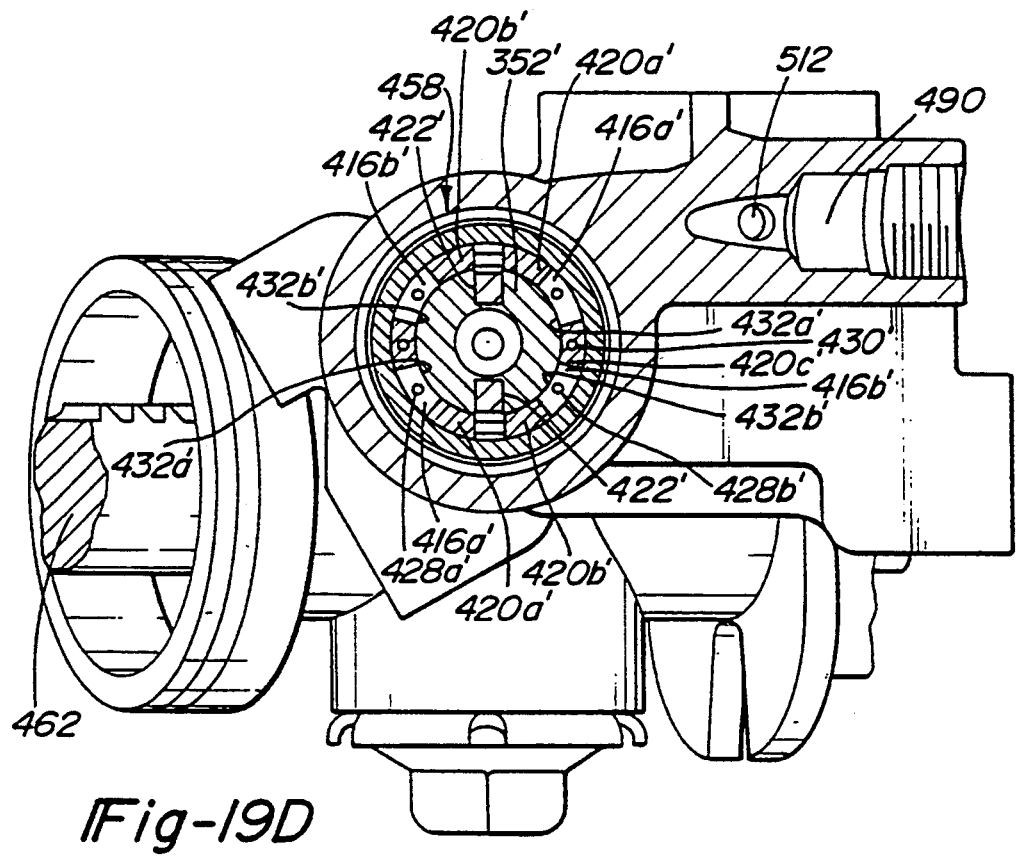

If valve spool 352 is rotationally centered within valve sleeve 354 as shown in FIG. 16C, then hydraulic fluid passage is blocked. If valve spool 352 is rotated against the torsional resistance provided by torsion bar 360 in a clockwise direction as shown in FIG. 16D, then hydraulic fluid flows from input slots 370 to a first set of helical output slots 372a formed in valve spool 352 via a first set of triangular shaped output orifices 374a as shown in FIG. 16D to define the load flow $Q_L$. The load flow then flows out of balanced four-way control valve 350 via a first set of output ports 376a, a first output groove 378a formed in valve sleeve 354, a first output port 380a and a first load line (not shown) to power output transducer 24. Load flow returning from power output transducer 24 enters four-way valve 350 via a second load line (not shown), a second output port 380b, a second output groove 378b, a second set of output ports 376b and a second set of helical output slots 372b. The load flow then flows into return slots 384 via a second set of triangular shaped return orifices 386a, through return ports 388 formed in valve spool 352, chamber 389, and out through a return hole 390, valve chamber 392 and return port 394 to reservoir 16.

With reference to FIG. 16E, if valve spool 352 is rotated in an opposite direction against the torsional resistance provided by torsion bar 360, then the hydraulic fluid flows in an opposite manner from that explained above. However, the load flow passes out through a second set of triangular shaped output orifices 374b and in through a second set of triangular shaped return orifices 386b as shown in FIG. 16E. In addition, balanced four-way control valve 350 has a dust seal 396, fluid seal 398 and O-ring seals 400a, 400b and 400c which are provided to keep the dust out and the hydraulic fluid in. One preferred method of forming input slots 370 and return slots 384 is by broaching. In that case, sealing rings 402 are utilized to seal off the ends of slots 370 and 384.

The first and second sets of helical output slots 372a and 372b, respectively, may be formed such that first and second sets of triangular shaped output and return orifices 374a and 374b, and 386a and 386b, respectively, will begin to open substantially simultaneously with valve spool 352 beginning to rotate, in which case four-way valve 350 is a zero-lapped four-way valve. Alternately, they may be formed such that first and second sets of triangular shaped output and return orifices 374a and 374b, and 386a and 386b, respectively, do not begin to open up until a selected amount or rotation of valve spool 352 has occurred, in which case the four-way valve 350b is an over-lapped four-way valve. In either case, four-way control valve 350 can be generically referred to as a "closed-center" valve wherein its hydraulic performance can be illustrated by a set of normalized pressure-flow curves which depict load flow vs load pressure for various rotational positions of valve spool 352 beyond the point where first and second sets of triangular shaped output and return orifices 374a and 374b, and 386a and 386b, respectively, begin to open up.

With reference to FIG. 17, there is presented a graph which depicts such a set of pressure-flow curves 400a-h. Operation in either of first quadrant 402 or third quadrant 404 implies that power is delivered to power output transducer 24 while operation in either of the second quadrant 406 or fourth quadrant 408 implies negative power flow (from a overhauling load) to power output transducer 24. The graph is normalized with its abscissa variable equal to $P_L/P_{LM}$ and its ordinate variable equal to $Q_L/[C_d A_{VM}(\Delta Pg/w)^{0.5}]$ where $A_{VM}$ is maximum possible valve orifice area and all of the other variables have their above defined values.

The curves 400a-d and 400e-h are horizontal lines in first and third quadrants 402 and 404, respectively, as expected from discussions presented above. In second and fourth quadrants 406 and 408, respectively, however, the pressure across each working control valve orifice is substantially equal to $P_L + \Delta P/2$ as also discussed above. Thus, because of the square root law relationship between the pressure drop across such orifices and flow therethrough, curves 400a-d and 400e-h become quadratic in second and fourth quadrants 406 and 408, respectively, where their (imaginary) origin is equal to a value of $\Delta P/2P_{LM}$ of the opposite sign.

Many hydraulic systems are configured without tactile feedback related to system load. An obvious example is the hydraulic systems that move the arm of a backhoe. These systems comprise closed center control valves that must be capable of supporting the arm in a stationary manner without operator input. Since tactile feedback would cause motion of control valve, it cannot be used. Even some vehicular power steering systems are configured without tactile feedback related to steering load. Examples comprise off-road and marine power steering systems wherein no load sensitivity is desired. In either case, this is because load variations due to uneven ground or wave action should be overcome by the power steering system. In all of these cases the various embodiments described above are ideal as they stand.

However, in many hydraulic systems tactile feedback related to system load is desirable. An obvious example is on-road vehicular power steering. Surprisingly, most vehicular power steering systems include rotary control valves wherein tactile feedback directly related to steering load is not utilized. Instead, the rotary valves (which are generally open-center control valves utilizing constant flow hydraulic power sources) present torque related to valve motion to a driver. Some power steering systems do include such a direct tactile feedback device wherein reaction torque is presented to a driver.

With reference now to FIG. 18A and 18B, there is presented a reaction torque device 410 which is a modification of four-way valve 350 shown in FIGS. 16A through E that is a control valve with reaction torque. As such, like numerals are used to designate previously described components. In particular, FIG. 18B is a section view taken along line A—A of FIG. 18A while FIG. 18A is a section view taken along line B—B of FIG. 18B. In reaction torque device 410, portions of a circumferential groove 412 formed in an oversize sealing ring 414 affixed within one end of valve sleeve 354, are utilized to form one or more sets (the number of sets designated as "N") of first and second reaction chambers or cylinders 416a and 416b, respectively. First, second and third portions of a ring 418 are utilized to define similarly numbered ("N") sets of first and second pistons 420a and 420b, and flow barrier 420c, respectively. A drive pin 422 is pressed into a radial hole 424 formed in valve spool 352. Assembly access for drive pin 422 is implemented via an access slot 426 also formed in oversize sealing ring 414. When first and second reaction chambers or cylinders 416a and 416b, respectively, are pressurized, first and second pistons 420a and 420b, respectively, each bear against drive pin 422. Furthermore, a first and second set of longitudinally extending travel limiting pins 428a and 428b, respectively, limit the reverse travel of first and second pistons 420a and 420b, respectively. In addition, pins 430 are used to tangentially position flow barrier 420c.

Generally, operation is similar to that described for balanced four-way control valve 350. In addition, however, fluid in first and second output ports 376a and 376b, respectively, communicates with first and second reaction cylinders 416a and 416b, respectively, via one each of first and second sets of helical output slots 372a and 372b, respectively, and first and second slots 432a and 432b, respectively. Thus, the load pressure PL is differentially applied to first and second pistons 420a and 420b, respectively, and reaction torque is presented to valve spool 352 via drive pin 422. The reaction torque can be found from the equation:

$$T_R = NP_L c(a^2 - a^2)/2 \qquad (17)$$

where $T_R$ is the reaction torque, a and b are the inside and outside radii, respectively, of first and second pistons 420a and 420b, respectively, and c is the axial length of first and second pistons 420a and 420b, respectively. For exemplary purposes only, when the values are set as follows; N=2, $P_L$=1000[lb/in$^2$], a=0.394[in], b=0.512[in] and c=0.197[in], the developed reaction torque $T_R$=21.2[in/lb].

With reference now to FIGS. 19A through 19D, there is presented a vehicular power steering control apparatus 450 configured to incorporate a pressure regulating valve assembly 452 that is substantially identical to pressure regulating valve assembly 234a shown in FIG. 13, a balanced four-way control valve 454 whose function conforms substantially to that of four-way valve 350 except that valve sleeve 354' is selectively allowed to rotate with respect to a valve housing 456', and a reaction torque device 458 that is substantially identical to device 410 of FIG. 18A (wherein N=2). In light of such similarities, primed numbers are used to describe substantially identical functioning components. In power steering control apparatus 450, steering wheel torque is applied to an input portion 460 of valve spool 352' and the power output transducer 24 comprises a piston-rack assembly 462. The rotational position of valve sleeve 354' is substantially coupled to the translational position of piston-rack assembly 462 via a pinion 464 which drives valve sleeve 354' via a drive pin 466.

Pinion 464 is located axially by a first bearing 468 and in lateral directions and in pitch and yaw by the combination of first bearing 468 and a second bearing 470. Similarly, valve spool 352' is located in lateral directions and in pitch and yaw by the combination of third and fourth bearings 472 and 474, and axially and in roll by torsion bar 360' and pin 362'. Valve sleeve 354' is positioned axially by drive pin 466, and laterally and in pitch and yaw by its close fitting relationship around valve spool 352'. Piston-rack assembly 462 is held in substantially backlash free engagement with pinion 464 by a spring loaded yoke 476 in a known manner. In addition, hydraulic fluid is retained within valve housing 456 by seals 478 and 480, and dust is excluded by a dust seal 482. Piston-rack assembly 462, pinion 464, spring loaded yoke 476, and bearings 468 and 470 are lubricated by a heavy grease which is retained by a cup 484.

Power steering control apparatus 450 is utilized in conjunction with a nominally constant flow hydraulic fluid source as previously described. Pressurized hydraulic fluid delivered by the nominally constant flow hydraulic fluid source enters power steering control apparatus 450 at an entry port 486 wherein its flow is split between pressure regulating valve assembly 452 and four-way valve 454. Load flow continues on and enters input groove 366', the plurality of input ports 368' and the plurality of input slots 370' all formed in valve sleeve 354'.

If counterclockwise torque is applied to input end 460 of valve spool 352' then valve spool 352' deflects torsion bar 360' and moves in a counterclockwise manner with respect to valve sleeve 354'. Thus, as previously described, load flow passes out through the second set of triangular shaped output orifices 374b' (as shown in FIG. 16E), the second set of helical shaped slots 372b', the second set of output ports 376b', the second output groove 378b' and the second output port 380b' to a first end (i.e. left end) of an output power cylinder (not shown but attached to end 488 of piston-rack assembly 462). Similarly, returning load flow enters power steering control apparatus 450 via the first output port 380a', the first output groove 378a', the first set of output ports 376a', the first set of helical output slots 372a', the second set of triangular shaped return orifices 386b', return slots 384', return ports 388', through chamber 389', out through return holes 390' and valve chamber 392' to a return port 490 from which it returns to the nominally constant flow hydraulic fluid source.

The load flow causes piston-rack assembly 462 to move in the direction of end 488 and rotate pinion 464 in a counterclockwise direction. Piston-rack assembly 462 also deflects the tie-rod and dirigible wheel assemblies (not shown) of the host vehicle such as to effect a left turn. In so doing, piston-rack assembly 462 must typically overcome steering forces generated by tire patch deflections and wheel castor in order to execute the left turn. Thus, a second output pressure signal present in second output groove 378b' concomitantly must increase while a first output pressure signal present in first output groove 378a' stays nominally constant. The first and second output pressure signals are conveyed from first and second output grooves 378a' and 378b', respectively, to first and second control chambers 274a' and 274b', respectively, of pressure regulating valve assembly 452 via first and second pressure signal ports 492a and 492b, respectively, first and second pressure signal grooves 494a and 494b, respectively, and first and second ports 496a and 496b, respectively.

Normally the majority of the hydraulic fluid is bypassed through pressure regulating valve assembly 452. More particularly, hydraulic fluid enters pressure regulating valve assembly 452 via a first entry port 500a from entry port 486 and flows through a first set of radial ports 502a to a first valve spool groove 504a. Because the first pressure signal is relatively low, the first valve spool 270a' is held in an open position and hydraulic fluid freely flows through first circumferential orifice 284a' to first port groove 288a' formed in first valve sleeve 272a'. The hydraulic fluid then flows through a first set of valve sleeve ports 506a, a first collecting groove 508a, a cross passage 510, a second entry port 500b, and a second set of radial ports 502b to a second valve spool groove 504b. Because the second pressure signal is elevated, the second valve spool assumes its regulating attitude and hydraulic fluid flow is selectively metered through the second circumferential orifice 284b' to second port groove 88b' formed in a second valve sleeve 272b'. The hydraulic fluid then flows through a second set of valve sleeve ports 506b and a second collecting groove 508b to a return port 512 and return port 490.

As described above with respect to reaction torque device 410, fluid in the first and second output ports 376a' and 376b', respectively, also communicates with each of first and second reaction chambers 416a' and 416b', respectively, via two each of the first and second sets of helical output slots 372a' and 372b', respectively, and two each of the first and second slots 432a' and 432b', respectively. Thus, the load pressure $P_L$ is differentially applied to first and second pistons 420a' and 420b', respectively, and reaction torque is presented to valve spool 352' via drive pins 422'. Since N=2, the reaction torque can be found by:

$$T_R = P_L c(b^2 - a^2) \quad (18)$$

With the exemplary values of $P_L = 1000[\text{lb/in}^2]$, a=0.394[in], b=0.512[in] and c=0.197[in] the resultant reaction torque is T=21.1[in/lb].

As described in U.S. Pat. No. 4,651,551, some conventional rack-and-pinion steering gears are subject to an objectionable hissing sound which is produced by the flow of hydraulic fluid through metering orifices of their control valves at high pressure drops encountered during parking. These noises can be greatly reduced if the groove edges forming the metering orifices are contoured in section so as to distribute the hydraulic fluid flow in a thin sheet. The four-way valve is not subject to such noise problems when utilized in any of the control systems described herein because its triangular shaped output and return orifices 374a, 374b, 386a and 386b, respectively, are not normally subject to such high pressure drops. However, the nominal full pressure delivered to power steering control apparatus 450 is dissipated through either of first and second circumferential orifices 284a' and 284b', respectively, and hissing can occur therein.

Figure 20A:
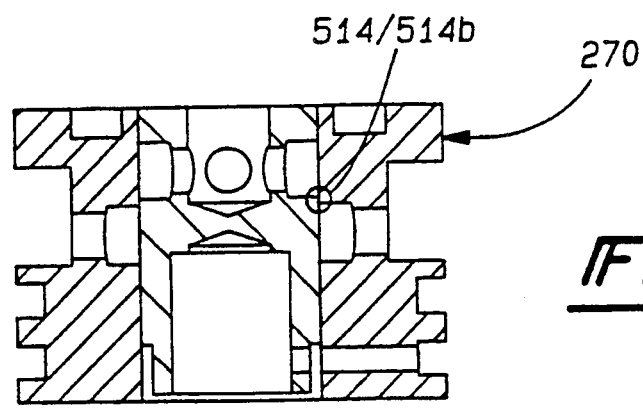
FIGS. 20A, 20B and 20C illustrate modified circumferential orifice configurations for the pressure regulating valve assembly of FIGS. 19A–D which substantially eliminates hissing noises.
Figure 20B:
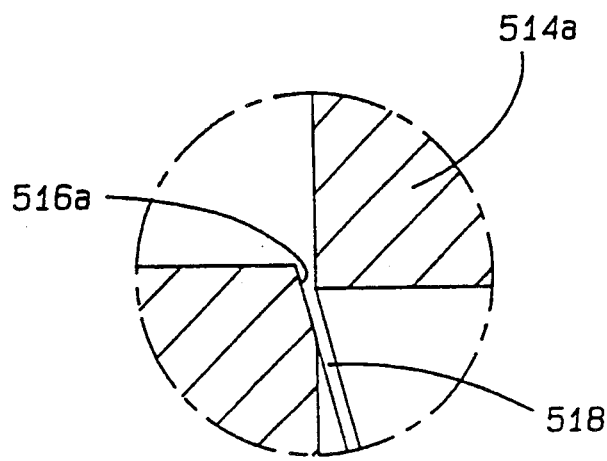
Figure 20C:
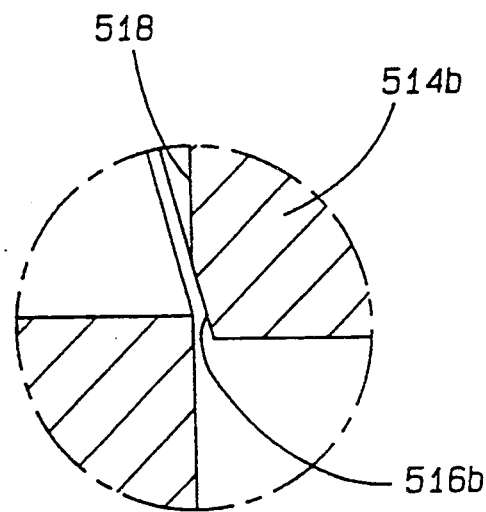

With reference to FIGS. 20A, 20B and 20C, modified circumferential orifice configurations 514a and 514b are shown which substantially eliminate such hissing noises. In modified circumferential orifice configuration 514a, a circumferential chamfer 516a is formed on a cylindrical surface 518 defining the outer diameter of any of the valve spools of any of the pressure regulating valve assemblies previously described wherein the fluid flow direction is radially outward. In modified circumferential orifice configuration 514b, a circumferential chamfer 516b is formed on a cylindrical surface 518 defining the inner diameter of valve sleeve 133 of pressure regulating valve assembly 130 whereat the first negatively closing orifice 142a and the second positively closing orifice 140b are formed and where the fluid flow direction is radially inward.

Figure 21:
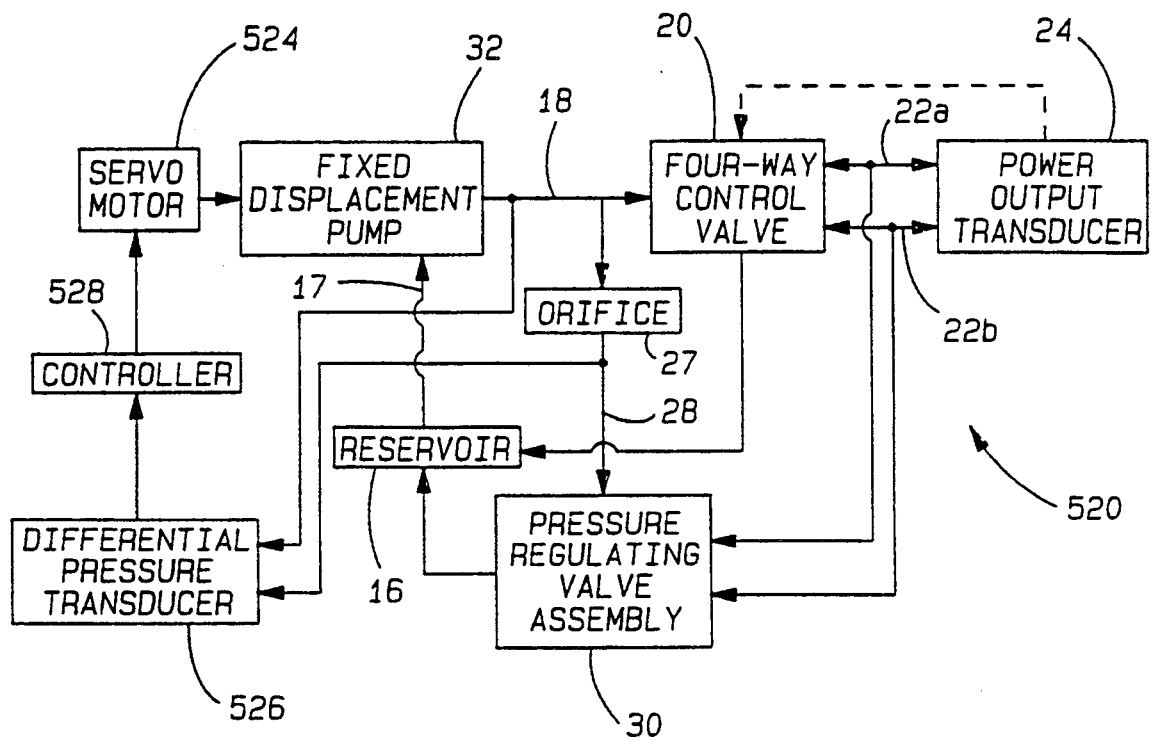
FIGS. 21 and 22 are block diagrams of alternate versions of electrically bootstrap control systems for a vehicular power steering system.
Figure 22:
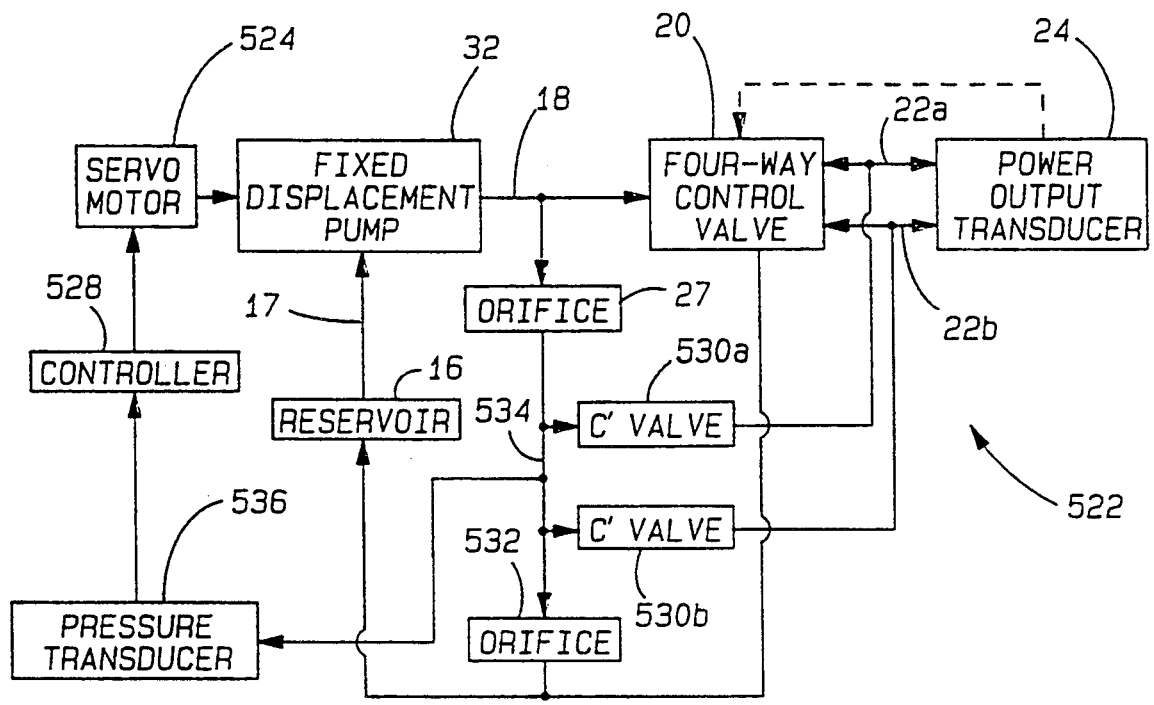

With reference now to FIGS. 21 and 22, block diagrams are shown depicting slightly differing versions of an electrically powered regulating bootstrap system, separately identified as 520 and 522. In electrically powered regulating bootstrap system 520, a servo motor (i.e. a permanent magnet DC motor) 524 is used to drive fixed displacement pump 32 while the remainder of the hydraulic circuitry is substantially the same as that described above with respect to regulating bootstrap system 12 shown in FIG. 2. However, in electrically powered regulating bootstrap 520, fluid pressure in pump delivery line 18 and input line 28 are differentially sampled by a differential pressure transducer 526 that generates an electrical signal representative of the differential pressure (hereinafter "pressure signal") that is delivered to a controller 528. Controller 528 selectively provides a power signal to servo motor 524 so as to maintain the output pressure (in pump delivery line 18) substantially at a value of $|P_L| + \Delta P$.

In electrically powered regulating bootstrap system 522, pressure regulating valve assembly 30 is replaced by first and second check valves 530a and 530b, respectively, and an orifice 532. First and second check valves 530a and 530b are utilized to select the lower pressure one of the pressures in first and second load lines 22a and 22b, respectively. Orifice 532 is used to allow fluid to circulate continuously through pressure sense line 534 regardless of the state of first and second check valves 530a and 530b, respectively, and first and second load lines 22a or 22b, respectively. As noted above, if four-way control valve 20 is a symmetrical device, the desired lower pressure present in pressure sense line 534 is approximately ΔP/2. A pressure transducer 536 is used to measure the pressure in pressure sense line 534 relative to ambient pressure. Then controller 528 selectively provides a power signal to servo motor 524 so as to maintain the pressure in pressure sense line 534 substantially at a value of ΔP/2.

Figure 23:
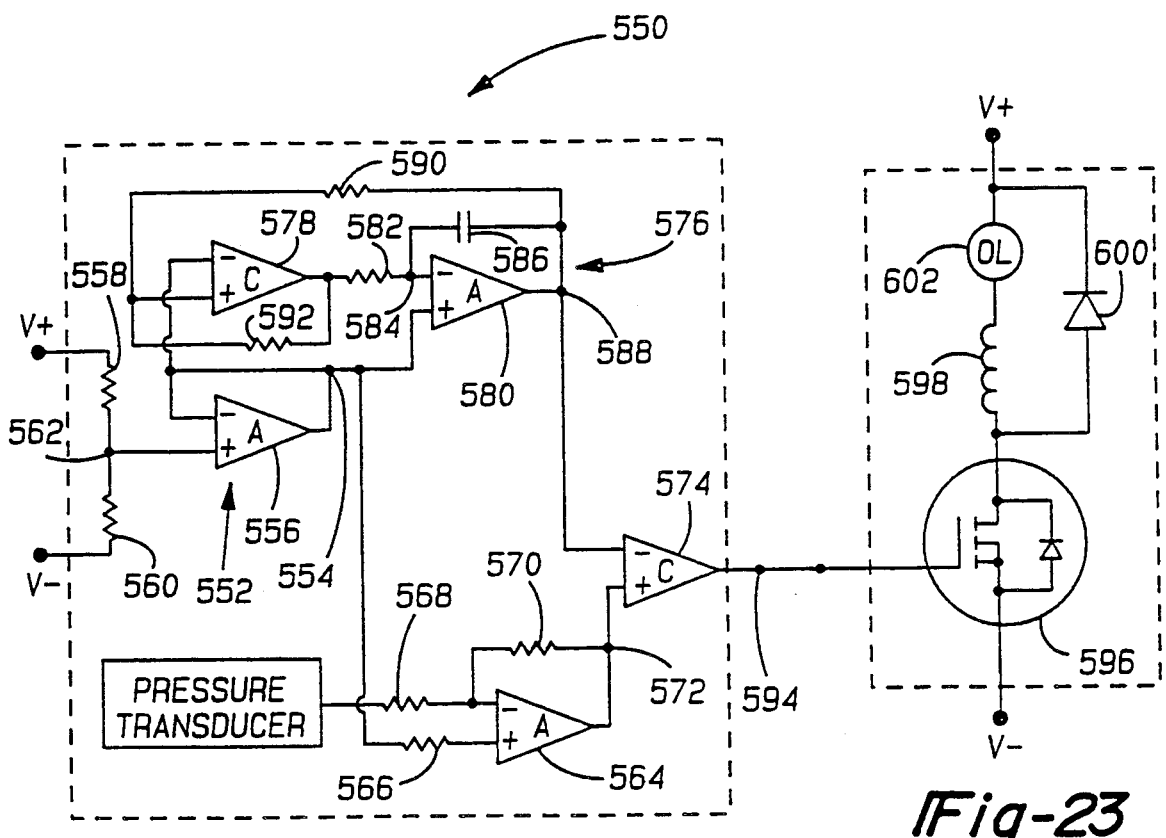
FIG. 23 is an exemplary controller circuit for the electrically powered vehicular power steering systems of FIGS. 21 and 22.

With reference now to FIG. 23, an exemplary analog circuit 550 which may be utilized for controller 528 is shown. A signal ground voltage signal (hereinafter "ground potential") is generated by a simple voltage follower circuit 552, nominally half way between V+ and V− on its output terminal 554. Output terminal 554 is also the output terminal of its only active device, amplifier 556. In addition, resistors 558 and 560 are substantially equal valued. (Hereinafter passive devices will be referred to by a letter such as R for resistors and C for capacitors, and their designating number, i.e. R558 and R560 for resistors 558 and 560, respectively. Their values will be similarly indicated, i.e. R558=R560=100 kohms). Thus, the voltage at junction 562 is half way between V+ and V−. Since the output terminal of amplifier 556 is directly connected to its negative input terminal and the entire gain of amplifier 556 attempts to reduce the differential input signal values to zero, the signal value at output terminal 554 is substantially equal to the signal value at junction 562, namely ground potential.

Ground potential is utilized as a reference signal representative of the desired pressure signal via suitable conditioning circuitry within differential pressure transducer 526 or pressure transducer 536. Note that an alternate reference signal could be generated by another voltage follower circuit. In any case, the chosen reference signal is applied to positive terminal of an amplifier 564 via resistor 566 and the pressure signal is applied to the negative terminal of the differential amplifier 564 via resistor 568. Amplification of differential amplifier 564 is provided by selecting suitable values for resistor 568 and feedback resistor 570 wherein the amplification ratio value is R570/R568. The amplified differential signal (hereinafter "error signal") is present at terminal 572 and is applied to the positive terminal of comparator 574.

Comparator 574 is utilized to compare the error signal with a triangle wave signal generated by a triangle wave generator 576. Triangle wave generator 576 is actually a hysteresis oscillator circuit which includes two active devices, comparator 578 and amplifier 580. Whenever comparator 578 is in its positive output state, constant positive load current flows through resistor 582 to junction 584 and through capacitor 586 to junction 588, which is also the output terminal for triangle wave generator 576.

The voltage of the signal on junction 588 is decreased in a linear manner by the amplifier 580, thus keeping the junction 584 at ground potential. This continues until the voltage of the signal on junction 589 deceases to ground potential, as determined by a voltage divider formed by resistors 590 and 592, whereupon comparator 578 changes to a negative state and the voltage of the signal on junction 588 is increased in a linear manner. Each succeeding change of state reverses the slope (with respect to time) of the signal on junction 588 wherefrom a resulting triangle wave is present. The oscillation frequency of the triangle wave is determined according to:

$$F_{TW} = R592/4 \; R582 \; R590 \; C586 \tag{19}$$

and has a peak-to-peak voltage signal range of (V+ − V−) R590/R592. In these formulas, $F_{TW}$ is the frequency of triangle wave, R582, R590, R590 and C586 stand for the appropriate value of resistance (in ohms) or capacitance (in farads) of each particular device, respectively, and R592 must be greater in value than R590. As an example, component values of R582=33[kohms], R590=68[kohms], R592=100[kohms] and C586=0.005[mf] yield an oscillation frequency of about 2.2[kHz] with a peak-to-peak voltage of about 8[volts] (assuming a 12 volt battery power source).

As mentioned above, the error signal is applied to the positive terminal of comparator 574 while the triangle wave signal is applied to the negative terminal of comparitor 574. Thus, the signal on output terminal 594 of comparitor 574 (hereinafter "firing signal") will nominally be V+ when the error signal is larger than the triangle wave signal and V when the error signal is smaller than the triangle wave signal. This corresponds to the firing signal having a positive output value during a larger percentage of the time whenever the pressure signal falls with respect to the reference signal. Typically, all of the above described circuitry is integrated upon a chip utilized for either differential pressure transducer 526 or pressure transducer 536. Thus, there are only three connections required, namely V+, V− and the firing signal.

The firing signal is applied to the gate terminal of a power MOSFET 596. When the firing signal is positive, it turns on power MOSFET 596 and nominal battery voltage is applied to armature winding 598 of servo motor 524. When the firing signal is negative, it turns off power MOSFET 596 and any current flowing through armature winding 598 continues to flow through freewheeling power diode 600. A thermal overload type protective device 602 is utilized to protect servo motor 524 and/or power MOSFET 596 in the event of mis-firing or other faults. Preferably, the above described power circuitry is suitably packaged within servo motor 524.

Figure 24B:
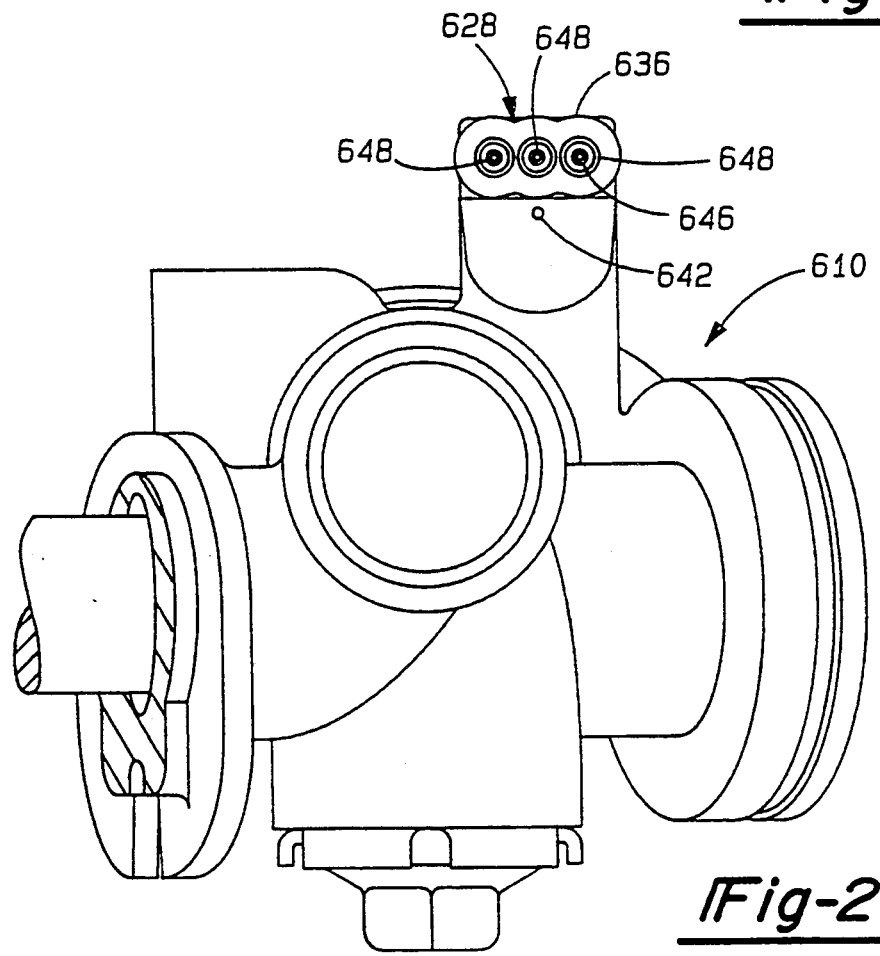
FIGS. 24A and 24B are sectional and end views, respectively, of a modified control apparatus adapted for use in the electrically powered vehicular power steering system.
Figure 24A:
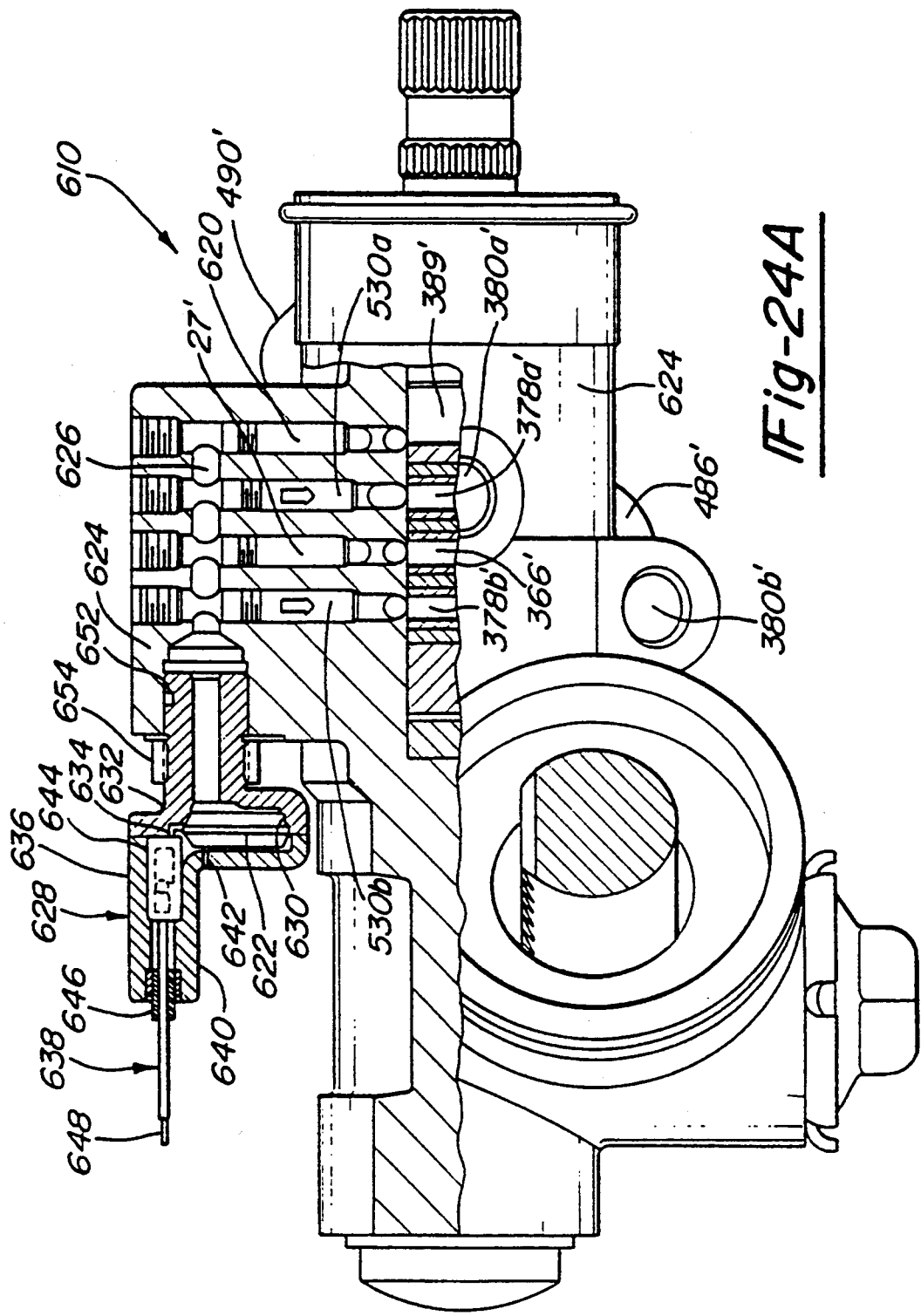

With reference now to FIGS. 24A and 24B, there is presented a vehicular power steering control apparatus 610 used in conjunction with the electrically powered regulating bootstrap system 522 instead of the pressure regulating valve assembly 452 depicted in FIGS. 19, 19A through 19D where FIG. 24A comprises a partially sectional view taken along section A—A depicted in FIG. 24B. Supplementing the various components shown therein are orifices 27' and 620, check valves 530a and 530b, and a pressure transducer 622. Hydraulically, these components are located between entry port 486', first and second output ports 380a' and 380b', respectively, and the return port 490'. As shown in FIGS. 24A and 24B, the components shown are all commercially available items. More particularly, orifices 27' and 620 are Lee JEVA orifices, check valves 530a and 530b are Lee CHEK check valves and plugs are Lee Plugs, all available from the Lee Company of Westbrook, Conn.

Physically, orifices 27' and 620, and check valves 530a and 530b are installed in vertically oriented holes formed in valve body 624 which enter input groove 366', valve chamber 389', the first output groove 378a' and second output groove 378b', respectively. Their opposite ends are in hydraulic conunuication via a hole 626, an enlarged portion of which is used for mounting pressure transducer assembly 628. Pressure transducer assembly 628 is presented wherein the pressure transducer 622 is bonded to a conically matching transducer mounting surface 630 formed in a mounting body 632. The leads 634 on pressure transducer 622 are formed at a nominally orthogonal angle and a connector 636, assembled on the end of a three wire cable 638, is positioned thereupon. A cover 640 having a vent hole 642 is bonded onto mounting body 632 at an interfacing joint 644. Cable seals 646 (which are previously assembled upon each wire 648 of three wire cable 638) are inserted into cavities formed in the cover 640 to seal wires 648. Finally, the completed pressure transducer assenlbly 628 is threadably inserted into valve body 624 via threads 652 and secured in place with a lock nut 654.

Both electrically powered vehicular power steering systems 520 or 522 have very significant application advantages over conventional electrically controlled vehicular power steering systems wherein dirigible wheel motion is directly controlled by an electric motor and/or hydraulically actuated systems wherein an electric motor is merely utilized as a prime mover to power a pump in an otherwise standard power steering system. First of all, any electrically powered system should be as efficient as possible to minimize battery drain and/or alternator load. Systems utilizing an electric motor as a prime mover in an otherwise standard system categorically fail in this regard while electrically powered vehicular power steering systems 520 and 522 have virtually the same efficiencies as is typical for totally electrical systems.

On the other hand, the electrically powered vehicular power steering systems 520 and 522 are simpler than any known totally electrical system. The electrically powered vehicular power steering systems 520 and 522 are inherently fail-safe, so they do not require complex fail-safe error measuring apparatus, circuitry and power disconnect devices. (i.e. refer to U.S. Pat. No. 4,956,590 entitled Vehicular Power Steering System by Edward H. Phillips and issued on Sep. 11, 1990 for a complete discussion of such fail-safe apparatus, the disclosure of which is expressly incorporated by reference herein).

Control of electrically powered vehicular power steering systems 520 and 522 is much simpler as well. Since servo DC motor 524 is utilized as a prime mover for the hydraulics only, it is never required to reverse or handle regenerative loads. This means that only one active power device is required to control it (namely power MOSFET 596). Typically, four such devices arrayed in an "H" configuration are required for this purpose (again refer to U.S. Pat. No. 4,956,590 for a discussion on this point). In addition, the ancillary reduction in required transducers, control circuitry and/or software with respect to conventional electronically powered systems is also a significant advantage.

With particular reference now to FIGS. 25A through 25D, a valving sub-assembly 660 is disclosed which is generally a modification to valving sub-assembly 351 incorporated into four-way valve 350 shown in FIGS. 16 A–E and valving sub-assembly 351' associated with control valve 454 shown in FIGS. 19A–19D. However, as will be fully described below, sub-assembly 660 is configured for utilization in an "open-center" four-way control valve. In general, valving sub-assembly 660 includes valve spool 662 and valve sleeve 664. Furthermore, valving sub-assembly 600 includes input orifices 676a associated with input notches 666 formed in valve spool 662, return orifices 676b associated with return notches 670 formed in valve spool 662, and first and second output slots 668a and 668b, respectively, formed in valve sleeve 664. In bootstrap hydraulic systems utilizing an "open-center" control valve having valving sub-assembly 660 incorporated therein, differential deflection between valve spool 662 and valve sleeve 664 is required to generate load pressure while tactile feedback is derived from the torque required to deflect a spring member, such as torsion bar 360 shown in FIG. 16A.

As will be appreciated, input orifices 676a and return orifices 676b are provided for regulating the passage of fluid between input notches 666 and first and second output slots 668a and 668b, respectively, as well as for regulating fluid passage between first and second output slots 668a and 668b, respectively, and return notches 670. Since valving sub-assembly 660 is preferably utilized in conjunction with a compliant member, such as torsion bar 360, torque must be applied to input splines 672 of valve spool 662 to effect either generated load pressure or rotational motion. Thus, valving sub-assembly 660 may be utilized either with, or without, a supplemental reaction torque device (i.e. such as reaction torque device 458 of power steering control apparatus 450 shown in FIGS. 19A–D).

In this regard, its function may be likened to that of a common rotary valve. However, the "controlled" supply pressure feature of the previously described hydromechanical bootstrap systems are operable to allow the excess pump flow to be by-passed directly to the system reservoir 16 (not shown). Thus, input and return orifices 676a and 676b, respectively, are configured such that superior static and dynamic performance or tactile feedback can be obtained without requiring utilization of a reaction torque device. More particularly, input notches 666 and return notches 670 are formed in valve spool 662 with laterally and divergently pointed edge contours 674a and 674b, respectively. Accordingly, the axial wodtj of input orifices 676a and return orifices 676b increase in a non-linear fashion in response to tangential motion of valve spool 662 with respect to valve sleeve 664. Thus, the width of input notches 666 and return notches 670, forming input and return orifices 676a and 676b, respectively, also increase in a nonlinear fashion with respect to the direction of valve deflection.

As will be described in greater detail, the specific amount of valve "underlap" and the desired geometric values for edge contours 674a and 674b can be readily varied in order to obtain selected valve performance parameters.

Generally, increasing the amount of valve underlap tends to shift the primary tactile feedback from torque derived via steering wheel "rotational velocity" toward torque derived from "steering force". Unfortunately, such a shift in the type of primary tactile feedback is concomitant with an increase in steering wheel position error and a shift from the previously described "type 1" servo performance toward a "type 0" servo performance.

However, utilization of the highly non-linear profiles for each of edge contours 674a and 674b is operable to substantially mitigate these less than desirable performance characteristics. Moreover, the parasitic values of the fluid by-passed via selectively closing of either input orifices 676a or return orifices 676b is also minimized. As will become apparent from a theoretical discussion below, the effect is to also minimize apparent valve compliance, at relatively low values of differential deflection, between valve spool 662 and valve sleeve 664.

With continued reference to FIGS. 25A through 25D the flow characteristics of sub-assembly 660 will now be described in greater detail. In operation, fluid provided externally by a pump (not shown) flows through input ports 678 to input slots 680 formed in valve sleeve 664 and thereafter to input notches 666 which are formed in valve spool 662. Fluid then flows through input orifices 676a to first and second output slots 668a and 668b, respectively, which are formed in valve sleeve 664, and through first and second output ports 681a and 681b, respectively, to a load (i.e. such as a power cylinder of a vehicular power steering system). Simultaneously, fluid returning from the load flows through first and second output ports 681a and 681b, respectively. Thereafter, the hydraulic fluid, along with by-passed fluid, flows through first and second output slots 668a and 668b, respectively, through return orifices 676b and to the return notches 670 which are also formed in valve spool 662. The returning fluid then flows through return slots 682 and return ports 684 to internal chamber 686. Finally, the returning fluid flows out relief holes 688, through a valve housing port and return line (neither shown) of the open-center four-way control valve in a known manner.

Supplied fluid flow (hereinafter "supply flow") to, and load flow provided by, valving sub-assentbly 660 featuring "symmetrical" orifices can be determined as follows:

$$Q_S = C_d A_1 \{(P_S - P_L)/\rho\}^{0.5} + C_d A_2 \{(P_S + P_L)/\rho\}^{0.5} \text{ and} \quad (20)$$

$$Q_L = C_d A_1 \{(P_S - P_L)/\rho\}^{0.5} - C_d A_2 \{(P_S + P_L)/\rho\}^{0.5} \quad (21)$$

respectively, where $Q_S$ is supply flow, $Q_L$ is load flow, $C_d$ is the effective average discharge coefficient of sets of input orifices 676a and return orifices 676b (actual values of the discharge coefficients of input orifices 676a and return orifices 676b vary significantly as will be shown below), $A_1$ is the effective area of first sets of both input orifices 676a and return orifices 676b for any particular value of valve deflection, (actual values of either type of orifice area are adjusted by varying their nominal angles of incidence in order to compensate for varying values of $C_d$ as is also discussed below), $P_S$ and $P_L$ are supply and load pressures, respectively, and $\rho$ is mass density of the hydraulic fluid (i.e. with a typical value of 0.000078[lb-sec$_2$/in$_4$]).

Since valving sub-assembly 660 is adapted for use in a bootstrap system, $P_S - P_L = \Delta P$ while $C_d$, $A_1$ and $A_2$ are determined by geometric values chosen for edge contours 674a and 674b, and first and second output slots 668a and 668b, respectively. A preferred geometry for edge contours 674a and 674b is defined by a quadratic curve wherein the width of input orifices 676a and return orifices 676b increases nominally with the square of the distance of their tangential opening. This leads to derived values for $A_1$ and $A_2$ of:

$$A_1 = K(X_{VO} + X_V)^3 \text{ and} \quad (22)$$

$$A_2 = K(X_{VO} - X_V)^3 \quad (23)$$

where K is a selected constant that is dependent upon an actual chosen geometry (including the angles of incidence) for input and return orifices 676a and 676b, respectively, $X_{VO}$ is the nominal (i.e. with an unstressed torsion bar) tangential opening of either of edge contours 674a and 674b (which are usually chosen to be identical so that each corresponding set thereof closes simultaneously), and $X_V$ is supplemental (i.e. controlled) differential deflection of valve spool 662 and valve sleeve 664.

Figure 26A:
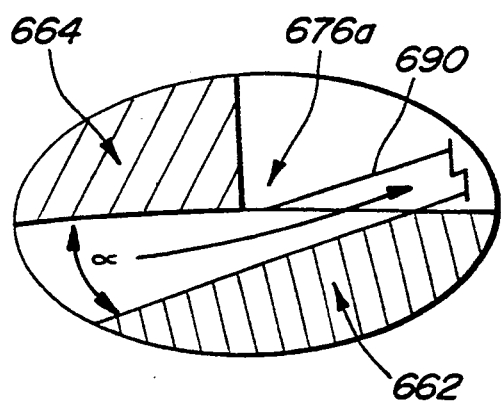
FIGS. 26A and 26B are enlarged views depicting fluid flow from an input orifice into an output slot, and from an output slot into a return orifice, respectively.
Figure 26B:
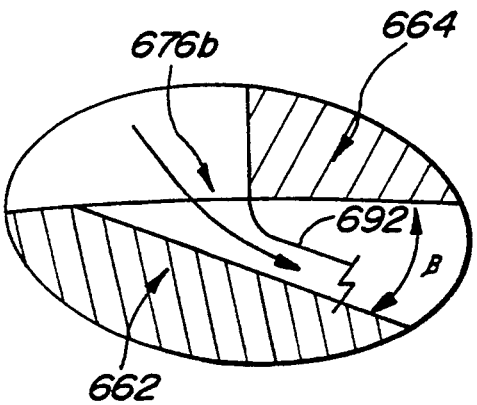

As previously noted, the actual values of discharge coefficient $C_d$ vary dramatically depending upon whether the direction of fluid flow is out of, or into, an orifice as is shown in FIGS. 26A and 26B. More particularly, FIG. 26A shows fluid flow out of an input orifice 676a and into an output slot 668a or 668b. As indicated by boundary streamline 690, the direction of flow suffers little change and is thus indicative of a relatively large value of discharge coefficient. On the other hand, FIG. 26B illustrates fluid flow into a return orifice 676b from an output slot 668a or 668b. As indicated by streamline 692, there is a relatively significant change of flow direction which is indicative of a relatively small value of discharge coefficient. For economical manufacturing reasons, it is desirable to form edge contours 674a and 674b with an identical lateral configuration. Thus, a preferred method of achieving different orifice areas is to vary their angle of incidence.

Figure 25A:
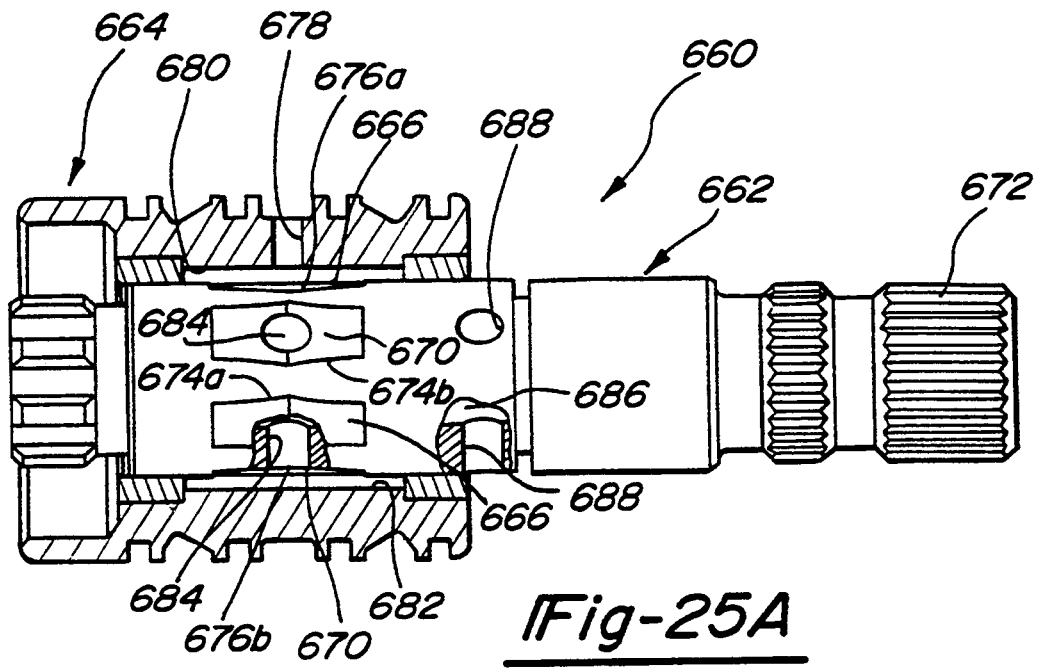
FIGS. 25A–D are views depicting various features of an open-center four-way control valve assembly of the type well-suited for use in the vehicular power steering control apparatus of FIGS. 19A–D, and which is configured to include input and return orifices having non-linearly increasing width dimensions.
Figure 25B:
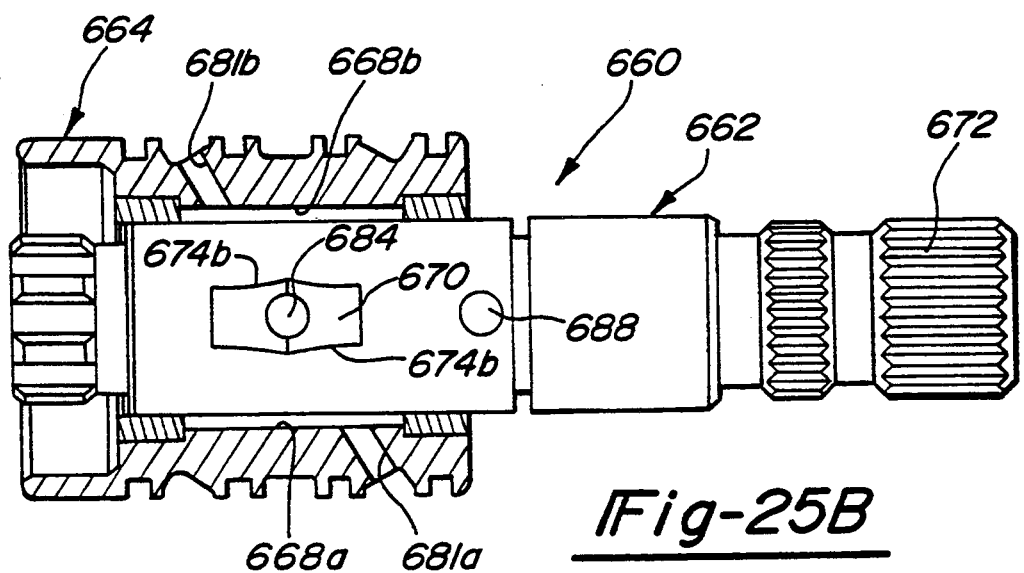
Figure 25D:
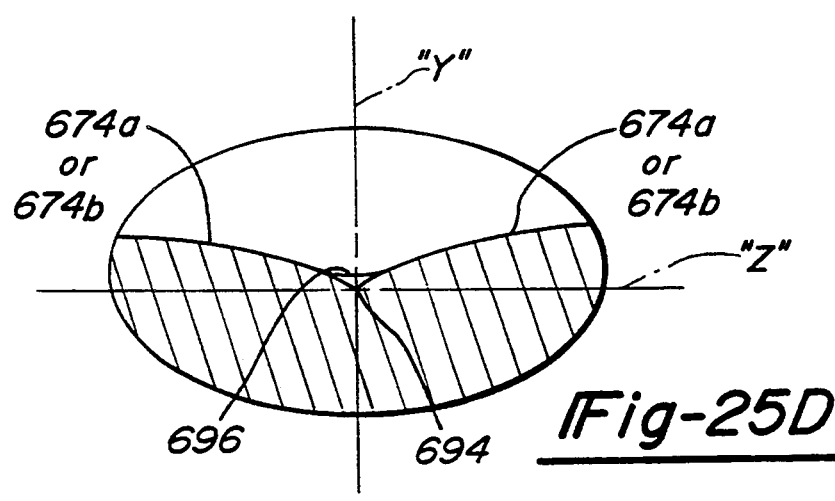
Figure 25C:
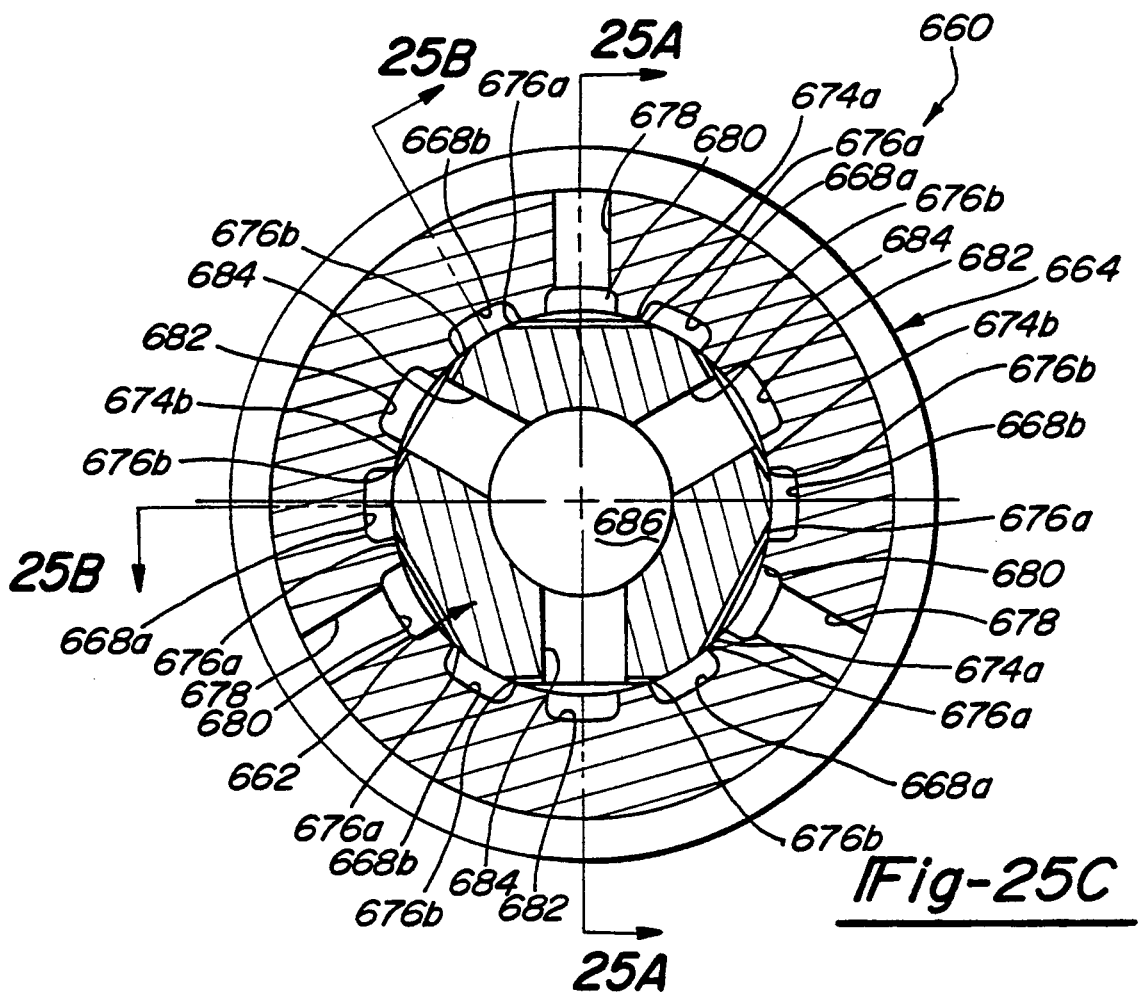

One method of varying the angle of incidence can be seen in FIG. 25C wherein first and second output slots 668a and 668b, respectively, are symmetrically positioned (in mirrored fashion) closer to input slots 680 than return slots 682. Concomitantly, edge contour 674a is formed with a substantially identical contour or shape, but at less depth, than edge contour 674b such that complete orifice closure is obtained with the same deflection angle for input orifices 676a as for return orifices 676b. All of this results in incidence angle $\alpha$ (as shown in FIG. 26A for input orifices 676a) that is smaller than incidence angle $\beta$ (as shown in FIG. 26B for return orifices 676b). Since the actual opening height is related to the sine of the incidence angle it follows that return orifices 676b have a larger value of opening height than input orifices 676a. Further, since the actual orifice areas are determined by the cubic functions noted above, relatively small differences (i.e. in the order of two degrees) in the incidence angle can compensate for the significantly differing values of flow coefficient between input orifices 676a and return orifices 676b.

For providing a detailed understanding of the principles of the present invention, a preferred design procedure is illustrated by the following specific example. However, it will be understood that the example is intended to be merely descriptive and exemplary in nature without limiting the scope of the invention disclosed herein. For the example, assume incidence angles $\alpha = 18$[deg] and $\beta = 20$[deg], individual values of discharge coefficient 0.90 and 0.66, respectively, value for $P_S - P_L = 40$[lb/in$^2$], value for $X_{VO} = 0.018$[in] and maximum controlled flow rate at a value of $X_V = X_{VO}$ equal to 5 in$^3$/sec]). The valves for the incidence angles and discharge coefficients selected are seen to be highly consistent because the product $0.90(\sin \alpha)^3$ is nominally equal to the product $0.66(\sin \beta)^3$. Thus, further calculation is simplified by using the values $\beta = 20$[deg] and $C_d = 0.66$. The actual calculation procedure is as follows:

$A_{1max}$ is calculated at a value of $X_V = X_{VO}$ by inserting the above noted values into equation 21 to solve for $A_{1max}$ which is found to have the value 0.00353[in$^2$] for each one of the three sets of orifices. $A_{1max}$ is also equal to the integration of $Ky^2 dy$ between the limits 0.0 and $2X_{VO}\sin\beta$, or $K\{(X_{VO}+X_V)\sin\beta\}^3/3$, which results in $K = 5,670[1/\text{in}]$. Then, any particular value of $A_1$ can be found by using this value for K and performing the same integration between the limits 0.0 and $(X_{VO}+X_V)\sin\beta$, or $A_1 = 1,890\{(X_{VO}+X_V)\sin\beta\}^3$. In addition, fabrication details for each edge contour 674a and 674b include the contour formula and maximum notch height and width wherein:

$$|Z| = 2,830\ Y^2, \tag{24}$$

$$Y_{max} = 0.036\sin 20° = 0.0123[\text{in}],\ \text{and} \tag{25}$$

$$2|Z|_{max} = 5,670(0.036\sin 20°)^2 = 0.854[\text{in}] \tag{26}$$

With continued reference to FIG. 25D, a very highly magnified view of the center portion of either contour 674a or 674b is shown. Theoretically, junction point 694 comprises an infinitely sharp cusp. However, utilizing a finite radius, such as indicated by curved line 696, results in a deviation from the theoretical curve whose axial length (i.e. in the direction of dimension "Z") is even less than the radius itself. Thus, conventional forming methods, such as by a grinding operation similar to thread grinding, can yield geometries for edge contours 674a and 674b that are more than adequate.

Figure 27A:
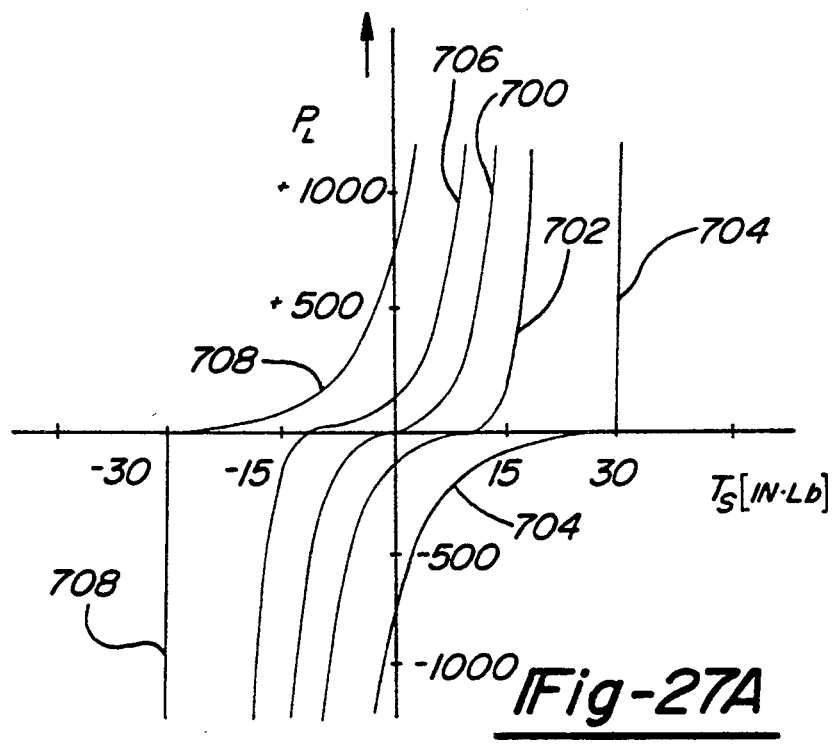
FIGS. 27A through 27C graphically illustrate exemplary static and dynamic performance characteristics for the open-center four-way control valve shown in FIGS. 25A through 25D.
Figure 27B:
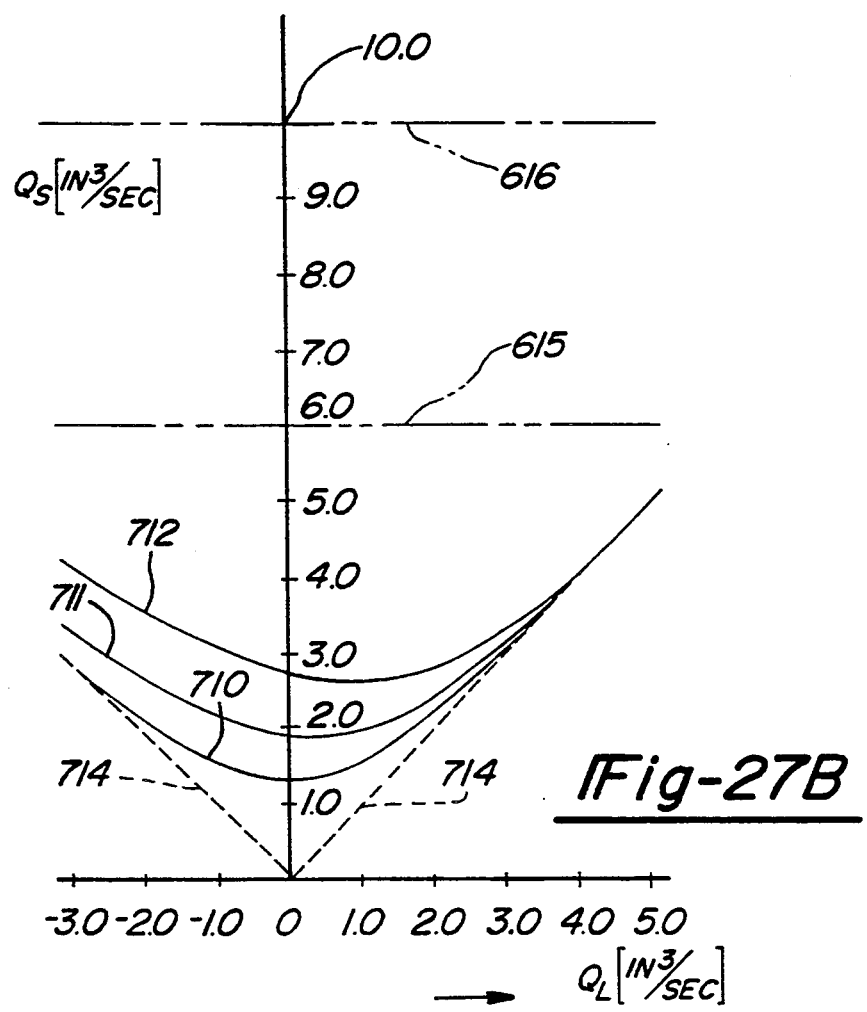
Figure 27C:
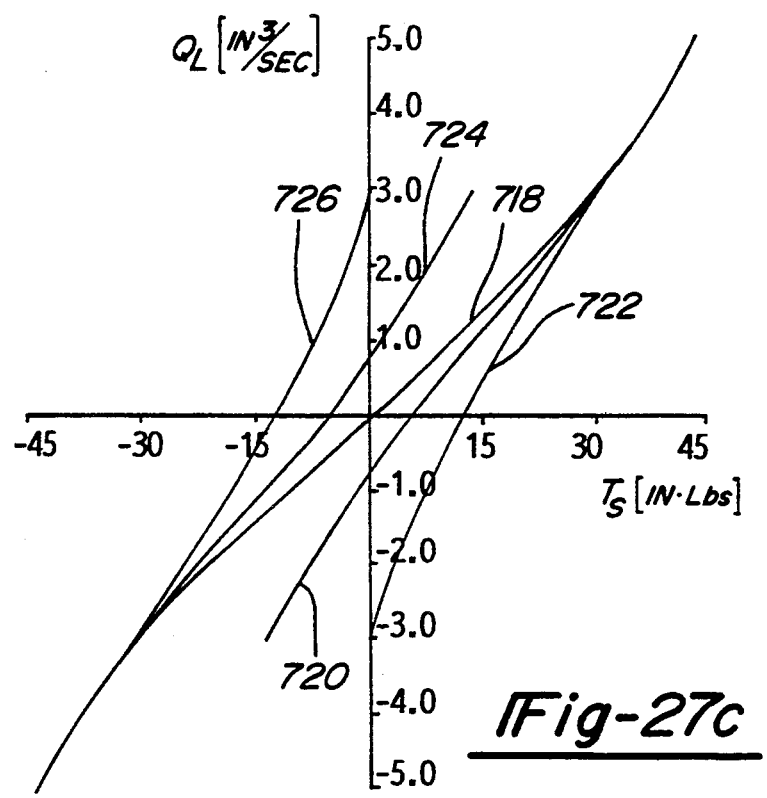

With reference now to FIGS. 27A through 27C, various graphs are presented for illustrating exemplary performance tactile feedback characteristics for valving sub-assembly 660 in accordance with Equations 20 and 21 and the numerical assumptions presented above. In particular, FIG. 27A shows various curves that relate load pressure $P_L$ to applied steering torque $T_S$. Curve 700 is the familiar static performance curve (where $Q_L = 0.0[\text{in}^3/\text{sec}]$) that is typically used for calibrating rotary valves by matching the positive and negative arms thereof in appropriate test fixturing. However, curves 702, 704, 706 and 708 are dynamic performance curves with load flow values $Q_L$ of $1.0[\text{in}^3/\text{sec}]$, $3.0[\text{in}^3/\text{sec}]$, $-1.0[\text{in}^3/\text{sec}]$, and $-3.0[\text{in}^3/\text{sec}]$, respectively provided by valving sub-assembly 660. Development of such curves was not heretobefore considered possible for conventional rotary control valves since load flow $Q_L$ through such rotary control valves is typically so poorly controlled that it is considered undefinable.

As seen in FIG. 27B, curves 710, 711 and 712 relate supply flow $Q_S$ to load flow $Q_L$ for load pressure values $P_L$ of $0.0[\text{lb/in}^2]$, $100.0[\text{lb/in}^2]$ and $800.0\text{lb/in}^2$, respectively. Dashed line 714 indicates a flow relationship wherein volumetric efficiency is 100%, and which can be substantially duplicated with the balanced closed-center four-way control valves previously detailed. Because supply flow $Q_S$ is larger than load flow $Q_L$, valving sub-assembly 660 is particularly optimized for use in power steering systems which are preferably configured as hydromechanical "by-pass" bootstrap systems wherein the significantly greater volume of the supply flow, provided by the pump, is by-passed directly to the system reservoir. As will be appreciated, even though system efficiencies are slightly reduced when compared with power steering systems disclosed hereinabove (i.e. those utilizing closed-center four-way valves), power steering systems using valving sub-assembly 660 can be seen to be significantly more efficient than conventional power steering systems which use valving sub-assemblies that actually consume all of the fluid flow as depicted by curves 615 and 616. In particular, open-center control valves associated with conventional power steering systems utilize supply volumetric fluid flows that typically range between $6[\text{in}^3/\text{sec}]$ and $10[\text{in}^3/\text{sec}]$ (i.e. as depicted by reference lines 615 and 616, respectively, in FIG. 27B). As such, power steering systems using valving sub-assembly 660 provide significant advantages when compared thereto.

Moreover, since many power steering systems are presently utilizing electric motor driven pumps in association with the highly inefficient conventional valving sub-assemblies, it is apparent that valving sub-assembly 660 can also be effectively used with the electrically powered regulating bootstrap systems 520 and 522 described and shown in reference to FIGS. 21 and 22, respectively. In either case, valving sub-assembly 660 would be incorporated into four-way control valve 20 instead of one of the closed-center valving assemblies described hereinbefore.

Shown in FIG. 27C are curves 718, 720, 722, 724 and 726 which relate load flow $Q_L$ to applied steering torque $T_S$ for load pressure $P_L$ values of $0.0[\text{lb/in}^2]$, $100.0[\text{lb/in}^2]$, $800.0[\text{lb/in}^2]-100.0[\text{lb/in}^2]$ and $800.0[\text{lb/in}^2]$, respectively. The slope of each of these curves represents the inverse of mechanical input impedance to valving sub-assembly 660, where such mechanical input impedance is expressed as a ratio of applied torque to output flow. For instance, curve 718 ($P_L = 0.0[\text{lb/in}^2]$), crosses the origin with a slope of about 41° indicating an impedance value of the inverse of 0.087 or about $11.5[\text{lb-sec/in}^2]$. This decreases to about $7.8[\text{lb-sec/in}^2]$ and $4.7[\text{lb-sec/in}^2]$, respectively, at the point where curves 720 ($P_L = 100.0[\text{lb/in}^2]$) and 722 ($P_L = 800.0[\text{lb/in}^2]$) have load flow values of zero.

A known disadvantage of conventional rotary valve equipped power steering systems is that they typically suffer from excessive compliance at low applied torque values. However, the unique design features associated with valving sub-assembly 660 act to significantly reduce such compliance. This is due primarily to the significantly non-linear and therefore smaller orifice configuration used in sub-assembly 660. This design feature is, of course, only now applicable since most of the hydraulic fluid supplied to the power steering system is by-passed directly to a reservoir such as resevoir 16. In fact, the tactile "stiffness" of such a by-pass bootstrap type power steering system approximates that of a manual steering system. This is because less torque is applied to the steering column and the minimal compliance contributed by valving sub-assembly 660 is offset by less torsional deflection of the steering column components.

To exemplify this point, the stiffness of a manual steering system can be determined by:

$$(dF/d\Theta_S)_{Man} = K_{SC}/R_P \tag{27}$$

where $(dF/d\Theta_S)_{Man}$ is the ratio of output steering force to steering wheel rotational error angle for a manual steering system, $K_{SC}$ is the cumulative rotational stiffness of the steering column components and $R_P$ is the radius of the steering pinion that couples the steering shaft to the rack portion of the steering gear. Typical values are $K_{SC} = 2,400[\text{in-lb}]$ and $R_P = 0.314[\text{in/rad}]$ which yield $(dF/d\Theta_S)_{Man} = 7640[\text{lb/rad}]$.

For comparative purposes, the stiffness of a power steering system utilizing valving sub-assembly 660 can be determined by:

$$(dF/d\Theta_S)_{PS} = [\{A_P R_V (\delta Q_L/\delta X_V)/(\delta Q_L/\delta P_L)\} + K_T\text{-}/R_P]\{K_{SC}/(K_{SC} + K_T)\} \quad (28)$$

where $(dF/d\Theta_S)_{PS}$ is the ratio of output steering force to steering wheel rotational error angle for a power steering system, $A_P$ is power cylinder piston area, $R_V$ is valve orifice radius, $(\delta Q_L/\delta X_V)$ is the partial derivative of load flow with respect to tangential valve displacement, $(\delta Q_L/\delta P_L)$ is the partial derivative of load flow with respect to load pressure, and $K_T$ is torsion bar stiffness. Evaluating these factors at zero load flow $Q_L$ and pressure $P_L$ results in the lowest stiffness value. From the assumed and calculated values under these conditions (i.e. $A_P = 1.17[\text{in}^2]$, $R_V = 0.3937[\text{in}]$, $(\delta Q_L/\delta X_V)/(\delta Q_L/\delta P_L) = 13,330[\text{lb/in}^3]$ and $K_T = 795[\text{in-lb}])$ the value of $(dF/d\Theta_S)_{PS} = 6830[\text{lb/rad}]$ which is about 89% of the value calculated above for a manual steering system.

Figure 28:
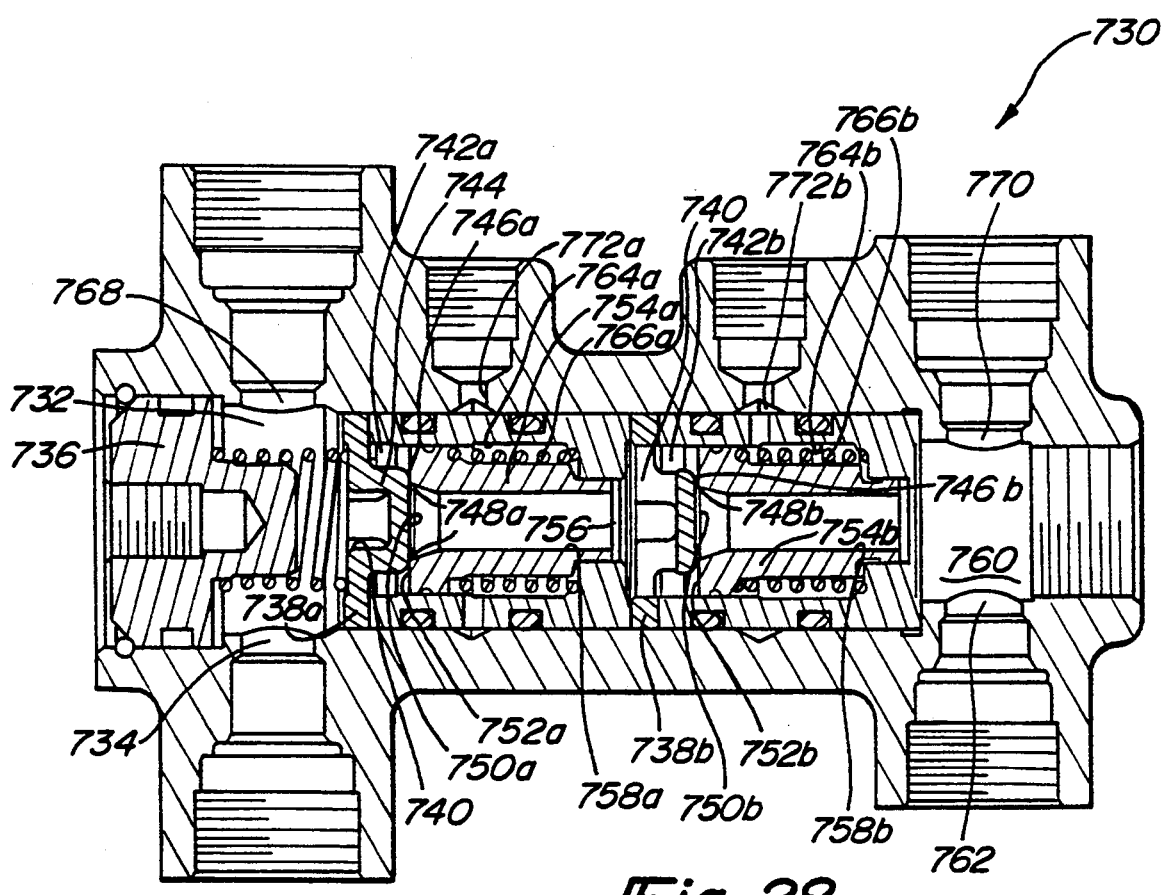
FIG. 28 is a sectional view of a ninth preferred embodiment of a pressure regulating valve assembly.

With reference now to FIG. 28, there is presented a ninth preferred embodiment of a pressure regulating valve assembly 730. Functionally, pressure regulating valve assembly 730 combines selected features of pressure regulating valve assemblies 30e (shown in FIG. 8) and 234b (shown in FIG. 13). Moreover, it can function as a substitute for either of pressure regulating valve assemblies 234 or 238 shown in FIGS. 10 through 13. However, pressure regulating valve assembly 730 differs from the previously disclosed pressure regulating valve assemblies in that it utilizes a simpler mechanical configuration having generally axially directed fluid flow paths passing through two identical pressure regulating sub-assemblies.

In operation, pressurized hydraulic fluid enters first chamber 732 from input line 28 (or delivery line 18) via input port 734. First chamber 732 is formed between pressure bulkhead 736 and first nozzle 738a. First nozzle 738a is identical to second nozzle 738b and comprises flow passages 740 which convey the by-passed fluid to first annular chamber 742a. (The first and second nozzles 738a and 738b, respectively, are shown indexed with respect to one another to illustrate the mechanical integrity provided by web sections 744.) The by-passed hydraulic fluid then flows through a first annular passage 746a and a first circumferential exit nozzle 748a formed between end surface 750a of first nozzle 738a and an end surface 752a of a first moveable valve member 754a. The by-passed hydraulic fluid then enters second chamber 756 via an intermediate passage 758a formed in first moveable valve member 754a. Thereafter, the by-passed hydraulic fluid flows through flow passages 740 formed in second nozzle 738b to a second annular chamber 742b. From there the fluid flows through a second annular passage 746b and a second circumferential exit nozzle 748b formed between end surface 750b of second nozzle 738b and an end surface 752b of a second moveable valve member 754b.

As clearly described above with respect to pressure regulating valve assembly 30a (FIGS. 3A and 3B), kinetic energy loss concomitant with flow through exit nozzles 748a and 748b accounts for the dominant pressure drops associated with pressure regulating valve assembly 730. First and second load lines 22a and 22b, respectively, communicate with first and second control chambers 764a and 764b, respectively, to biasingly act on first and second moveable valve members 754a and 754b, respectively. As seen, springs 766a and 766b act on their respective moveable valve member 754a and 754b within control chambers 764a and 764b, respectively.

Finally, the by-passed hydraulic fluid returns to reservoir 16 via passage 758b formed in second moveable valve member 754b, return chamber 760 and return port 762. As such, the "pressure regulated" supply flow $Q_S$ is delivered to the four-way control valve (not shown) via delivery port 768 and returned therefrom via return port 770. Concomitantly, fluid pressure present in either of first and second load lines 22a and 22b, respectively, is differentially applied to first and second moveable valve members 754a and 754b, respectively, within first and second control chambers 764a and 764b, respectively, for regulating fluid pressure in a fashion substantially identical to that described in detail for valve 234b of FIG. 13 via first and second control ports 772a and 772b, respectively.

Figure 29:
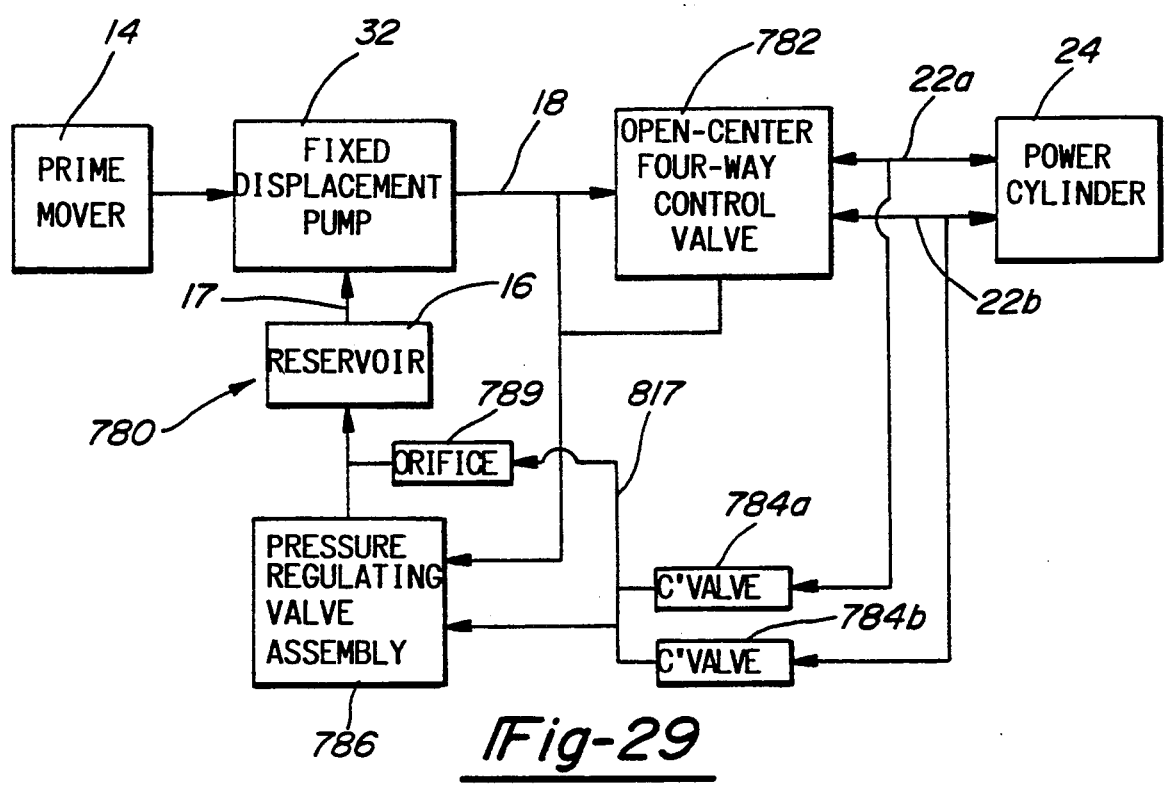
FIG. 29 is block diagram of a simplified vehicular power steering system constructed in accordance with the teachings of the present invention.

With reference now to FIG. 29, a block diagram representing a simplified vehicular power steering system 780 is shown. Functionally, vehicular power steering system 780 is similar to by-pass bootstrap system 230 (FIG. 10) wherein pressure regulating valve assembly 234a (FIG. 12) is utilized as pressure regulating valve assembly 234. However, the by-pass bootstrap power steering system 780 utilizes an open-center four-way control valve 782 within which valving sub-assembly 660 is operably incorporated. As in regulating valve assembly 234a, first and second check valves 784a and 784b, respectively, are used to conduct hydraulic fluid from the one of first and second load line 22a and 22b, respectively, having a higher valued pressure to a pressure regulating valve assembly 786 via regulating line 788. Similarly to pressure regulating valve assembly 234, pressure regulating valve assembly 786 by-passes excess fluid delivered to pump delivery line 18 back to reservoir 16. The fluid flowing into pressure regulating valve assembly 786 via regulating line 788 is also returned to reservoir 16 via an orifice 789. As will be appreciated, pressure regulating valve 786 is intended to generically identify any previously described embodiment of a pressure regulating valve that is suitable for power steering system 780.

Figure 30:
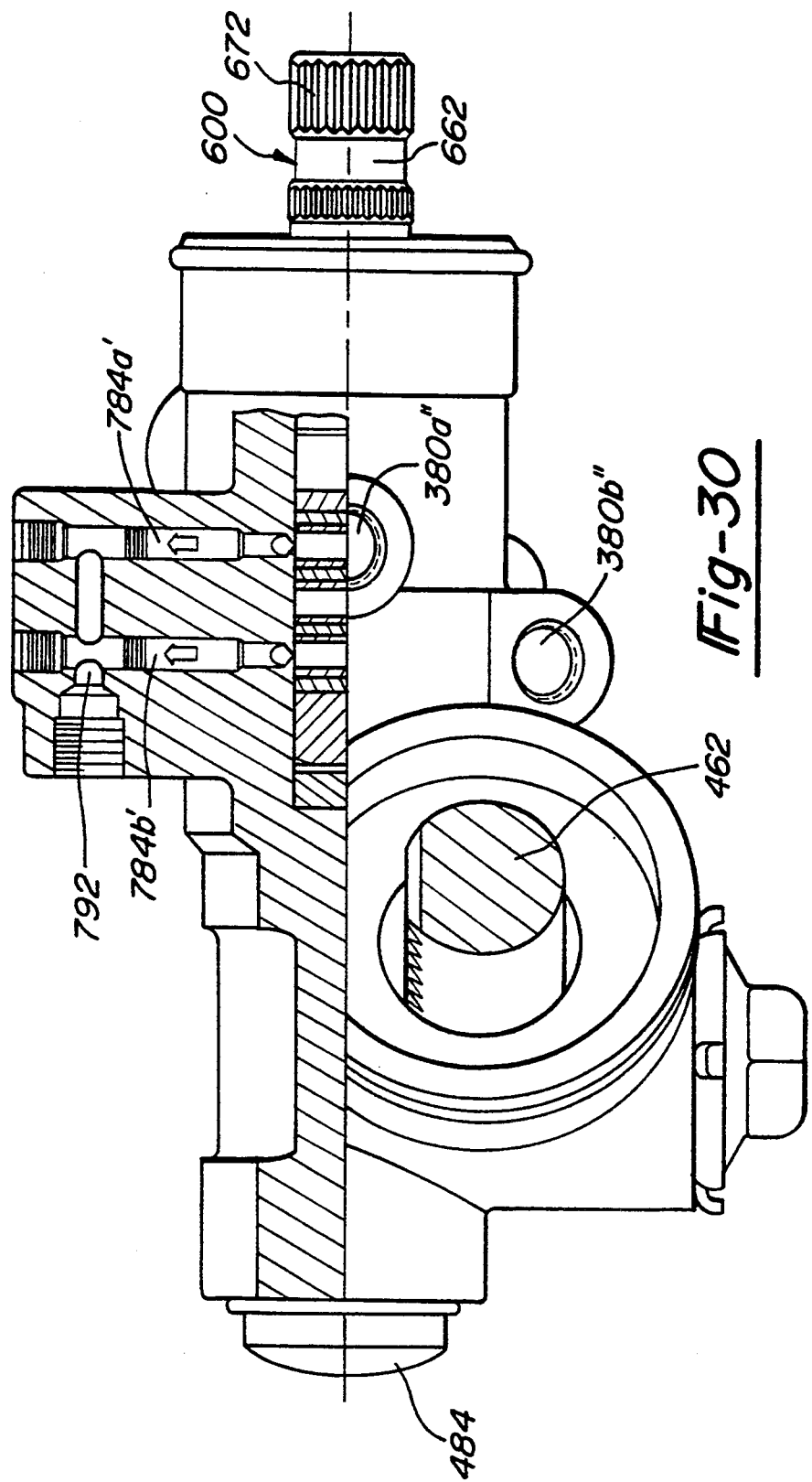
FIG. 30 is a sectional view of a modified power steering control apparatus adapted for use in the vehicular power steering system shown in FIG. 29.

With reference now to FIG. 30, there is presented a vehicular power steering control apparatus 790 having valving sub-assembly 660 installed therein and which is adapted for use in conjunction with vehicular power steering system 780. Supplementing the various previously described components are check valves 784a' and 784b', and regulating port 792. Hydraulically, check valves 784a' and 784b' are located in parallel with first and second output ports 380a" and 380b", respectively. As explained above in conjunction with vehicular power steering control apparatus 610, check valves 784a' and 784b' are commercially available items. They serve to deliver a relatively small flow of hydraulic fluid from the one of first and second output ports 380a" and 380b", respectively, having a higher pressure valve to regulating port 792 from which it is conveyed to a suitable pump, pressure regulating valve and reservoir arrangement via regulating line 788.

The fluid flowing through regulating line 788 tends to load valving sub-assembly 660 unsymmetrically. This is because fluid delivered via one of input orifices 676a is not balanced by returning flow into the other respective one of return orifices 676b. As explained above in conjunction with FIGS. 26A and 26B, such imbalances can be accommodated by further varying the angle of incidence. In this case, more fluid is delivered from an input orifice 676a than is returned by the other respective one of return orifices 676b. Thus, a closer approximation to balanced operation can be achieved by slightly increasing the incidence angle α and decreasing the incidence angle β (i.e. making them closer to one another in value).

Figure 31:
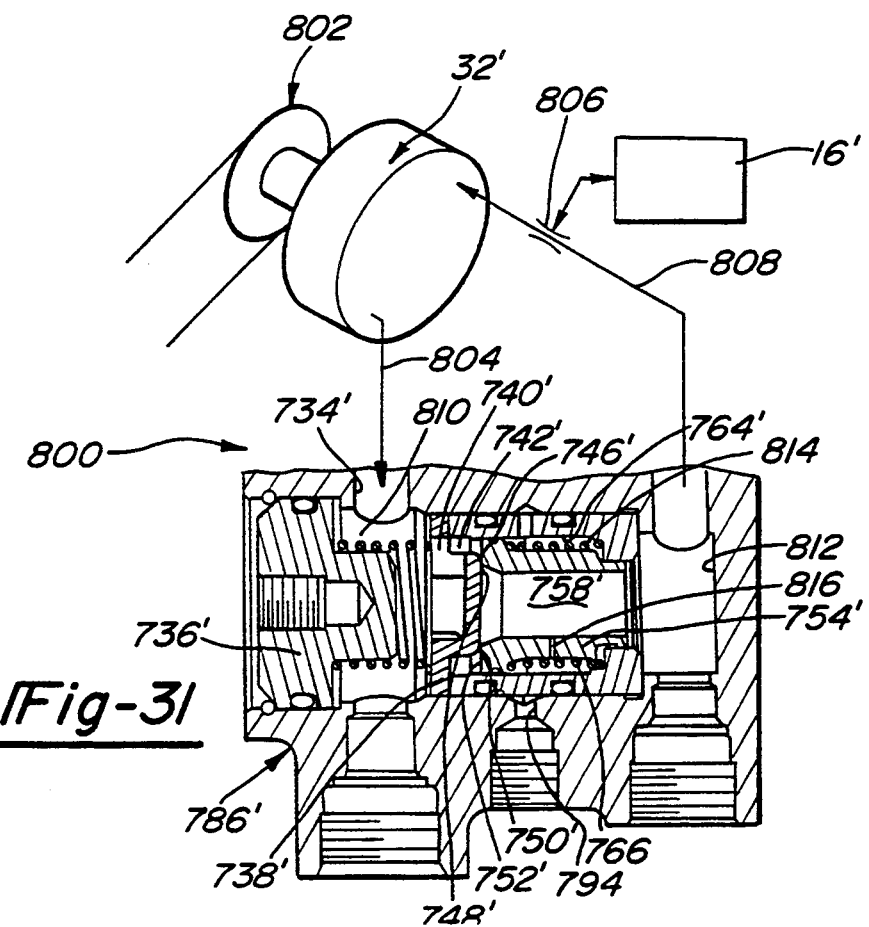
FIG. 31 is a partially diagrammatic view of a combination pump, pressure regulating valve and reservoir assembly including a tenth preferred embodiment of a pressure regulating valve assembly and which is particularly well-suited for use with the vehicular power steering system shown in FIG. 29.

With reference now to FIG. 31, there is presented a partially diagrammatic view of combination pump, pressure regulating valve and reservoir arrangement 800. Functionally speaking, combination arrangement 800 is constructed in a manner similar to previously disclosed vehicular power steering systems. More particularly, combination arrangement or assembly 800 includes a fixed displacement pump 32' driven from the vehicle's engine (not shown) via a belt and pulley arrangement 802, an internal delivery line 804, and a reservoir 16' communicating with an inlet side of the fixed displacement pump 16' via a low pressure portion 806 of an internal return line 808. However, pressurized hydraulic fluid in internal delivery line 804 is delivered to an input chamber 810 of a pressure regulating valve assembly 786' and delivered back to internal return line 808 from a return chamber 812 thereof rather than via the usual flow regulating assembly typically found in previous vehicular power steering pump assemblies.

In operation, pressurized hydraulic fluid enters input chamber 810 via input port 734'. Input chamber 810 is formed between pressure bulkhead 736' and nozzle 738'. Nozzle 738' comprises flow passages 740' which convey by-passed fluid to annular chamber 742'. The by-passed hydraulic fluid then flows through an annular passage 746' and a circumferential exit nozzle 748' formed between end surface 750' of nozzle 738' and an end surface 752' of moveable valve member 754'. Thereafter, the by-passed hydraulic fluid enters return chamber 812 via an intermediate passage 758' formed in moveable valve member 754'.

As seen, the components utilized in pressure regulating valve assembly 786' are functionally similar to those used in the pressure regulating valve assembly 730. However, in pressure regulating valve assembly 786' the components must be physically proportioned to handle significantly increased values of by-passed fluid flow because virtually all of the pump output flow must be by-passed therethrough. Since that volume can be in the order of 40[in³/sec] at high engine speeds, this can amount to at least a four-fold increase in volumetric flow.

As described hereinabove, kinetic energy loss concomitant with flow through exit nozzle 748' accounts for the dominant pressure drop associated with pressure regulating valve assembly 786'. Fluid flowing through regulating line 788 communicates with control chambers 764' via control port 794 to biasingly act on moveable valve member 754'. Spring 766' acts on moveable valve member 754' within control chamber 814. In addition, a small orifice 816 is preferably formed in moveable valve mealher 754', which function as orifice 789 of block giagram 780, to allow the fluid flowing through regulating line 788 to exhaust into intermediate passage 758' and internal return line 808. The size of orifice 816 is chosen such that symptoms of "hydrostatic lock" are absent when load pressure is reduced and pressure in annular chamber 742' exerts force on the moveable valve member 754' in attempting to move it to a new equilibrium position. Orifice 816 is preferably located within valve member 454' to provide a flow path for continuously purging regulating line 817 (FIG. 29).

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of providing tactile feedback for a power steering system in response to rotational inputs applied to a steering wheel, said method comprising the steps of:

providing hydraulic fluid at a preselected pressure as a function of a load pressure by pressure regulating means;

providing means for receiving said rotational inputs, said receiving means including an open-center control valvehaving first and second resiliently coupled valve members;

supplying said hydraulic fluid at said preselected pressure to an inlet port of said open-centered control valve;

providing fluid communication between first and second output ports of said open-center control valve and first and second ports of a power output transducer, respectively;

controlling the differential output pressure applied to said first and second ports of said power output transducer and the differential fluid flow therebetween in response to said rotational inputs, said differential output pressure defining said load pressure; and generating said tactile feedback as a function of both of said differential output pressure and said differential fluid flow.

2. The method of claim 1 wherein said pressure regulating means is operable for providing said preselected fluid pressure from a hydraulic flow source.

3. The method of claim 1 wherein said pressure regulating means is operable for providing said preselected fluid pressure from a regulated pressure source.

4. The method of claim 1 wherein said first valve member of said control valve is formed as a valve spool and said second valve member of said control valve is formed as a valve sleeve, said valve spool being positioned within said valve sleeve for rotation relative thereto, forming output slots in said valve sleeve and forming notches in said valve spool for defining control orifices that are operable for regulating the passage of fluid between said notches and said output slots, and configuring said control orifices to increase in a non-linear fashion with respect to valve deflection between said valve spool and said valve sleeve.

5. The method of claim 4 wherein said notches formed in said valve spool are formed as input notches and return notches each having laterally and divergently pointed edge contours which define said control orifices.

6. The method of claim 5 causing the axial length of said input orifices and said return orifices to increase in a substantially non-linear fashion in response to tangential motion of said valve spool.

7. A hydro-mechanical control system for a motor vehicle power steering system operable to selectively control the flow of hydraulic fluid to first and second input ports of a power output transducer for controlling the positioning of a mechanical device in response to rotational input applied to a steering wheel by a vehicle operator, said hydro-mechanical control system comprising:

a fluid reservoir;

pump means in fluid communication with said reservoir, and operable for providing a source of pressurized hydraulic fluid;

a control valve assembly having receiving means for receiving said rotational inputs, an inlet port, a return port and first and second output ports;

supply line means for delivering said pressurized hydraulic fluid from said pump means to said inlet port of said control valve assembly;

return line means for fluidly interconnecting said control valve return port to said fluid reservoir;

first and second load lines fluidly interconnecting said first and second output ports of said control valve assembly with said first and second input ports of said power output transducer respectively, said control valve assembly being operable to control the differential output pressure applied to said first and second ports of said power output transducer and the differential fluid flow therebetween in response to said rotational inputs, said differential output pressure defining a load pressure;

pressure regulating means in fluid communication with said supply line means and said fluid reservoir, said pressure regulating means operable for regulating the fluid pressure in said supply line means to be nominally equal to the absolute value of said load pressure summed with a supplemental fluid pressure;

said control valve assembly including a valve sleeve selectively rotatable within a central bore of a valve housings, and wherein said means for receiving rotational inputs is a valve spool selectably rotatable within a central bore of said valve sleeve, said control valve assembly being configured in an open-centered manner; and wherein said control system is operable for generating tactile feedback as a function of said differential output pressure and said differential fluid flow.

8. The hydro-mechanical control system of claim 7 wherein said control valve assembly includes control orifices configured to increase in width in a non-linear fashion with respect to relative rotation between said valve spool and said valve sleeve.

9. The hydro-mechanical control system of claim 8 wherein said control orifices are defined by laterally and divergently pointed edge contours of notches formed in said valve spool.

10. The hydro-mechanical control system of claim 9 wherein said notches are input and return notches, said input notches defining input orifices and said return notches defining return orifices, and wherein the axial length of said input and return orifices increase in a non-linear fashion with respect to said relative motion.

11. An electro-hydro-mechanical control system for a motor vehicle power steering system operable to selectively control the flow of hydraulic fluid to first and second input ports of a power output transducer for controlling the positioning of a mechanical device, said electro-hydro-mechanical control system comprising:

a fluid reservoir;

pump means in fluid communication with said reservoir and operable for providing a source of pressurized hydraulic fluid;

an open-center control valve assembly having an inlet port, a return port and first and second output ports;

supply line means for delivering said pressurized hydraulic fluid from said pump means to said inlet port of said control valve assembly;

return line means for fluidly interconnecting said control valve return port to said fluid reservoir;

first and second load lines fluidly interconnecting said first and second output ports of said control valve assembly with said first and second input ports of said power output transducer respectively, said control valve assembly being operable to control the differential output pressure applied to said first and second ports of said power output transducer and the differential fluid flow therebetween in response to said rotational inputs, said differential output pressure defining a load pressure;

restriction means for defining a restrictive flow path between said supply line means and an intermediate line;

first and second check valve means interconnecting said intermediate line to said first and second load lines respectively, said first and second check valve means operable to permit unidirectional flow from said intermediate line to one of said first and second load lines having a lower fluid pressure value;

means for generating an electrical signal indicative of a fluid pressure value in said intermediate line;

means for selectively regulating said pump means in response to said electrical signal;

said control valve assembly including a valve sleeve selectively rotatable within a central bore of a valve housing, and wherein said torque receiving means is a valve spool selectably rotatable within a central bore of said valve sleeve, said control valve assembly being configured in an open-centered manner; and wherein said control system is operable for generating tactile feedback as a function of said differential output pressure and said differential fluid flow.

12. The electro-hydro-mechanical control system of claim 11 wherein said control valve assembly includes control orifices configured to increase in width in a non-linear fashion with respect to relative rotation between said valve spool and said valve sleeve.

13. The electro-hydro-mechanical control system of claim 12 wherein said control orifices are defined by laterally and divergently pointed edge contours of notches formed in said valve spool.

14. The electro-hydro-mechanical control system of claim 13 wherein said notches are input and return notches, said input notches defining input orifices and said return notches defining return orifices, and wherein the axial length of said orifices increase in a non-linear fashion with respect to said relative motion.

15. The electro-hydro-mechanical control system of claim 11 wherein a preselected pressure differential is maintained at a nominally constant value independent of flow through said first and second load lines and/or said load pressure.

16. A control valve adapted for use in combination with a hydraulic power cylinder of a power steering system, comprising:

a valve sleeve formed in a peripheral wall thereof with a port for connection to a source of fluid at a preselected pressure and first and second output ports respectively for connection to opposite fluid chambers of said power cylinder, said valve sleeve being formed at the inner periphery thereof with circumferentially spaced input and output slots in open communication with said input and output ports; and a valve spool compliantly coupled within said valve sleeve for relative rotation thereto, said valve spool being formed with circumferentially spaced control notches which are arranged to correspond with said valve sleeve slots when the valve is a neutral position;

wherein said control notches are formed with a pair of laterally and divergently extending edge contours to define control orifices, said edge contours continuously diverging from each other to respective points, said control orifices have an axial length which increases in a non-linear manner in response to relative movement of said valve spool with respect to said valve sleeve.

17. The control valve of claim 16 wherein said notches are input and return notches, said input notches defining input orifices and said return notches defining return orifices, and wherein the axial length of said input and return orifices increase in a non-linear fashion with respect to said relative motion.

* * * * *